United States Patent
Fujikawa et al.

(10) Patent No.: US 8,140,220 B2
(45) Date of Patent: Mar. 20, 2012

(54) IN-VEHICLE APPARATUS

(75) Inventors: Seiji Fujikawa, Kobe (JP); Hidenori Kurose, Kobe (JP); Atsushi Miyanishi, Kobe (JP); Junji Amaya, Kobe (JP); Hidehiko Sowa, Kobe (JP); Kohichi Watanabe, Kobe (JP); Yasuo Nakashima, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 371 days.

(21) Appl. No.: 12/457,033

(22) Filed: May 29, 2009

(65) Prior Publication Data

US 2009/0299572 A1      Dec. 3, 2009

(30) Foreign Application Priority Data

May 30, 2008 (JP) ................. 2008-143756
May 30, 2008 (JP) ................. 2008-143770
May 30, 2008 (JP) ................. 2008-143777

(51) Int. Cl.
*G05D 1/00* (2006.01)
(52) U.S. Cl. ............... 701/36; 348/836; 348/837
(58) Field of Classification Search ............ 701/36; 348/836, 837
See application file for complete search history.

(56) References Cited

U.S. PATENT DOCUMENTS

| | | | | |
|---|---|---|---|---|
| 5,794,164 | A * | 8/1998 | Beckert et al. | 455/3.06 |
| 6,411,874 | B2 * | 6/2002 | Morgan et al. | 701/36 |
| 7,006,902 | B2 * | 2/2006 | Archer et al. | 701/1 |
| 7,024,296 | B2 * | 4/2006 | Squires et al. | 701/48 |
| 7,127,331 | B2 * | 10/2006 | Pillar et al. | 701/1 |
| 7,725,225 | B2 * | 5/2010 | Pillar et al. | 701/36 |
| 2004/0002794 | A1 * | 1/2004 | Pillar et al. | 701/1 |
| 2005/0113988 | A1 * | 5/2005 | Nasr et al. | 701/22 |
| 2005/0113996 | A1 * | 5/2005 | Pillar et al. | 701/36 |
| 2008/0221754 | A1 * | 9/2008 | Rowe et al. | 701/36 |

FOREIGN PATENT DOCUMENTS

JP   A-3-200446    9/1991
JP   A-2007-193699  8/2007

* cited by examiner

*Primary Examiner* — Joanne Silbermann
*Assistant Examiner* — Michael Stabley
(74) *Attorney, Agent, or Firm* — Oliff & Berridge, PLC

(57) ABSTRACT

An object of the invention is to provide an in-vehicle apparatus and an in-vehicle system that can use a plurality of expansion modules. The in-vehicle apparatus includes a plurality of slots for connecting a plurality of modules, each having a connector for connection, to expand capabilities of the in-vehicle apparatus, and a control unit for identifying the kind of each of the plurality of modules connected to the plurality of slots.

14 Claims, 37 Drawing Sheets

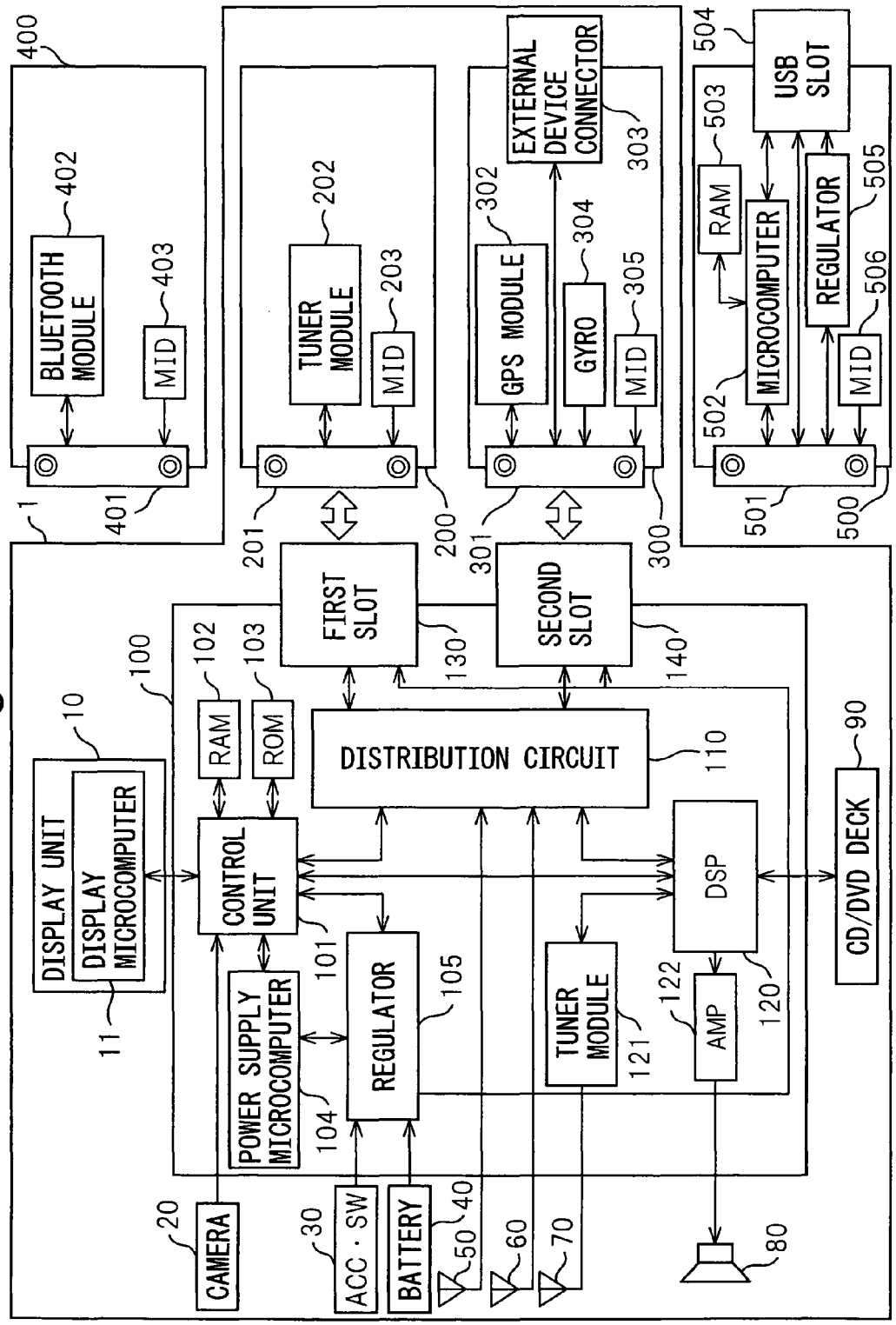

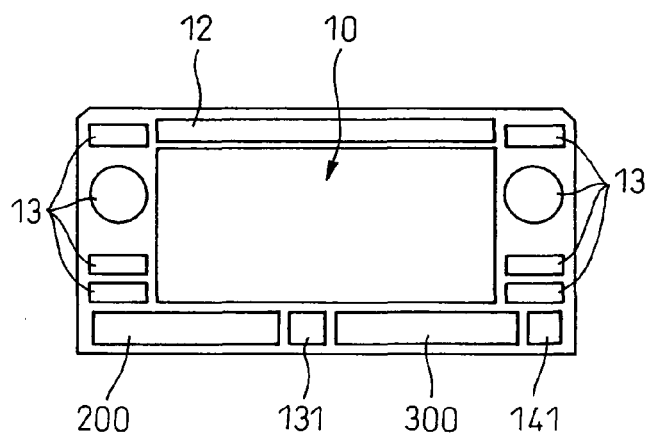
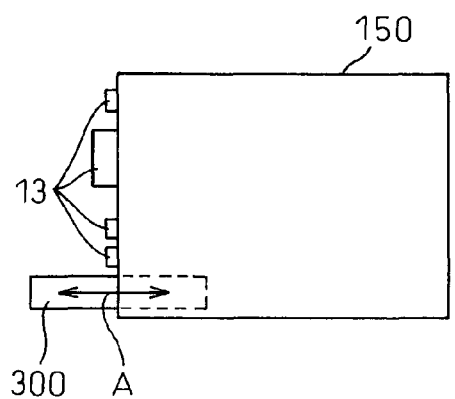
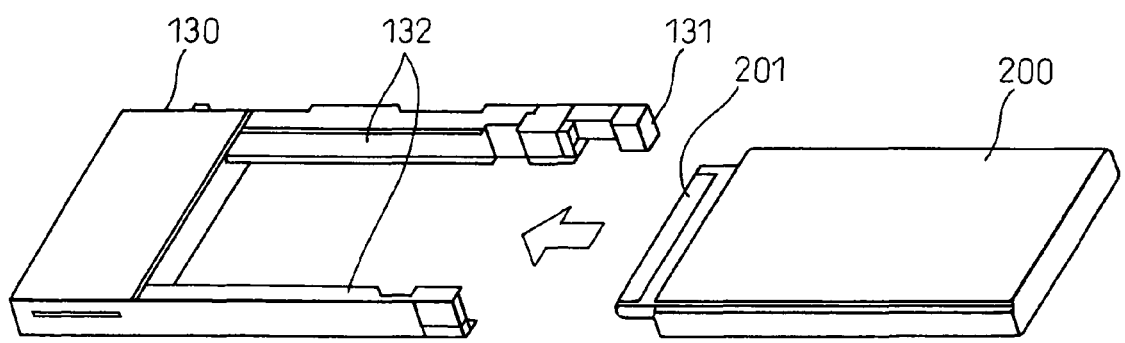

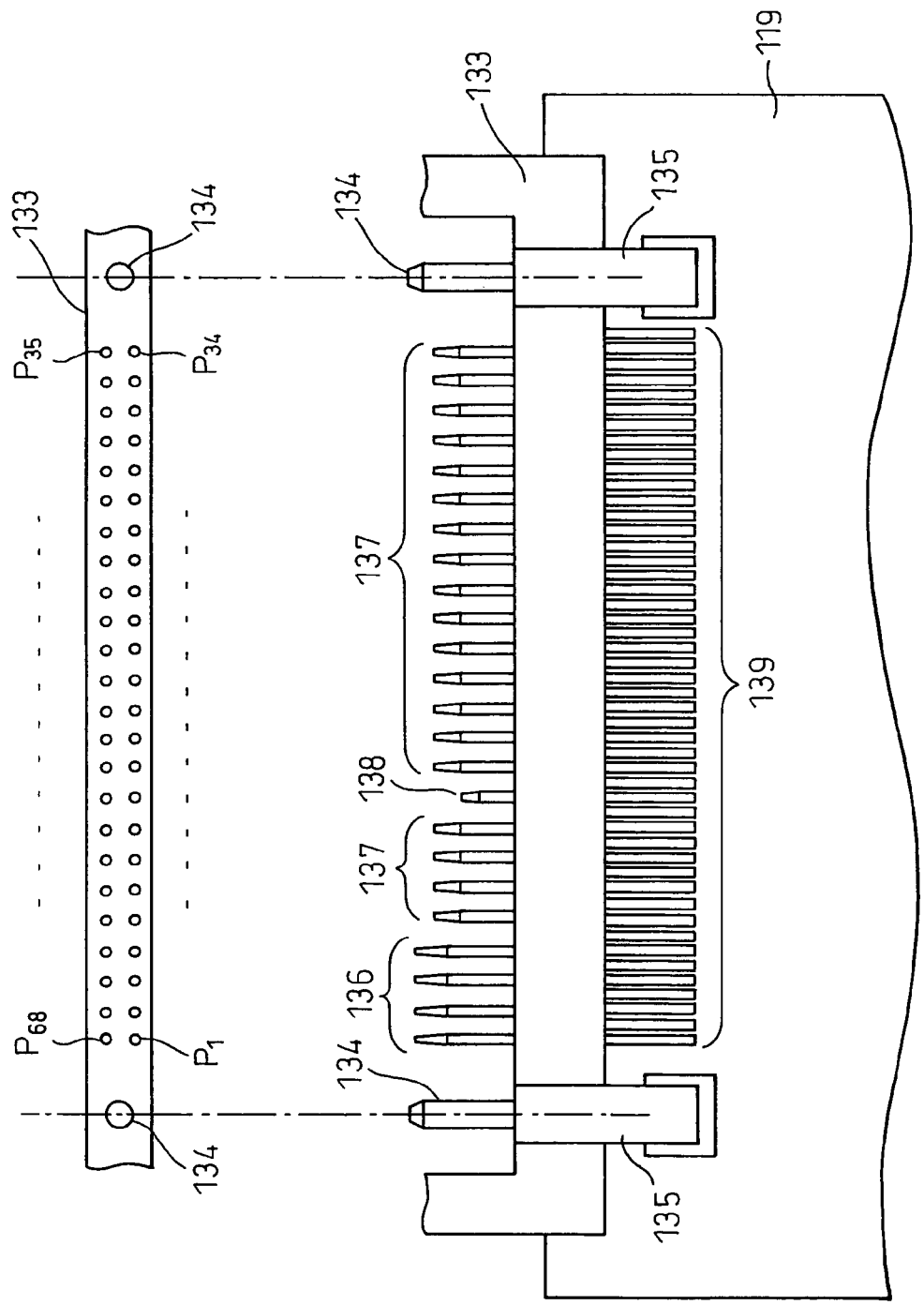

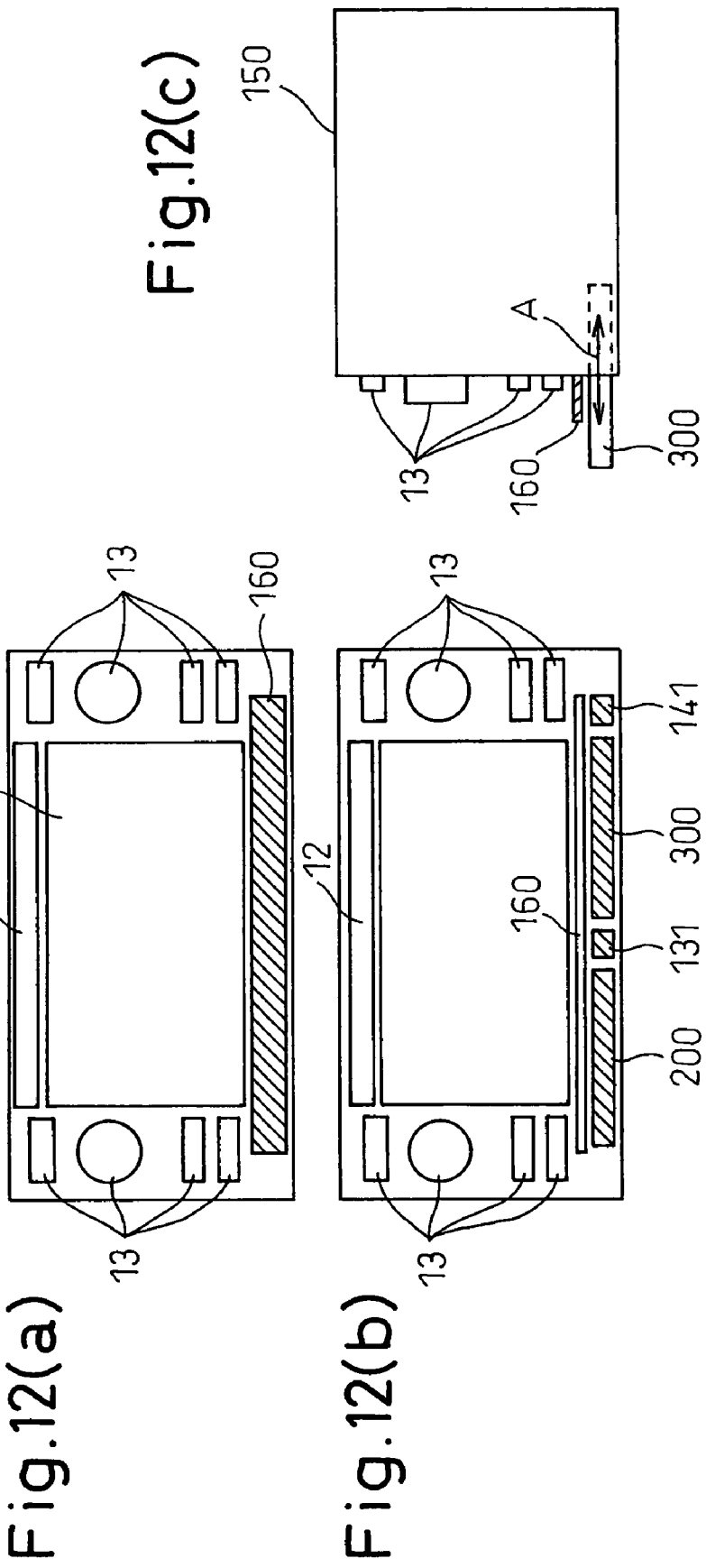

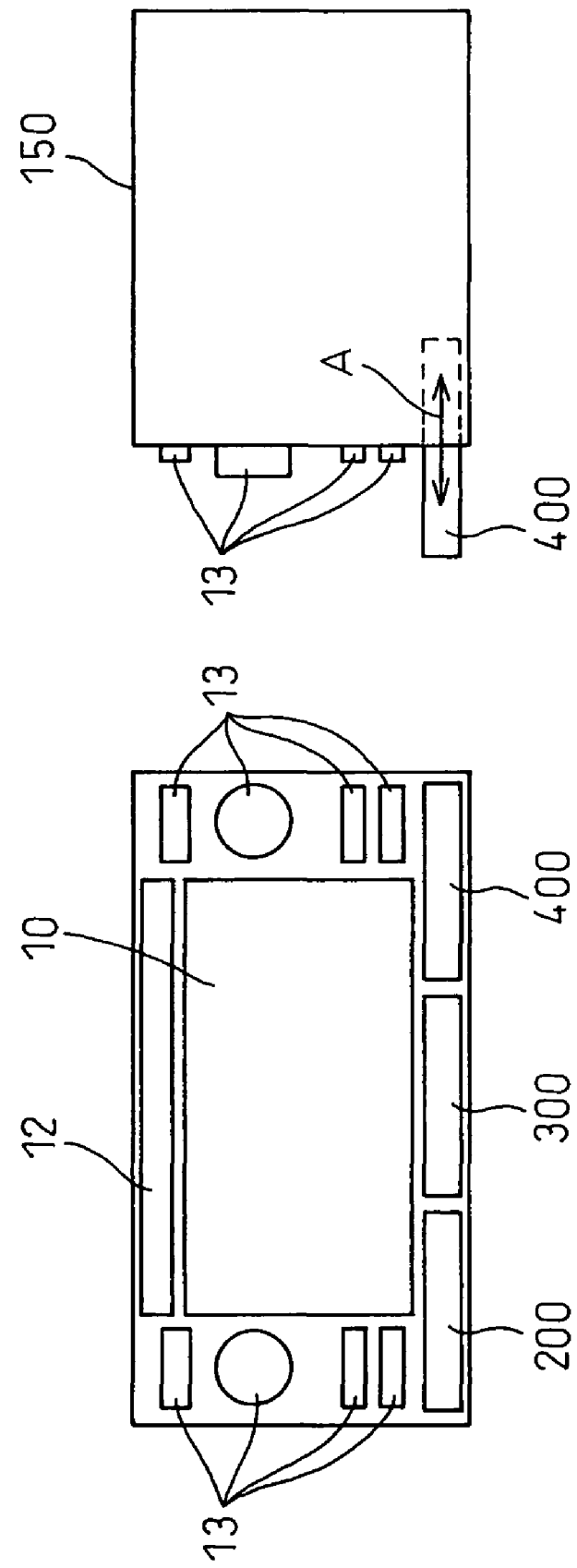

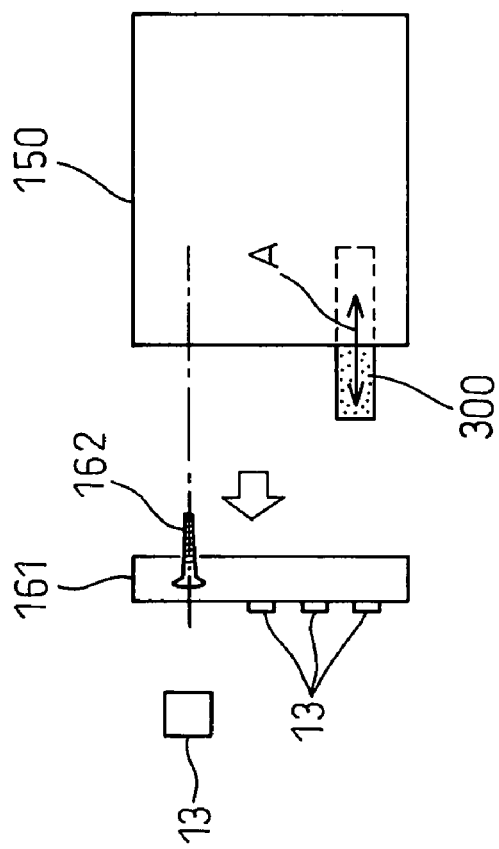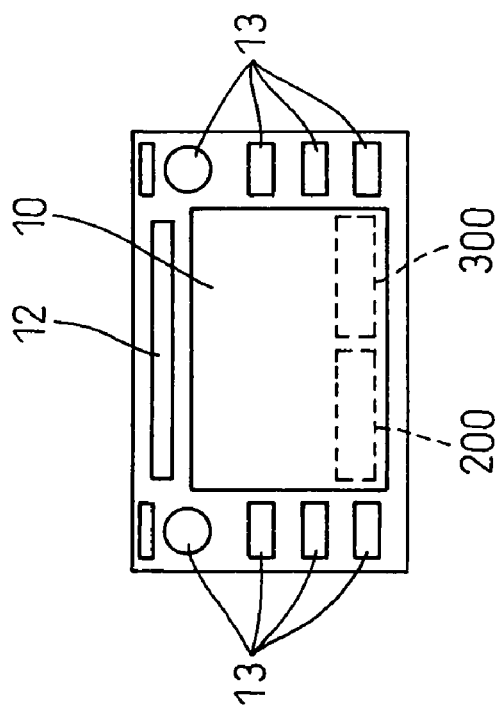

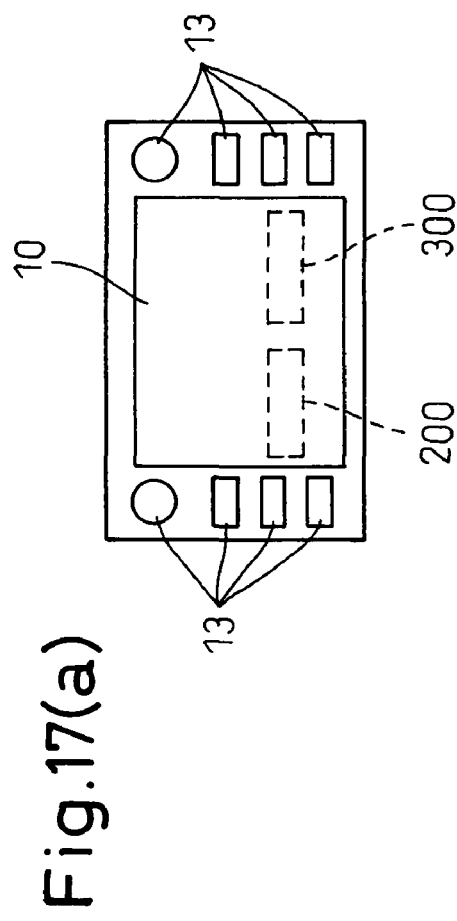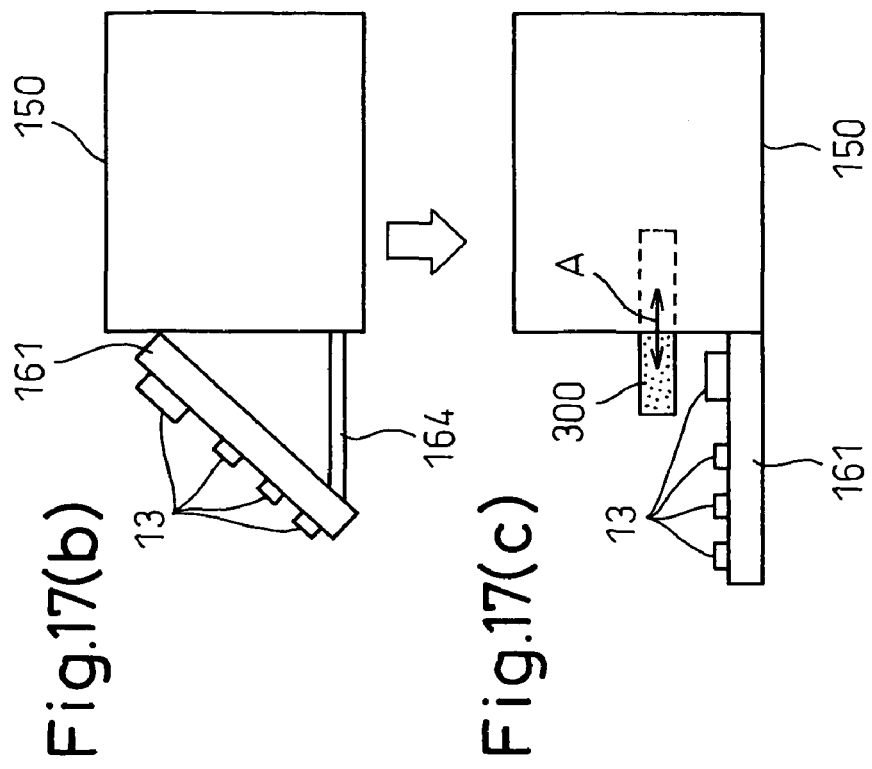

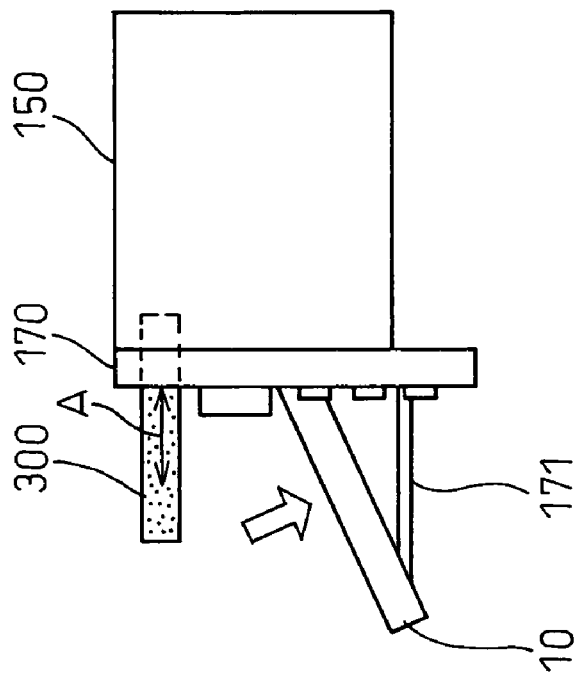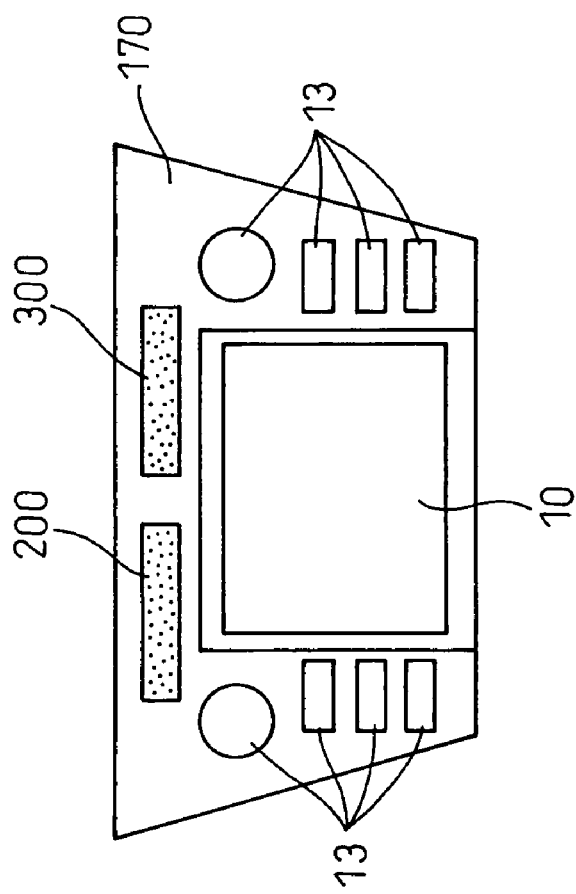

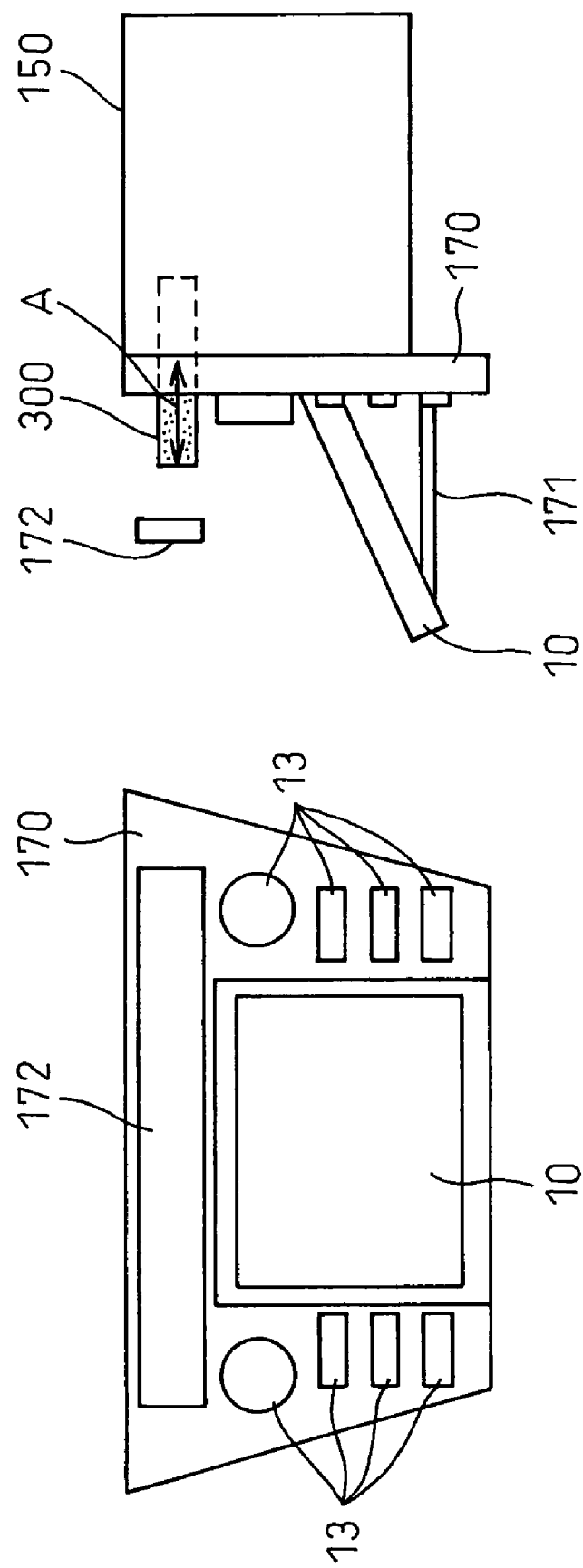

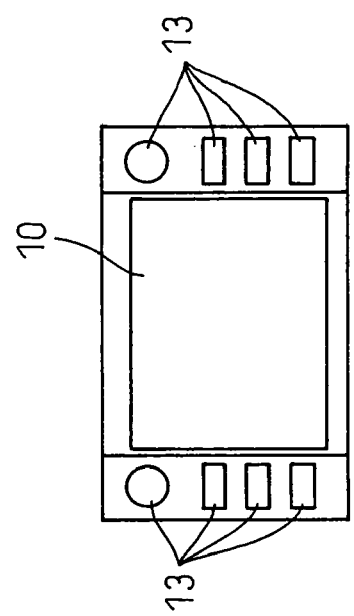
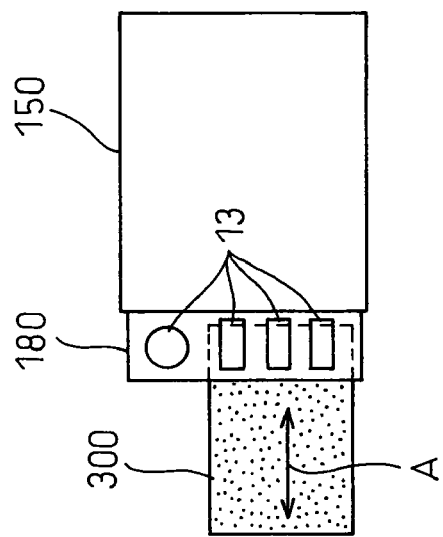
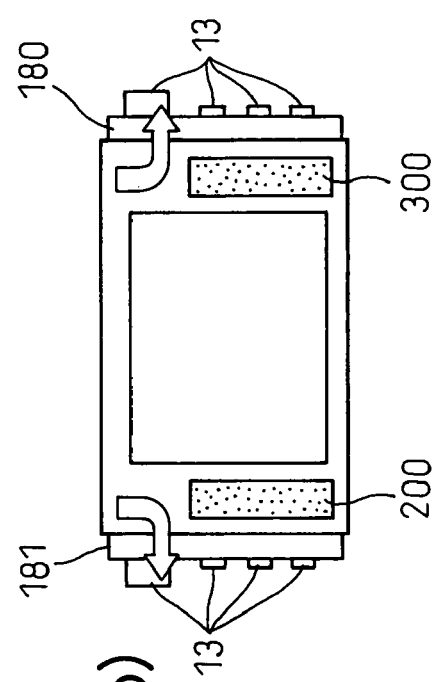
Fig.20(a)
Fig.20(b)
Fig.20(c)

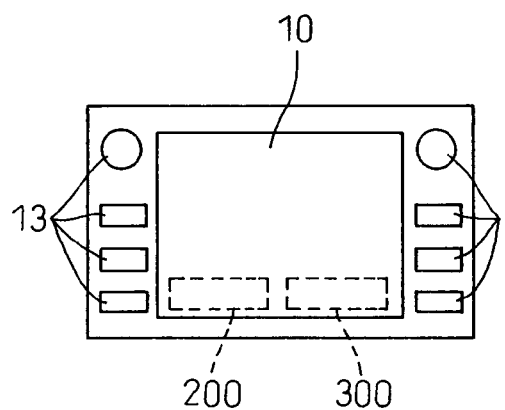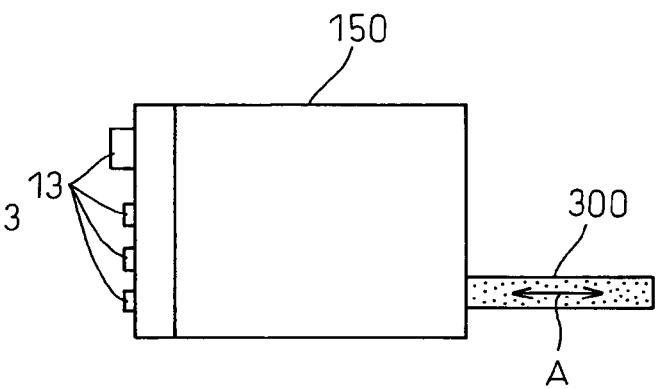

Fig.28

| PIN UMBER | FUNCTION | PIN UMBER | FUNCTION |
|---|---|---|---|
| 1 | POWER SUPPLY | 68 | POWER SUPPLY |
| 2 | | 67 | |
| 3 | | 66 | |
| 4 | | 65 | |
| 5 | ANALOG AUDIO | 64 | USB |
| 6 | | 63 | |
| 7 | | 62 | |
| 8 | | 61 | |
| 9 | INSERTION DETECTION | 60 | INSERTION DETECTION GND |
| 10 | CONTROL SIGNAL | 59 | DIGITAL AUDIO |
| 11 | | 58 | |
| 12 | MID | 57 | |
| 13 | | 56 | |
| 14 | | 55 | |
| 15 | CONTROL SIGNAL | 54 | |
| 16 | DETECTION | 53 | |
| 17 | | 52 | NOT CONNECTED |
| 18 | | 51 | |
| 19 | | 50 | |
| 20 | COMMUNICATION | 49 | STORAGE DEVICE |
| 21 | | 48 | |
| 22 | | 47 | |
| 23 | | 46 | |
| 24 | | 45 | |
| 25 | ANALOG VIDEO SIGNAL | 44 | |
| 26 | | 43 | |
| 27 | | 42 | |
| 28 | DIGITAL VIDEO SIGNAL | 41 | COMMUNICATION |
| 29 | | 40 | |
| 30 | | 39 | GND |
| 31 | | 38 | DIGITAL VIDEO SIGNAL |
| 32 | | 37 | |
| 33 | | 36 | |
| 34 | | 35 | |

| RADIO FREQUENCY 1 | ANT SIGNAL | RADIO FREQUENCY 2 | ANT SIGNAL |
|---|---|---|---|
| | ANTGND | | ANTGND |

# IN-VEHICLE APPARATUS

This application is a new U.S. patent application that claims priorities from Japanese Application No. 2008-143756, filed May 30, 2008, Japanese Application No. 2008-143770, filed May 30, 2008, and Japanese Application No. 2008-143777, filed May 30, 2008, the contents of which are incorporated herein by reference.

FIELD OF THE INVENTION

The present invention relates to an in-vehicle apparatus capable of connecting a plurality of expansion modules.

BACKGROUND OF THE INVENTION

In an in-vehicle display apparatus for producing a map display, it is known to make provisions to be able to connect an external storage medium containing an application program for providing an expanded display capability, and to connect via a single communication adapter an external CPU having a processing function for implementing the expanded capability in accordance with the application program (for example, refer to Patent Document 1).

On the other hand, in an in-vehicle apparatus such as a navigation apparatus or audio apparatus mounted in a vehicle for use, it is known to provide a slot for inserting a card such as a memory card or a PC card (for example, refer to Patent Document 2). Such cards include a card that is equipped with a tuner for receiving television broadcasts or a card that incorporates a communication module for adding a communication function to the in-vehicle apparatus. By inserting the card into the slot provided in the in-vehicle apparatus, a desired function can be selectively added to the in-vehicle apparatus.

A prior art example of an in-vehicle apparatus provided with such a card insertion slot is shown in FIG. 40. The prior art navigation apparatus shown in FIG. 40 has a display unit that doubles as a door panel; FIG. 40(*a*) is a perspective view showing a condition in which the display unit 1015A as the door panel is closed, and FIG. 40(*b*) is a perspective view showing a condition in which the display unit 1015A as the door panel is opened. A desired function can be added by inserting a PC card 1002 into the card insertion slot 1003 that becomes accessible when the display unit 1015A is opened, as shown in FIG. 40(*b*).

Patent Document 1: Japanese Unexamined Patent Publication No. H03-200446 (FIG. 1)
Patent Document 2: Japanese Unexamined Patent Publication No. 2007-193699 (FIG. 2)

SUMMARY OF THE INVENTION

However, the function that can be expanded by a single communication adapter or a single electronic card is limited, and it has been difficult to achieve a variety of capabilities by combining a plurality of functions or to sufficiently expand new capabilities to accommodate new technology.

It is an object of the present invention to provide an in-vehicle apparatus and an in-vehicle system that can use a plurality of expansion modules.

An in-vehicle apparatus according to the present invention includes a plurality of slots for connecting a plurality of modules, each having a connector for connection, to expand capabilities of the in-vehicle apparatus, and a control unit for identifying the kind of each of the plurality of modules connected to the plurality of slots.

An in-vehicle system according to the present invention comprises an in-vehicle apparatus which includes a first module having a first connector for connection for adding a first function; a second module having a second connector for connection for adding a second function, a first slot for connecting the first module, a second slot for connecting the second module, and a control unit for identifying the kind of each of the first and second modules connected to the first and second slots, respectively.

In the in-vehicle apparatus and in-vehicle system according to the present invention, it becomes possible to provide a variety of capabilities to the in-vehicle apparatus by combining the functions added by the plurality of modules.

In the in-vehicle apparatus and in-vehicle system according to the present invention, it also becomes possible to sufficiently expand new capabilities to accommodate new technology by the functions added by the plurality of modules.

Further, in the in-vehicle apparatus and in-vehicle system according to the present invention, it becomes possible to achieve interlinking between the in-vehicle apparatus and each module and/or between the plurality of modules by the functions added by the plurality of modules.

Furthermore, in the in-vehicle apparatus and in-vehicle system according to the present invention, since a plurality of modules can be used, it becomes possible to add a combination of functions that suits the user's preferences or needs, which serves to enhance the customizability.

When expanding the capabilities of the in-vehicle apparatus, it should be noted that a broadcast-related module that receives analog television, digital television, or FM/AM broadcast has a prescribed impedance characteristic (for example, 75Ω) in order to receive radio frequency signals such as broadcast signal waves. On the other hand, a communication-related module that uses such technology as DCM (Data Communication Module), which defines a GPS or automotive communication standard module, or a WiMAX (Worldwide Interoperability for Microwave Access), which is a wireless communication standard, has an impedance characteristic (for example, 50Ω) that is different from that of a broadcast-related module. This necessitates the provision of a slot that can accommodate a broadcast-related module and a slot that can accommodate a communication-related module, and the signal paths provided within the in-vehicle apparatus for connection to the respective slots are configured to match the respective impedance characteristics.

However, when the module connector is standardized, there can occur a situation where the impedance characteristic does not match between the slot and the module inserted therein, and in the prior art, no account has been taken of possible measures that should be taken to address such a situation.

It is an object of the present invention to provide an in-vehicle apparatus that can use a plurality of expansion modules.

It is an object of the present invention to provide an in-vehicle apparatus that can match the impedance characteristic between the plurality of expansion modules and the slots.

It is a further object of the present invention to provide an in-vehicle apparatus equipped with slots having predefined terminals matched to a plurality of expansion modules.

An in-vehicle apparatus according to the present invention includes a first slot for connecting a module, having a connector for connection and having a first impedance characteristic, to expand capabilities of the in-vehicle apparatus, a second slot for connecting a module, having a connector for connection and having a second impedance characteristic different from the first impedance characteristic, to expand` capabilities of the in-vehicle apparatus, and a control unit for identifying the impedance characteristics of the modules connected to the first and second slots, respectively.

An in-vehicle apparatus according to the present invention includes a plurality of slots for connecting a plurality of modules, each having a connector for connection, to expand capabilities of the in-vehicle apparatus, a plurality of terminals, provided on each of the plurality of slots, for connecting with the connector of each module, and a control unit for detecting the insertion of a module into each of the plurality of slots by using at least one of the plurality of terminals.

In the in-vehicle apparatus according to the present invention, it becomes possible to provide a variety of capabilities to the in-vehicle apparatus by combining the functions added by the plurality of modules.

Further, in the in-vehicle apparatus according to the present invention, it becomes possible to match the impedance characteristic between the plurality of expansion modules and the plurality of slots.

In the in-vehicle apparatus according to the present invention, it also becomes possible to adjust the impedance characteristic so as to match each of the plurality of modules.

Furthermore, since the in-vehicle apparatus according to the present invention is equipped with slots having terminals matched to a plurality of expansion modules, the module connector can be standardized so that modules having a variety of functions can be used.

Moreover, in the in-vehicle apparatus according to the present invention, since a plurality of modules can be used, it becomes possible to add a combination of functions that suits the user's preferences or needs, which serves to enhance the customizability.

On the other hand, the prior art in-vehicle apparatus, which is equipped with only one slot, has been unable to accommodate more than one kind of module at a time, and therefore it has not been possible to use the in-vehicle apparatus in a personalized way by adding a function for each individual occupant in the driver or passenger seat; as a result, the module has to be changed for each user, which has inconvenienced the user.

Furthermore, since the prior art in-vehicle apparatus is equipped with only one slot, no account has been taken of providing a plurality of slots to add a plurality of functions simultaneously and managing a plurality of modules inserted into the respective slots; therefore, it has not been possible to expand the capabilities of the apparatus by combining functions so as to match the user's preferences or needs, and this has greatly limited the customizability.

An alternative in-vehicle apparatus according to the present invention includes a plurality of slots for inserting modules, and a management unit for detecting the insertion of the module in each module and for acquiring a module ID from the inserted module.

A module control communication method according to the present invention provides a method for control communication with the modules inserted into the plurality of slots provided in the in-vehicle apparatus, and comprises the steps of detecting the insertion of the module in each slot and acquiring a module ID from the inserted module.

In the in-vehicle apparatus according to the present invention, since the module ID is registered for each slot, the function of the module inserted in each slot can be used in a personalized way.

Further, since the in-vehicle apparatus according to the present invention is equipped with a plurality of slots for inserting modules, and since the modules can be inserted into the respective slots and controlled in a concurrent fashion, a larger number of functions can be added to the in-vehicle apparatus than the prior art and can be combined so as to match the user's preferences or needs, which serves to enhance the customizability.

BRIEF DESCRIPTION OF THE DRAWINGS

These and other features and advantages of the present invention will be better understood by reading the following detailed description, taken together with the drawings, wherein:

FIG. 1 is a diagram schematically showing the configuration of an in-vehicle system 1.

FIG. 2(a) is a diagram showing one example of a front panel of an in-vehicle apparatus 100, and FIG. 2(b) is a diagram showing one example of a side panel of the in-vehicle apparatus 100.

FIG. 3 is a diagram showing the relationship between a first slot 130 and a module.

FIG. 4 is a diagram showing one configuration example of the first slot 130.

FIG. 12(a) is a diagram showing one example of the external appearance of the front panel of the in-vehicle apparatus 100, FIG. 12(b) is a diagram showing a condition in which a door 160 on the front panel is opened, and FIG. 12(c) is a diagram showing the external appearance of a frame member 150 of the in-vehicle apparatus 100 as viewed from the side thereof.

FIG. 13(a) is a diagram showing one example of the external appearance of the front panel of the in-vehicle apparatus 100, and FIG. 13(b) is a diagram showing the external appearance of the frame member 150 of the in-vehicle apparatus 100 as viewed from the side thereof.

FIG. 15(a) is a diagram showing one example of the external appearance of the front panel of the in-vehicle apparatus 100, and FIG. 15(b) is a diagram showing the external appearance of the frame member 150 of the in-vehicle apparatus 100 as viewed from the side thereof.

FIG. 17(a) is a diagram showing one example of the external appearance of the front panel of the in-vehicle apparatus 100, and FIGS. 17(b) and 17(c) are diagrams showing the external appearance of the frame member 150 of the in-vehicle apparatus 100 as viewed from the side thereof.

FIG. 18(a) is a diagram showing one example of the external appearance of the front panel of the in-vehicle apparatus 100, and FIG. 18(b) is a diagram showing the external appearance of the frame member 150 of the in-vehicle apparatus 100 as viewed from the side thereof.

FIG. 19(a) is a diagram showing one example of the external appearance of the front panel of the in-vehicle apparatus 100, and FIG. 19(b) is a diagram showing the external appearance of the frame member 150 of the in-vehicle apparatus 100 as viewed from the side thereof.

FIG. 20(a) is a diagram showing one example of the external appearance of the front panel of the in-vehicle apparatus 100, FIG. 20(b) is a diagram showing a condition in which both side portions 180 and 181 of the front panel are opened, and FIG. 20(c) is a diagram showing the external appearance of the frame member 150 of the in-vehicle apparatus 100 as viewed from the side thereof.

FIG. 23(a) is a diagram showing one example of the external appearance of the front panel of the in-vehicle apparatus 100, and FIG. 23(b) is a diagram showing the external appearance of the frame member 150 of the in-vehicle apparatus 100 as viewed from the side thereof.

FIG. 28 is a diagram showing an example of connection pin assignments for the first slot 130.

DETAILED DESCRIPTION OF THE PREFERRED EMBODIMENTS

Figure 5:
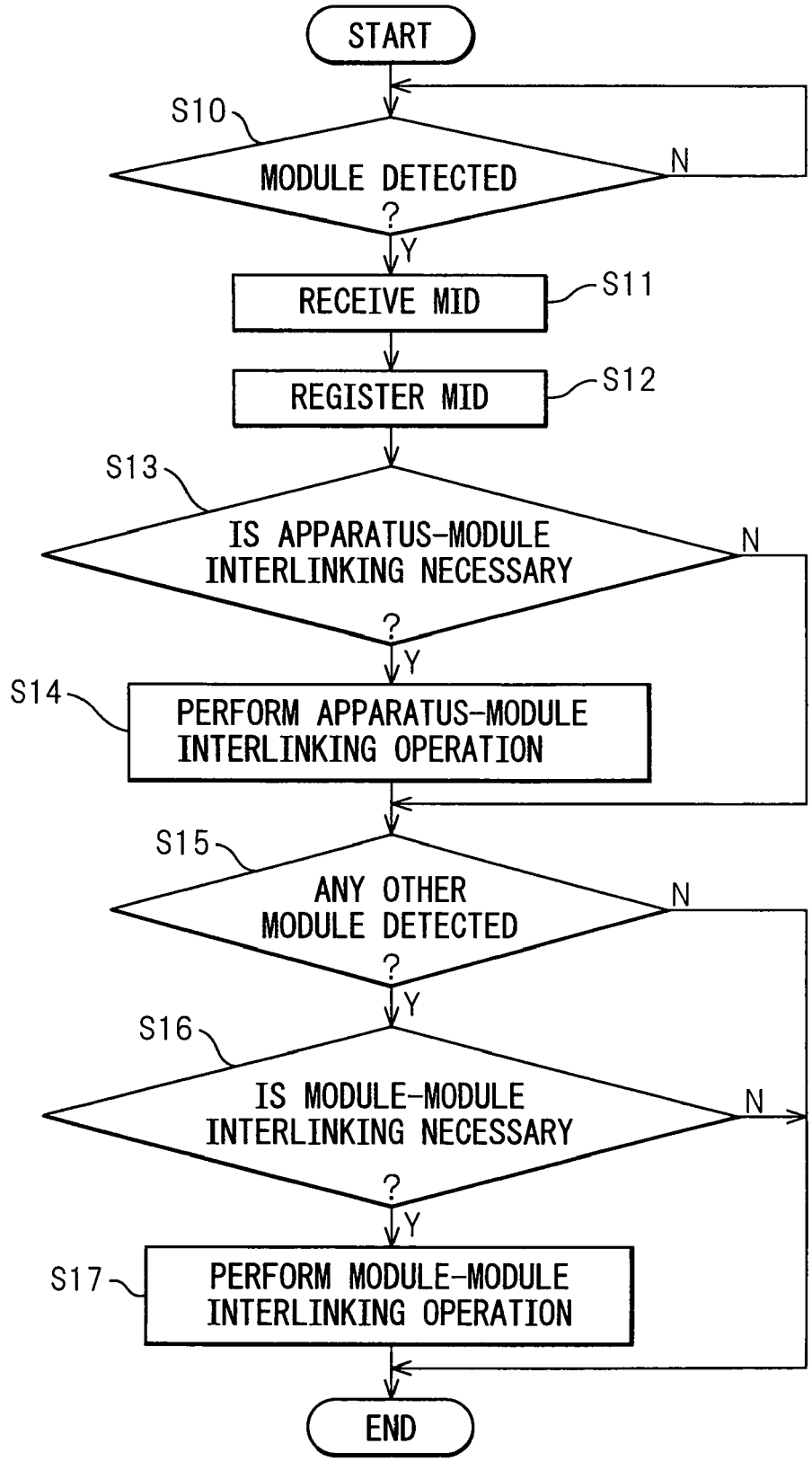
FIG. 5 is a diagram showing one example of a process flow of the in-vehicle system 1.

In-vehicle apparatus and in-vehicle systems will be described below with reference to the drawings. However, it should be noted that the technical scope of the present invention is not limited to the specific embodiments described herein, but extends to the inventions described in the appended claims and their equivalents.

FIG. 1 is a diagram schematically showing the configuration of an in-vehicle system 1.

The in-vehicle system 1 comprises: an in-vehicle apparatus 100; a plurality of modules 200 to 500 mountable in the in-vehicle apparatus 100; a display unit 10, connected to the in-vehicle apparatus 100, that includes a display microcomputer 11 for controlling the display unit and that is constructed from a touch panel or the like that functions as a liquid crystal display and an operation unit; a camera 20 constructed from a CCD imager or the like for monitoring the area around the vehicle (not shown) (for example, the area behind the vehicle that tends to become a blind spot for the driver), and for displaying it on the display unit 10; an accessory switch (ACC switch) 30 constructed in an electrically integral fashion with the engine starting key cylinder of the vehicle; a battery 40; a digital television (DTV) antenna 50 and an AM/FM antenna 60 mounted in the front windshield and/or the rear windshield of the vehicle; an antenna 70 for a GPS system for measuring the current location of the vehicle; one or a plurality of speakers 80 mounted at various locations in the vehicle; and a CD/DVD playback deck 90.

The in-vehicle apparatus 100 comprises: a control unit 101 constructed from a main microcomputer or the like; a RAM 102; a ROM 103; a power supply microcomputer 104; a regulator 105 for supplying power to the various component elements and modules of the in-vehicle apparatus 100, and for providing protection against overcurrent and/or overvoltage; a distribution circuit 110 for controlling signal transfers to and from the modules, etc.; a digital signal processor (DSP) 120 for processing video signals and/or audio signals; a tuner module 121 for receiving AM/FM broadcasts; an amplifier 122 for amplifying an audio signal for output to the speaker 80; a first slot 130 for connecting the first module; and a second slot 140 for connecting the second module.

The in-vehicle apparatus 100 may be constructed in integral fashion with one or more units selected from among the display unit 10, the camera 20, and the CD/DVD playback deck 90. Further, the AM/FM tuner module 121 built into the in-vehicle apparatus 100 in FIG. 1 may be provided as a separate unit outside the in-vehicle apparatus 100, just like the CD/DVD playback deck 90 is, or may be implemented as one of the function expansion modules.

The first module 200 is a one-segment DTV module which, in the configuration of the in-vehicle system 1 shown in FIG. 1, is mounted in the in-vehicle apparatus 100 by plugging a first connector 201 into the first slot 130. The first module 200 includes, in addition to the connector 201, a DTV tuner module 202 and a first MID output circuit 203 in which the module ID (MID) is stored.

In the first MID output circuit 203, a combination of an ID (for example, 001), which indicates that the first module is a one-segment DTV module, and an ID (for example, X), which indicates that the first module is a broadcast-related module that receives a radio frequency signal from the DTV antenna 50, is stored as the module ID (for example, "001-X").

The distribution circuit 110 operates so that the radio frequency signal received by the DTV antenna 50 is delivered via the first slot 130 to the tuner module 202 contained in the first module 200, and so that the digital video signal corresponding to the channel selected by the tuner module 202 is transferred via the first slot 130 to the control unit 101 while the corresponding digital audio signal is transferred via the first slot 130 to the DSP 120. Thus, according to the in-vehicle apparatus 100 equipped with the first module 200, the video and audio of the received one-segment digital television broadcast can be displayed on the display unit 10 and reproduced through the speaker 80, respectively. The control unit 101 also receives the MID from the first MID output circuit 203 via the first slot 130 and the distribution circuit 110. In this way, the function not originally built into the in-vehicle apparatus 100 is added by mounting the first module (that is, the capabilities are expanded).

The second module 300 is a navigation module which, in the configuration of the in-vehicle system 1 shown in FIG. 1, is mounted in the in-vehicle apparatus 100 by plugging a second connector 301 into the second slot 140. The second module 300 includes, in addition to the second connector 301, a GPS module 302 for measuring the current location of the vehicle, an external device connector 303 for connecting an external storage device such as an SD memory card on which navigation map information, etc. are stored, a gyro module 304 used to check the heading direction of the vehicle, etc., and a second MID output circuit 305 in which the MID is stored.

In the second MID output circuit 305, a combination of an ID (for example, 002), which indicates that the second module is a navigation module, and an ID (for example, Y), which indicates that the second module is a communication-related module that receives a signal from the GPS antenna 60, is stored as the module ID (for example, "002-Y").

The distribution circuit 110 operates so that the signal received by the GPS antenna 60 is delivered via the second slot 140 to the GPS module 302 contained in the second module 300, and so that the vehicle's current location information output from the GPS module 302, the map information received via the external device connector 303, the vehicle state information output from the gyro module 304, etc. are transferred via the second slot 140 to the control unit 101. Thus, according to the in-vehicle apparatus 100 equipped with the second module 300, a navigational display using the map information can be displayed on the display unit 10, while monitoring the current location of the vehicle. The control unit 101 also receives the MID from the second MID output circuit 305 via the second slot 140 and the distribution circuit 110. In this way, the function not originally built into the in-vehicle apparatus 100 is added by mounting the second module (that is, the capabilities are expanded).

The third module 400 is a Bluetooth (registered trademark) module; in the configuration of the in-vehicle system 1 shown in FIG. 1, it is not mounted in the in-vehicle apparatus 100, but it can be mounted, instead of the first module or the second module, into the first slot 130 or the second slot 140.

The third module 400 comprises a third connector 401, a Bluetooth (registered trademark) wireless signal receiving module 402, and a third MID output circuit 403 in which the MID is stored. The module 402 is configured to be able to receive a wireless signal conforming to the Bluetooth (registered trademark) standard and to output the received signal. Accordingly, when the third module 400 is used, music information from a Bluetooth (registered trademark) compliant mobile phone, for example, can be reproduced on the in-vehicle apparatus 100 equipped with the third module 400.

In the third MID output circuit 403, a combination of an ID (for example, 003), which indicates that the third module 400 is a Bluetooth (registered trademark) module, and an ID (for example, Z), which indicates that the third module 400 is neither a broadcast-related module nor a communication-related module, is stored as the module ID (for example, "003-Z").

The fourth module 500 is a USB I/F module; in the configuration of the in-vehicle system 1 shown in FIG. 1, it is not mounted in the in-vehicle apparatus 100, but it can be mounted, instead of the first module or the second module, into the first slot 130 or the second slot 140.

The fourth module 500 comprises a fourth connector 501, a control microcomputer 502, a RAM 503, a USB slot 504, a regulator 505 for supplying output power via the USB slot 504 and for monitoring the current and voltage supply for overcurrent and overvoltage conditions, and a fourth MID output circuit 506 in which the MID is stored. Accordingly, when the fourth module 500 is used, operations such as altering a portion of the application program of the in-vehicle apparatus 100 can be performed, for example, by connecting to it an HD having a USB connector.

In the fourth MID output circuit 506, a combination of an ID (for example, 004), which indicates that the fourth module 500 is a USB I/F module, and an ID (for example, Z), which indicates that the fourth module 500 is neither a broadcast-related module nor a communication-related module, is stored as the module ID (for example, "004-Z").

While the first to fourth modules 200 to 500 that can be mounted in the in-vehicle apparatus 100 have been described and illustrated with reference to FIG. 1, it will be realized that the modules mountable in the in-vehicle apparatus 100 are not limited to the illustrated ones. For example, it is also possible to use other modules such as a DTV module produced by enhancing the performance of the first module 200 so as to be able to display DTV broadcasts by switching between full-segment (12-segment) and one-segment depending on the reception conditions, an IBOC (In Band on Channel) module for receiving hybrid HD (High Definition) radio broadcast carrier waves of the IBOC system which is a terrestrial digital radio system employed in the U.S., and a WiMAX (Worldwide Interoperability for Microwave Access) module for receiving signals conforming to the WiMAX wireless communication standard.

FIG. 2 is a diagram (1) showing one example of the external appearance of the in-vehicle apparatus 100. FIG. 2(a) shows one example of the external appearance of the front panel of the in-vehicle apparatus 100, and FIG. 2(b) shows the external appearance of the frame member 150 of the in-vehicle apparatus 100 as viewed from the side thereof.

As shown in FIGS. 2(*a*) and 2(*b*), the display unit 10, CD/DVD insertion slot 12, and various operation buttons 13 are arranged in the front panel of the in-vehicle apparatus 100, and the first slot 130 and second slot 140 for mounting the modules are arranged side by side below the display unit 10. In FIG. 2(*a*), the first module 200 and second module 300 are inserted in the first slot 130 and second slot 140, respectively.

The modules thus inserted are ejected from the respective slots by operating a first eject button 131 and a second eject button 141, respectively. Each module is inserted and ejected in directions indicated by arrow A in FIG. 2(*b*) (that is, in directions perpendicular to the front panel).

FIG. 3 is a diagram showing the relationship between the first slot 130 and the module.

The first module 200, for example, is inserted along the guide rails 132 of the first slot 130 provided in the in-vehicle apparatus 100, and is connected by engaging the first connector 201 onto the connection pins, etc. (see FIG. 4) provided in the leftmost portion of the first slot 130 in the figure.

When the first eject button 131 is pressed, the first connector is disengaged from the connection pins on the first slot, allowing the first module 200 to be ejected along the guide rails 132. The same applies to the second slot 140, and the description thereof will not be repeated. The first slot 130 and second slot 140 conform to the same connection standard so that any module can be mounted.

FIG. 4 is a diagram showing one configuration example of the first slot 130.

In the innermost portion of the first slot 130, 68 connection pins (pin numbers P1 to P68) which function as connection terminals for connecting to the module are arranged in two rows. Further, radio frequency pins 134 which also function as connection terminals for connecting to the module are provided at both ends of the base 133, thus having a special structure so that the radio frequency signal from the DTV antenna 50, for example, can be delivered to the module. Here, the voltage from the power supply interlinked to the ACC switch 30, the voltage from the battery 40 as a backup power supply, etc. are supplied to the power supply connection pins. The connection pins include the power supply connection pins 136 having the longest length, signal connection pins 137 having an intermediate length, and connection detection pins 138 having the shortest length. When the connection detection pins 138 are brought into contact with the mating contacts on the connector of the module, a detection current flows, whereupon the control unit 101 detects that the module has been inserted into the first slot 130.

The radio frequency pins 134 are connected to a first slot substrate 119 by special interconnect lines 135 including radio frequency signal lines and GND lines. The connection pins are connected to the first slot substrate 119 by interconnect lines 139. The connection pins are arranged in two rows on the base 133, as described above, but the interconnect lines 139 are arranged essentially in a single row on the first slot substrate 119.

The connection pins of three different lengths are used, of which the power supply connection pins 136 have the longest length, because the longer the connection pins are, the quicker the pins connect to the connector of the module, so that the supply of power, etc. can be started in a reliable manner. On the other hand, the reason that the connection detection pins 138 have the shortest length is to enable the insertion of the module in the first slot 130 to be detected only when the connection detection pins 138 are connected to the module. The structure shown in FIG. 4 also applies to the second slot 140.

FIG. 5 is a diagram showing one example of a process flow of the in-vehicle system.

The process flow shown in FIG. 5 is executed primarily by the control unit 101 operating the various modules and/or elements of the in-vehicle system 1 in a cooperative manner in accordance with a program prestored in the ROM 103. It is assumed that, prior to the initiation of the process flow shown in FIG. 5, power is turned on to the various modules or elements of the in-vehicle system 1, including the in-vehicle apparatus 100 but excluding any module yet to be mounted in the in-vehicle system 1, and the system is thus set ready for operation.

First, the control unit 101 determines whether a new module is detected in any one of the first and second slots 130 and 140 (S10). The determination as to whether a module is detected or not is made by using the connection detection pins 138 shown in FIG. 4; that is, when the connection detection pins 138 are connected with the connector of the newly inserted module, a detection signal is transmitted via the distribution circuit 110 to the control unit 101 which can thus detect the insertion of the new module. The new module detection method is not limited to the method that uses the connection detection pins 138 shown in FIG. 4, but other methods, such as a module detection optical sensor, etc., may be used.

When the new module is detected, the control unit 101 transmits a control signal to the new module by using one of the signal connection pins 137, and receives the module's MID that the MID output circuit outputs in response to the control signal by using one of the signal connection pins 137 (S11).

Next, the control unit 101 registers the MID received in S11 into a management table or the like by associating it with the slot in which the new module is mounted (S12). In this way, the control unit 101 can always identify the type and kind of the module mounted in each slot and any slot number in which no module is mounted; for example, MID=001-X (DTV module type 001, broadcast-related module) is mounted in the first slot 130 and MID=002-Y (navigation module type 002, communication-related module) in the second slot 140, or MID=001-X (DTV module type 001, broadcast-related module) is mounted in the first slot 130 but no module in the second slot 140. Further, it is preferable for the control unit 101 to detect the state of the module, i.e., whether the module is activated or not, by using one of the signal connection pins 137, and to register the detected state into the management table or the like in like manner.

Next, the control unit 101 determines whether interlinking between the built-in function of the in-vehicle apparatus 101 and the newly mounted module is necessary or not (S13). Whether the interlinking between the built-in function of the in-vehicle apparatus 101 and the newly mounted module is necessary or not is predetermined by the user by the initial setup to be described later, and the control unit 101 makes the determination based on the contents of the initial setup.

If it is determined in S13 that the interlinking is necessary, the control unit 101 performs an interlinking operation in order to interlink the built-in function of the in-vehicle apparatus 100 with the newly mounted module (S14). Interlinking between the built-in function of the in-vehicle apparatus 100 and the newly mounted module refers to receiving from the module the information necessary to implement the built-in function of the in-vehicle apparatus 100 and implementing the function of the apparatus by using the received information, and/or to receiving from the in-vehicle apparatus 100 the information necessary to implement the function of the module and implementing the function of the module by using the received information. Specific examples will be described later.

If it is determined in S13 that the interlinking is not necessary, or after the completion of S14, the control unit 101 determines whether there is any module other than the module detected in S10 (S15). The determination in S15 is made by using the management table used in S12. If it is determined in S15 that there is no other module, the sequence of operations is terminated.

If it is determined in S15 that there is such other module, the control unit 101 determines whether interlinking between the already mounted module and the newly mounted module is necessary or not (S16). Whether the interlinking between the already mounted module and the newly mounted module is necessary or not is predetermined by the user by the initial setup to be described later, and the control unit 101 makes the determination based on the contents of the initial setup.

If it is determined in S16 that the interlinking is necessary, the control unit 101 performs an interlinking operation in order to interlink the already mounted module with the newly mounted module (S17), after which the sequence of operations is terminated. Interlinking between the already mounted module and the newly mounted module refers to receiving from the newly mounted module the information necessary to implement the function of the already mounted module and implementing the function of the already mounted module by using the received information, and/or to receiving from the already mounted module the information necessary to implement the function of the newly mounted module and implementing the function of the newly mounted module by using the received information. Specific examples will be described later.

In this way, in accordance with the process flow shown in FIG. 5, the in-vehicle system 1 can manage the connection state of each module, the type and kind of each mounted module, the activation state of the module, and the presence or absence of the need for interlinking between the in-vehicle apparatus 100 and the module and/or interlinking between the modules. That is, the control unit 101 functions as a module management unit.

FIG. 6 is a diagram showing one example of an initial setup screen relating to the interlinking operation.

The setup screen shown in FIG. 6 is displayed on the display unit 10 at the time of the initial setup of the in-vehicle apparatus 100 or in response to a prescribed setup operation, and is used when performing the setup using the touch panel that serves as the operation unit on the screen of the display unit 10.

Figure 6A:
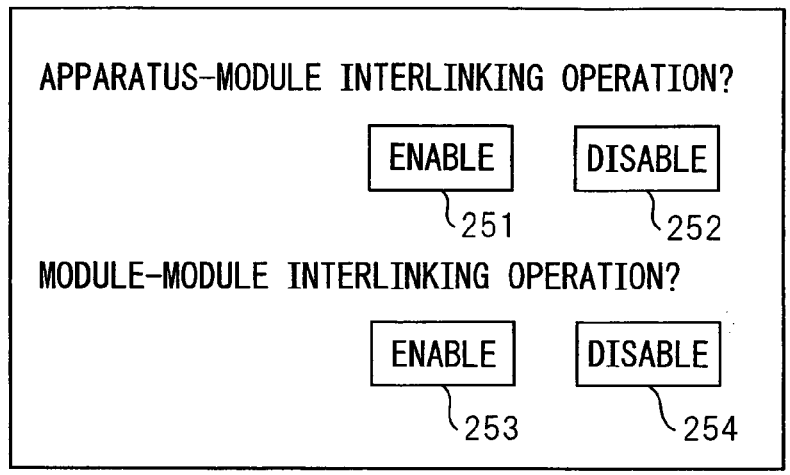
FIGS. 6(a), 6(b), and 6(c) are diagrams showing one example of an initial setup screen relating to an interlinking operation.

FIG. 6(a) shows the screen that first appears on the display unit 10 at the time of the initial setup of the in-vehicle apparatus 100 or in response to a prescribed setup operation, and set buttons 251 and 252 for making a setting as to whether to enable or disable the interlinking operation for interlinking between the in-vehicle apparatus 100 and the module and set buttons 253 and 254 for making a setting as to whether to enable or disable the interlinking operation for interlinking between the modules are displayed on the screen.

Figure 6B:
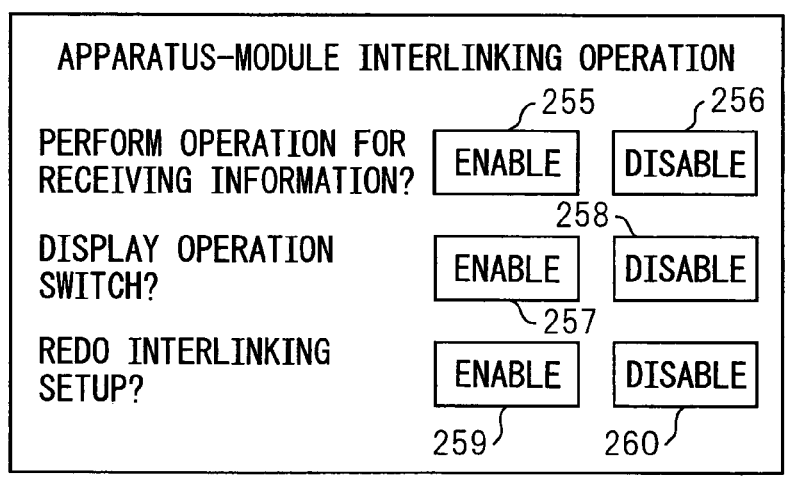

When the set button 251 in FIG. 6(a) is selected, a detailed setup screen relating to the interlinking operation for interlinking between the in-vehicle apparatus 100 and the module appears on the display unit 10 as shown in FIG. 6(b). The screen of FIG. 6(b) shows a first pair of set buttons 255 and 256 for making a setting as to whether the operation for receiving the information for interlinking is to be executed manually, a second pair of set buttons 257 and 258 for making a setting as to whether to display a switch for effecting the interlinking, and a third pair of set buttons 259 and 260 for making a setting as to whether to display a message inquiring whether the interlinking setup is to be redone or not.

Figure 6C:
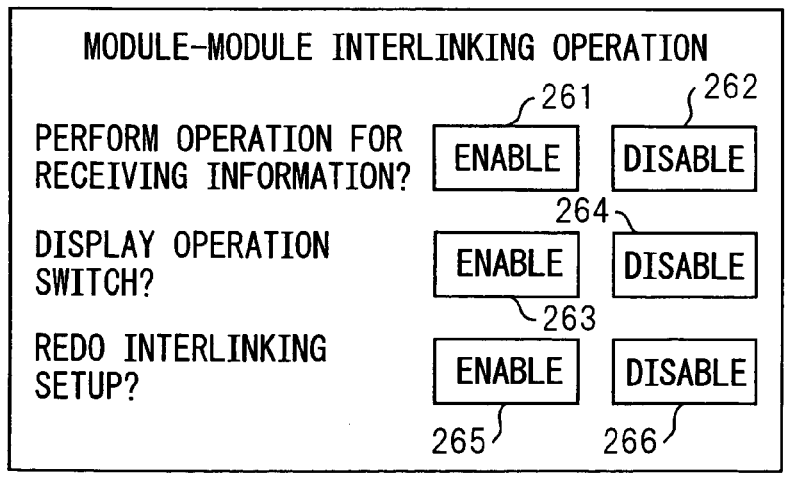

On the other hand, when the set button 253 in FIG. 6(a) is selected, a detailed setup screen relating to the interlinking operation for interlinking between the modules appears on the display unit 10 as shown in FIG. 6(c). The screen of FIG. 6(c) shows a first pair of set buttons 261 and 262 for making a setting as to whether the operation for receiving the information for interlinking is to be executed manually, a second pair of set buttons 263 and 264 for making a setting as to whether to display a switch for effecting the interlinking, and a third pair of set buttons 265 and 266 for making a setting as to whether to display a message inquiring whether the setup is to be redone or not.

Figure 7A:
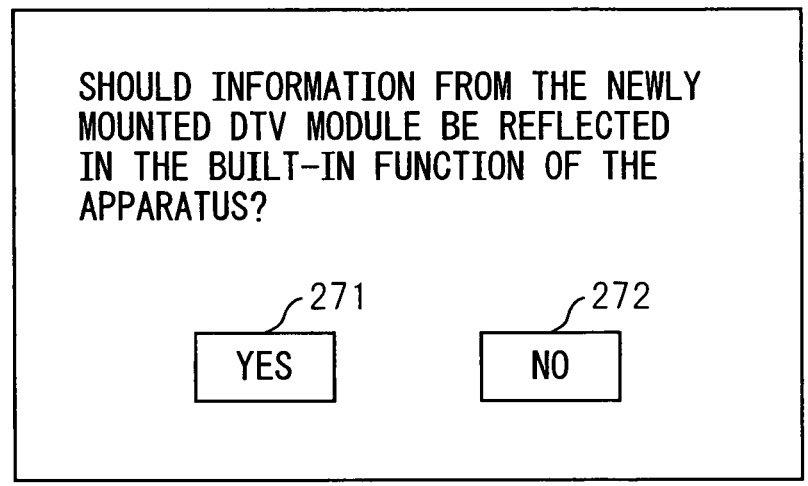
FIGS. 7(a) and 7(b) are diagram showing a display screen example (1) relating to the interlinking.

When the set button 255 in FIG. 6(b) is selected to effect its associated setting, the control unit 101 performs control so that prior to the execution of S14 in FIG. 5, an inquiry is made to the user as to whether the interlinking operation should be performed or not and, when permission is given, the control unit 101 proceeds to execute S14. FIG. 7(a) shows an example of the screen displayed on the display unit 10 in that case. Here, when the set button 271 is selected by the user, S14 in FIG. 5 is executed, but when the set button 272 is selected, S14 in FIG. 5 is skipped. The same applies for the case where the set button 261 in FIG. 6(c) is selected to effect its associated setting.

Figure 7B:
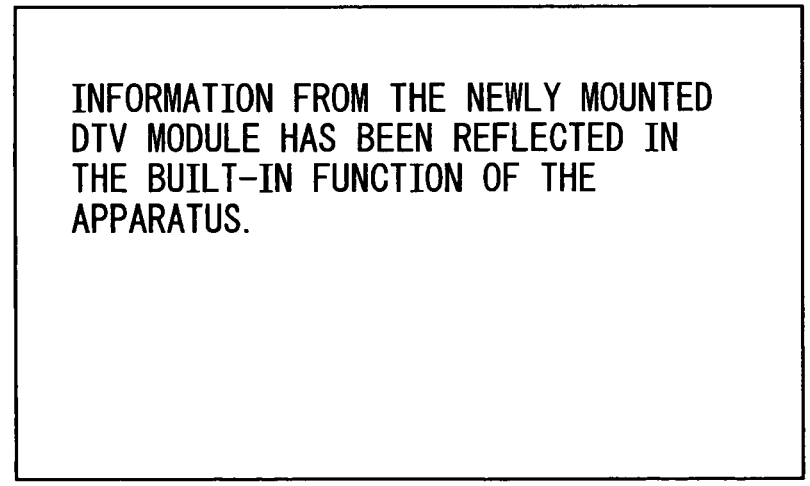

On the other hand, when the set button 256 in FIG. 6(b) is selected to effect its associated setting, the control unit 101, after detecting the new module, automatically proceeds to execute S14 in FIG. 5 to perform the interlinking operation for interlinking between the in-vehicle apparatus 100 and the module. FIG. 7(b) shows an example of the confirmation screen displayed on the display unit 10 in that case. The same applies for the case where the set button 262 in FIG. 6(c) is selected to effect its associated setting.

When the set button 257 in FIG. 6(b) is selected to effect its associated setting, an operation button is displayed for making a selection as to whether the interlinking operation is to be executed for the received information. The same applies for the case where the set button 263 in FIG. 6(c) is selected to effect its associated setting.

FIG. 8 is a diagram showing an example of the operation button displayed in accordance with the setting made by the set button 257 shown in FIG. 6(b).

Figure 8A:
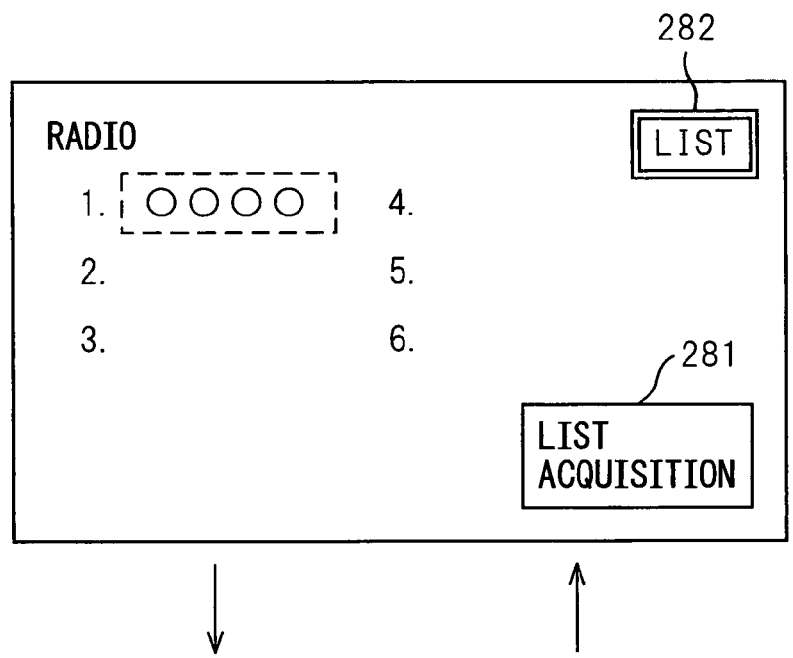
FIGS. 8(a) and 8(b) are diagram showing a display screen example (2) relating to the interlinking.

Assuming the situation where the first module 200 for DTV and the second module 300 for navigation are mounted in the in-vehicle apparatus 100, as shown in FIG. 1, and where the user uses the AM/FM tuner module 121 in the in-vehicle apparatus 100, FIG. 8 shows how the vehicle's current location information is acquired from the second module 300 and how the radio stations that match the current location information are displayed in the form of a radio station list. When the set button 257 in FIG. 6(b) is selected, a "LIST ACQUISITION" button 281 is displayed on the radio station list creating screen shown in FIG. 8(a).

Figure 8B:
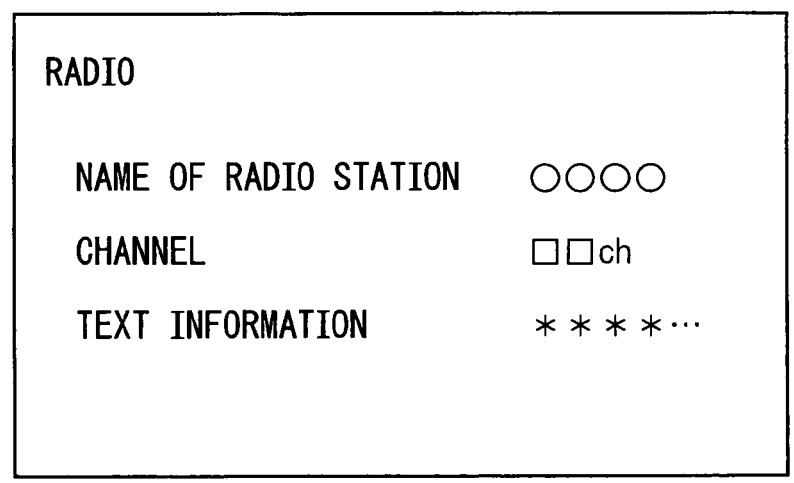

When the "LIST ACQUISITION" button 281 shown in FIG. 8(a) is selected by the user, the control unit 101 acquires the vehicle's current location information from the second module 300, and creates the radio station list by referring to the area-specific radio station information prestored in the ROM 103. While the list is being created, the detailed information of each selected radio station is displayed as shown in FIG. 8(b). At this time, the screen of FIG. 7(a) or 7(b) is superimposed on the screen of FIG. 8(b) (onscreen display).

While the screen is changing from FIG. 8(a) to FIG. 8(b) in this way, the radio station list that matches the vehicle's current location is created. The "LIST ACQUISITION" button 281 in FIG. 8(a) is shown in the ON state, and an indication "LIST" 282 shown in FIG. 8(a) indicates that the apparatus and the module are in an interlinked state.

On the other hand, when the set button 258 in FIG. 6(b) is selected to effect its associated setting, the interlinking operation is automatically started without displaying the operation button for making a selection as to whether the interlinking operation is to be executed for the received information. More specifically, the "LIST ACQUISITION" button 281 is not displayed, but only the indication "LIST" 282 is displayed on the radio station list creating screen shown in FIG. 8(a); in this condition, the radio station list that matches the vehicle's current location is created while the screen is changing from FIG. 8(a) to FIG. 8(b). The same applies for the case where the set button 264 in FIG. 6(c) is selected to effect its associated setting.

FIG. 8 shows an example in which the interlinking operation is performed so as to acquire the necessary information from the second module 300 in order to implement the built-in function (the AM/FM radio receiving function) of the in-vehicle apparatus 100. In another example of such interlinking operation, a DTV broadcast station list or area-specific information or the like is acquired from the second module 300 for DTV in order to create the radio station shown in FIG. 8(a).

FIG. 9 is a diagram showing another example of the operation button displayed in accordance with the setting made by the set button 257 shown in FIG. 6(b).

Figure 9A:
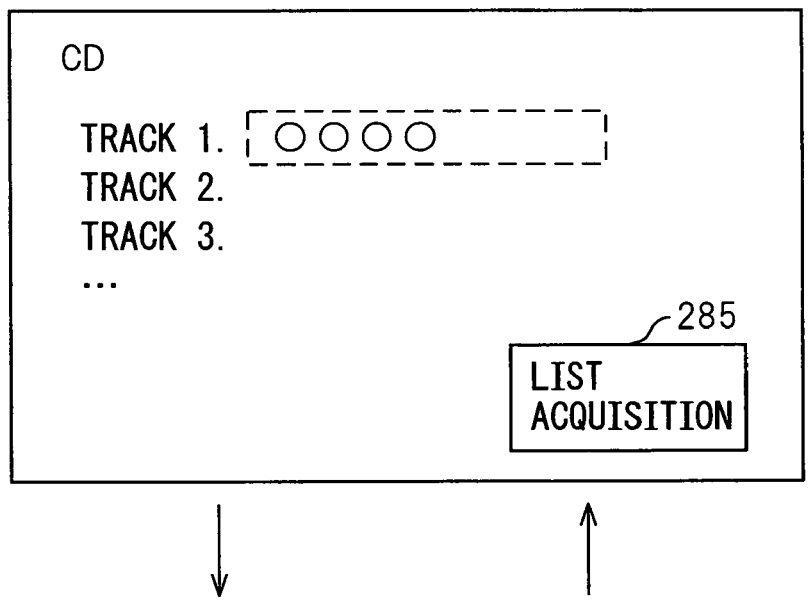
FIGS. 9(a) and 9(b) are diagram showing a display screen example (3) relating to the interlinking.

Assuming the situation where the first module 200 for DTV and the second module 300 for navigation are mounted in the in-vehicle apparatus 100, as shown in FIG. 1, and where the user uses the CD/DVD deck 90 externally connected to the in-vehicle apparatus 100, FIG. 9 shows how DTV text information and/or audio information are acquired from the first module 200 and how the related music tracks are selected, announced, and replayed. When the set button 257 in FIG. 6(b) is selected, a "LIST ACQUISITION" button 285 is displayed on the music track list creating screen shown in FIG. 9(a).

Figure 9B:
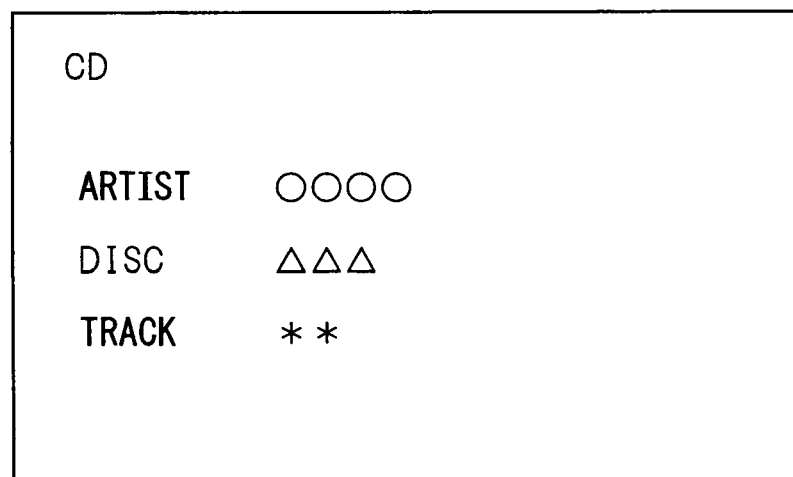

When the "LIST ACQUISITION" button 285 shown in FIG. 9(a) is selected by the user, the control unit 101 acquires the DTV text information and/or audio information from the first module 200, and creates the list by selecting the music tracks related to the acquired DTV text information and/or audio information from among the tracks recorded on the CD inserted in the CD/DVD deck 90. While the list is being created, the detailed information of each selected music track is displayed as shown in FIG. 9(b). At this time, the screen of FIG. 7(a) or 7(b) is superimposed on the screen of FIG. 9(b) (onscreen display). While the screen is changing from FIG. 9(a) to FIG. 9(b) in this way, the list of the music tracks related to the DTV text information and/or audio information is created. The "LIST ACQUISITION" button 285 in FIG. 9(a) is shown in the OFF state; since the apparatus and the module are not in an interlinked state at this point in time, the indication "LIST" 282 shown in FIG. 8(a) is not displayed on the screen shown in FIG. 9(a).

On the other hand, when the set button 258 in FIG. 6(b) is selected to effect its associated setting, the interlinking operation is automatically started without displaying the operation button for making a selection as to whether the interlinking operation is to be executed for the received information. More specifically, the "LIST ACQUISITION" button 285 is not displayed, but only the indication "LIST" 282 shown in FIG. 8(a) is displayed on the music track list creating screen shown in FIG. 9(a); in this condition, the music track list that matches the vehicle's current location is created while the screen is changing from FIG. 9(a) to FIG. 9(b).

FIG. 9 shows an example in which the interlinking operation is performed so as to acquire the necessary information from the first module 200 in order to implement the built-in function (the CD/DVD playback function) of the in-vehicle apparatus 100.

FIG. 10 is a diagram showing still another example of the operation button displayed in accordance with the setting made by the set button 257 shown in FIG. 6(b).

Assuming the situation where the first module 200 for DTV and the second module 300 for navigation are mounted in the in-vehicle apparatus 100, as shown in FIG. 1, and where the user uses the navigation function provided by the second module 300, FIG. 10 shows how a navigation destination is set by using the text information and/or audio information of the radio being output from the AM/FM tuner module 121 built into the in-vehicle apparatus 100.

Figure 10A:
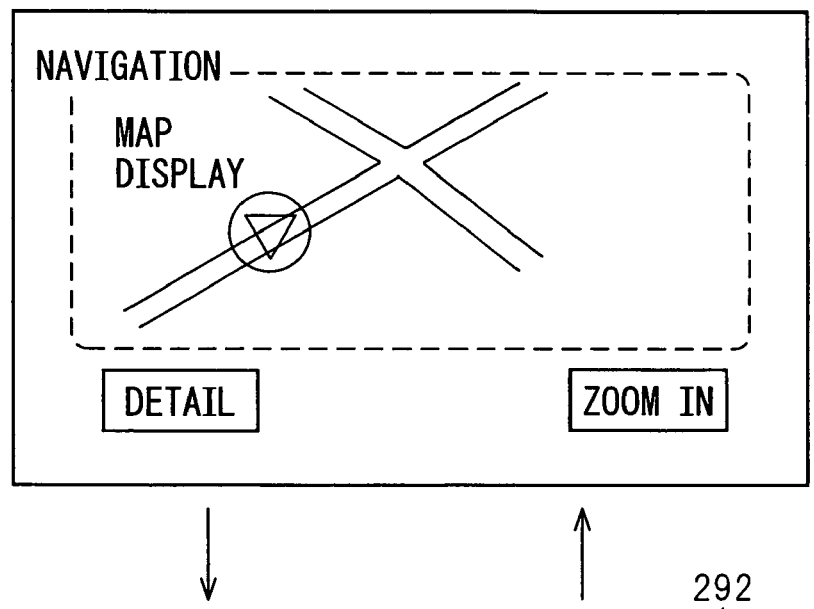
FIGS. 10(a) and 10(b) are diagram showing a display screen example (4) relating to the interlinking.
Figure 10B:
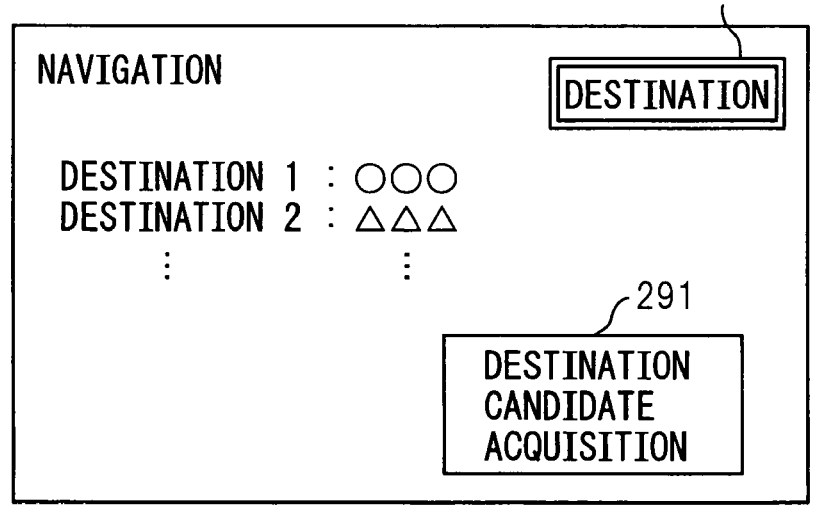

When a prescribed operation for setting a destination is performed with the map information displayed as shown in FIG. 10(a), the screen of FIG. 7(a) or 7(b) is superimposed on the screen of FIG. 10(a) (onscreen display). Here, when the select button 271 is selected, the destination selection screen shown in FIG. 10(b) is displayed. When the set button 257 in FIG. 6(b) is selected, a "DESTINATION CANDIDATE ACQUISITION" button 291 is displayed on the destination selection screen shown in FIG. 10(b).

When the user selects the "DESTINATION CANDIDATE ACQUISITION" button 291 shown in FIG. 10(b), the control unit 101 creates a destination candidate list on screen by using the text information and/or audio information of the radio being output from the AM/FM tuner module 121. The "DESTINATION CANDIDATE ACQUISITION" button 291 in FIG. 10(a) is shown in the ON state, and an indication "DESTINATION" 292 shown in FIG. 10(a) indicates that the apparatus and the module are in an interlinked state.

On the other hand, when the set button 258 in FIG. 6(b) is selected to effect its associated setting, the interlinking operation is automatically started without displaying the operation button for making a selection as to whether the interlinking operation is to be executed or not. More specifically, the "DESTINATION CANDIDATE ACQUISITION" button 291 is not displayed, but only the indication "DESTINATION" 292 is displayed on the destination candidate list creating screen shown in FIG. 10(b), and in this condition, the destination candidate list is created on screen.

FIG. 10 shows an example in which the interlinking operation is performed so as to acquire the necessary information from the in-vehicle apparatus 100 in order to implement the function (the navigation function) provided by the second module.

Figure 11A:
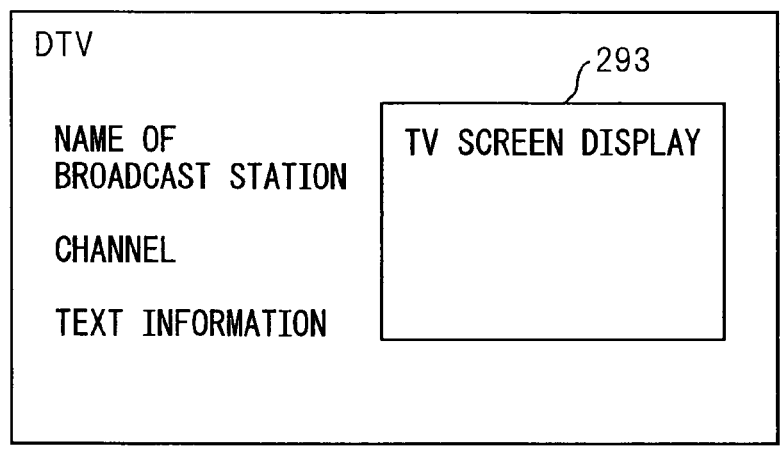
FIGS. 11(a) and 11(b) are diagram showing a display screen example (5) relating to the interlinking.
Figure 11B:
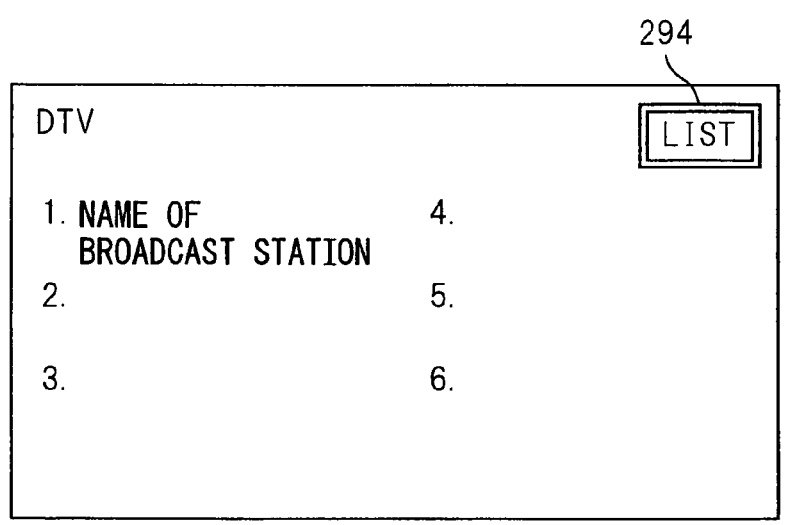

FIG. 11 is a diagram showing yet another example of the operation button displayed in accordance with the setting made by the set button 257 shown in FIG. 6(b).

Assuming the situation where the first module 200 for DTV and the second module 300 for navigation are mounted in the in-vehicle apparatus 100, as shown in FIG. 1, and where the user uses the DTV function provided by the first module 200, FIG. 11 shows how a program list is created by retrieving attribute information associated with the CD inserted in the CD/DVD deck 90 externally connected to the in-vehicle apparatus 100 and by searching for the programs related to the attribute information (for example, a list is created of the programs in which the artist of the CD appears).

When a prescribed operation for channel selection is performed with a TV screen display 293 produced as shown in FIG. 11(*a*), the screen of FIG. 7(*a*) or 7(*b*) is superimposed on the screen of FIG. 11(*a*) (onscreen display). Here, when the select button 271 is selected, the program list creating screen shown in FIG. 11(*b*) is displayed. When the set button 258 in FIG. 6(*b*) is selected, a button corresponding to the "DESTINATION CANDIDATE ACQUISITION" button 291 shown in FIG. 10 is not displayed here, and the list of the programs related to the CD attribute information is automatically created by using the CD attribute information.

As shown in FIG. 11(*b*), the DTV program list is created on screen by using the CD attribute information from the CD/DVD deck 90. The indication "LIST" 294 shown in FIG. 11(*b*) indicates that the apparatus and the module are in an interlinked state.

FIG. 11 shows an example in which the interlinking operation is performed so as to acquire the necessary information from the in-vehicle apparatus 100 in order to implement the function (the DTV function) provided by the first module.

Further, with the first module 200 for DTV already mounted in the in-vehicle apparatus 100 as shown in FIG. 1, when the second module 300 for navigation is newly mounted, and when the user uses the navigation function provided by the second module, the destination candidate list can also be created by using the DTV text information and/or audio information from the first module 200. That is, the interlinking operation can be performed so as to acquire the necessary information from the already mounted first module in order to implement the function (the navigation function) provided by the newly mounted second module. The initial setup and set button display, etc. in this case can be produced in the same manner as in FIG. 6.

Furthermore, with the first module 200 for DTV already mounted in the in-vehicle apparatus 100 as shown in FIG. 1, when the second module 300 for navigation is newly mounted, and when the user uses the DTV function provided by the first module, the DTV program list can also be created by using the vehicle's current location information from the second module 300. That is, the interlinking operation can be performed so as to acquire the necessary information from the newly mounted second module in order to implement the function (the DTV function) provided by the already mounted first module. The initial setup and set button display, etc. in this case can be produced in the same manner as in FIG. 11. As a matter of course, it is also possible to perform the interlinking operation between a plurality of already mounted modules in accordance with a prescribed operation.

When the set button 259 in FIG. 6(*b*) is selected to effect its associated setting, a message inquiring whether the setup is to be redone or not is displayed, for example, when there is no setup information shown in FIG. 6(*a*), when there is no setup information indicated at the set buttons 255 to 258 in FIG. 6(*b*), or when the setup information differs from that of the module. On the other hand, when the set button 260 in FIG. 6(*b*) is selected to effect its associated setting, the message for prompting the user to redo the setup is not displayed even when there is no setup information shown in FIG. 6(*a*), when there is no setup information indicated at the set buttons 255 to 258 in FIG. 6(*b*), or when the setup information differs from that of the module.

When the set button 265 in FIG. 6(*c*) is selected to effect its associated setting, a message inquiring whether the setup is to be redone or not is displayed, for example, when there is no setup information shown in FIG. 6(*a*), when there is no setup information indicated at the set buttons 261 to 264 in FIG. 6(*c*), or when the setup information differs from that of the module. On the other hand, when the set button 266 in FIG. 6(*c*) is selected to effect its associated setting, the message for prompting the user to redo the setup is not displayed even when there is no setup information shown in FIG. 6(*a*), when there is no setup information indicated at the set buttons 261 to 264 in FIG. 6(*c*), or when the setup information differs from that of the module.

As described above, by interlinking between the in-vehicle apparatus 100 and each mounted module and/or between the modules, and thereby sharing information between them, highly advanced and complex control can be achieved for the entire in-vehicle system.

FIG. 12 is a diagram (2) showing one example of the external appearance of the in-vehicle apparatus 100. FIG. 12(*a*) shows one example of the external appearance of the front panel of the in-vehicle apparatus 100, FIG. 12(*b*) shows a condition in which a door 160 on the front panel is opened, and FIG. 12(*c*) shows the external appearance of the frame member 150 of the in-vehicle apparatus 100 as viewed from the side thereof. The construction shown in FIG. 12 can be applied to the in-vehicle apparatus and in-vehicle system of the present invention.

The difference between FIGS. 2 and 12 is that the first and second slots 130 and 140 are normally hidden behind the push-type door 160 which opens when its front surface is pushed. The provision of the door 160 serves to prevent dirt, etc. from entering the first and second slots 130 and 140 through the front openings thereof. As in the case of FIG. 2, each module is inserted and ejected in directions indicated by arrow A in FIG. 12(*c*) (that is, in directions perpendicular to the front panel).

FIG. 13 is a diagram (3) showing one example of the external appearance of the in-vehicle apparatus 100. FIG. 13(*a*) shows one example of the external appearance of the front panel of the in-vehicle apparatus 100, and FIG. 13(*b*) shows the external appearance of the frame member 150 of the in-vehicle apparatus 100 as viewed from the side thereof. The construction shown in FIG. 13 can be applied to the in-vehicle apparatus and in-vehicle system of the present invention.

The difference between FIGS. 2 and 13 is that three slots for three modules, i.e., the first module 200, the second module 300, and the third module 400, are provided in the front side. As in the case of FIG. 2, each module is inserted and ejected in directions indicated by arrow A in FIG. 13(*b*) (that is, in directions perpendicular to the front panel).

Figure 14A:
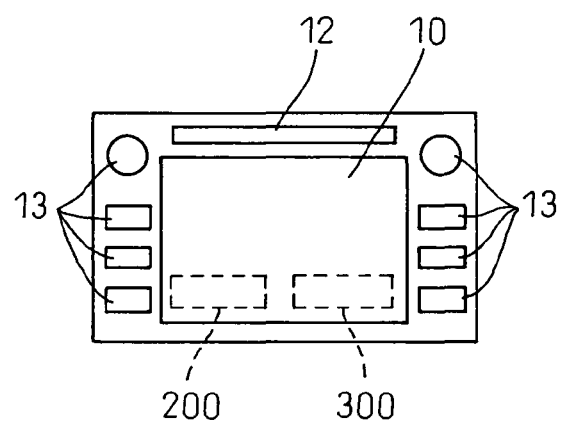
FIG. 14(a) is a diagram showing one example of the external appearance of the front panel of the in-vehicle apparatus 100.
Figure 14B:
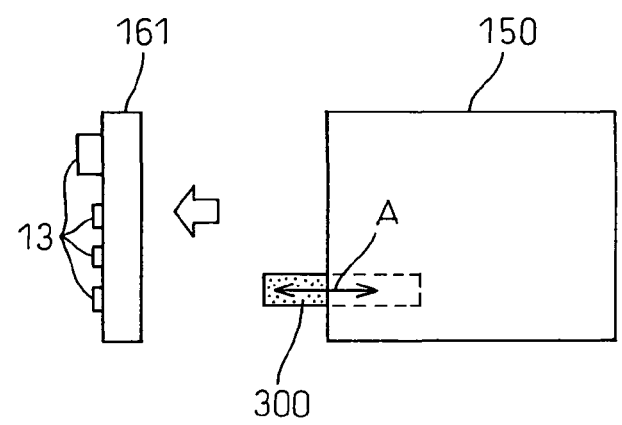
FIG. 14(b) is a diagram showing the external appearance of the frame member 150 of the in-vehicle apparatus 100 as viewed from the side thereof.

FIG. 14 is a diagram (4) showing one example of the external appearance of the in-vehicle apparatus 100. FIG. 14(*a*) shows one example of the external appearance of the front panel of the in-vehicle apparatus 100, and FIG. 14(*b*) shows the external appearance of the frame member 150 of the in-vehicle apparatus 100 as viewed from the side thereof. The construction shown in FIG. 14 can be applied to the in-vehicle apparatus and in-vehicle system of the present invention.

The difference between FIGS. 2 and 14 is that the entire structure of the front panel 161 is detachable from the frame member 150. When the front panel 161 is detached, the first slot 130 and second slot 140 are exposed, allowing the first module 200 and second module to be inserted and ejected. As in the case of FIG. 2, each module is inserted and ejected in directions indicated by arrow A in FIG. 14(*b*) (that is, in directions perpendicular to the front panel 161).

FIG. 15 is a diagram (5) showing one example of the external appearance of the in-vehicle apparatus 100. FIG. 15(*a*) shows one example of the external appearance of the front panel of the in-vehicle apparatus 100, and FIG. 15(*b*)

shows the external appearance of the frame member 150 of the in-vehicle apparatus 100 as viewed from the side thereof. The construction shown in FIG. 15 can be applied to the in-vehicle apparatus and in-vehicle system of the present invention.

The difference between FIGS. 14 and 15 is that the front panel 161 is detached by first removing some of the operation buttons 13 and then removing fasteners such as screws by using a jig. When the front panel 161 is detached, the first slot 130 and second slot 140 are exposed, allowing the first module 200 and second module to be inserted and ejected. As in the case of FIG. 2, each module is inserted and ejected in directions indicated by arrow A in FIG. 15(*b*) (that is, in directions perpendicular to the front panel 161).

Figure 16A:
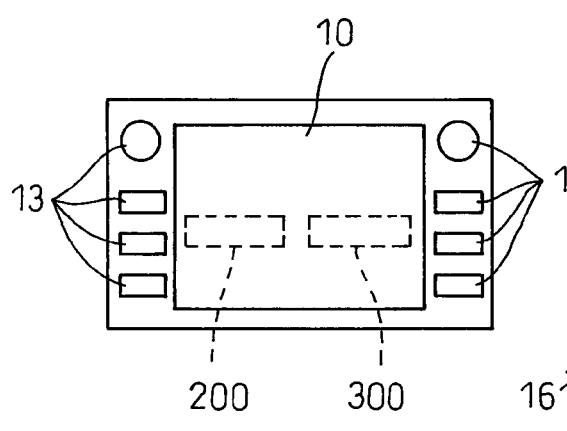
FIG. 16(a) is a diagram showing one example of the external appearance of the front panel of the in-vehicle apparatus 100.
Figure 16B:
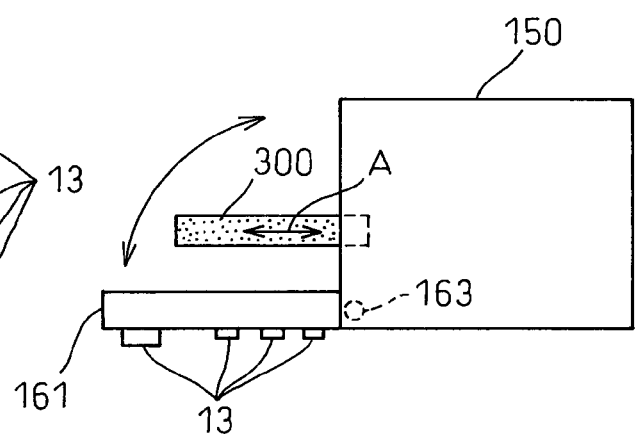
FIG. 16(b) is a diagram showing the external appearance of the frame member 150 of the in-vehicle apparatus 100 as viewed from the side thereof.

FIG. 16 is a diagram (6) showing one example of the external appearance of the in-vehicle apparatus 100. FIG. 16(*a*) shows one example of the external appearance of the front panel of the in-vehicle apparatus 100, and FIG. 16(*b*) shows the external appearance of the frame member 150 of the in-vehicle apparatus 100 as viewed from the side thereof. The construction shown in FIG. 16 can be applied to the in-vehicle apparatus and in-vehicle system of the present invention.

The difference between FIGS. 2 and 16 is that the entire structure of the front panel 161 can be turned 90 degrees relative to the frame member 150 by means of a hinge mechanism 163. When the front panel 161 is turned to the position of FIG. 16(*b*), the first slot 130 and second slot 140 are exposed, allowing the first module 200 and second module to be inserted and ejected. As in the case of FIG. 2, each module is inserted and ejected in directions indicated by arrow A in FIG. 16(*b*) (that is, in directions perpendicular to the front panel 161).

FIG. 17 is a diagram (7) showing one example of the external appearance of the in-vehicle apparatus 100. FIG. 17(*a*) shows one example of the external appearance of the front panel of the in-vehicle apparatus 100, and FIGS. 17(*b*) and 17(*c*) each show the external appearance of the frame member 150 of the in-vehicle apparatus 100 as viewed from the side thereof. The construction shown in FIG. 17 can be applied to the in-vehicle apparatus and in-vehicle system of the present invention.

The difference between FIGS. 2 and 17 is that the front panel 161 has a tilt mechanism which, using an auxiliary member 164, turns the entire structure of the front panel 161 substantially 90 degrees relative to the frame 150. When the front panel 161 is turned from the position of FIG. 17(*b*) to the position of FIG. 17(*c*), the first slot 130 and second slot 140 are exposed, allowing the first module 200 and second module to be inserted and ejected. As in the case of FIG. 2, each module is inserted and ejected in directions indicated by arrow A in FIG. 17(*c*) (that is, in directions perpendicular to the front panel 161).

FIG. 18 is a diagram (8) showing one example of the external appearance of the in-vehicle apparatus 100. FIG. 18(*a*) shows one example of the external appearance of the front panel of the in-vehicle apparatus 100, and FIG. 18(*b*) shows the external appearance of the frame member 150 of the in-vehicle apparatus 100 as viewed from the side thereof. The construction shown in FIG. 18 can be applied to the in-vehicle apparatus and in-vehicle system of the present invention.

The differences between FIGS. 2 and 18 are that the shape of the front panel 170 is different and that the first slot 130 and second slot 140 are arranged side by side in the upper part of the front panel 170. As in the case of FIG. 2, each module is inserted and ejected in directions indicated by arrow A in FIG. 18(*b*) (that is, in directions perpendicular to the front panel 170). Here, the display unit 10 has a tilt mechanism using an auxiliary member 171, and the CD/DVD can be inserted and ejected using the open space created by turning the display unit 10.

FIG. 19 is a diagram (9) showing one example of the external appearance of the in-vehicle apparatus 100. FIG. 19(*a*) shows one example of the external appearance of the front panel of the in-vehicle apparatus 100, and FIG. 19(*b*) shows the external appearance of the frame member 150 of the in-vehicle apparatus 100 as viewed from the side thereof. The construction shown in FIG. 19 can be applied to the in-vehicle apparatus and in-vehicle system of the present invention.

The only difference between FIGS. 18 and 19 is that a door 172 detachable from the front panel 170 is provided on the front side of the first and second slots 130 and 140. As in the case of FIG. 2, each module is inserted and ejected in directions indicated by arrow A in FIG. 19(*b*) (that is, in directions perpendicular to the front panel 170).

FIG. 20 is a diagram (10) showing one example of the external appearance of the in-vehicle apparatus 100. FIG. 20(*a*) shows one example of the external appearance of the front panel of the in-vehicle apparatus 100, FIG. 20(*b*) shows a condition in which both side portions 180 and 181 of the front panel are opened, and FIG. 20(*c*) shows the external appearance of the frame member 150 of the in-vehicle apparatus 100 as viewed from the side thereof. The construction shown in FIG. 20 can be applied to the in-vehicle apparatus and in-vehicle system of the present invention.

The difference between FIGS. 2 and 20 is that the side portions 180 and 181 of the front panel can be opened separately as shown in FIG. 20(*b*) to expose the first slot 130 and second slot 140, respectively, allowing the first module 200 and second module to be inserted and ejected. As in the case of FIG. 2, each module is inserted and ejected in directions indicated by arrow A in FIG. 20(*c*) (that is, in directions perpendicular to the front panel).

Figure 21A:
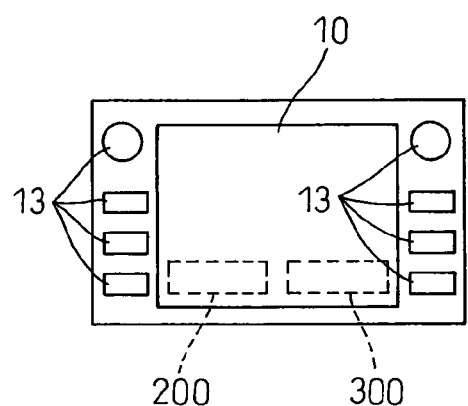
FIG. 21(a) is a diagram showing one example of the external appearance of the front panel of the in-vehicle apparatus 100.
Figure 21B:
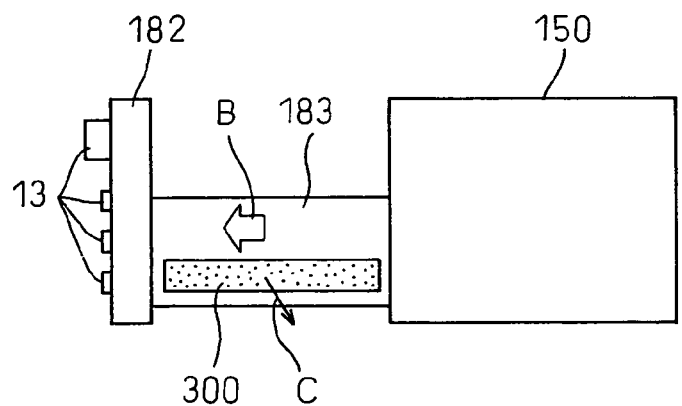
FIG. 21(b) is a diagram showing the external appearance of the frame member 150 of the in-vehicle apparatus 100 as viewed from the side thereof.

FIG. 21 is a diagram (11) showing one example of the external appearance of the in-vehicle apparatus 100. FIG. 21(*a*) shows one example of the external appearance of the front panel of the in-vehicle apparatus 100, and FIG. 21(*b*) shows the external appearance of the frame member 150 of the in-vehicle apparatus 100 as viewed from the side thereof. The construction shown in FIG. 21 can be applied to the in-vehicle apparatus and in-vehicle system of the present invention.

The difference between FIGS. 2 and 21 is that the front panel 182 is movable in the direction of arrow B by means of a sliding mechanism 183 to expose the first slot 130 and second slot 140 provided in the sliding mechanism 183, allowing the first module 200 and second module to be inserted and ejected. Each module is inserted and ejected in directions indicated by arrow C in FIG. 21(*b*) (that is, sideways with respect to the front panel).

Figure 22A:
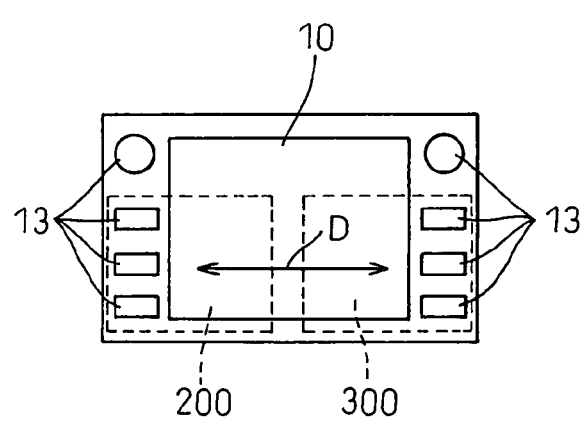
FIG. 22(a) is a diagram showing one example of the external appearance of the front panel of the in-vehicle apparatus 100.
Figure 22B:
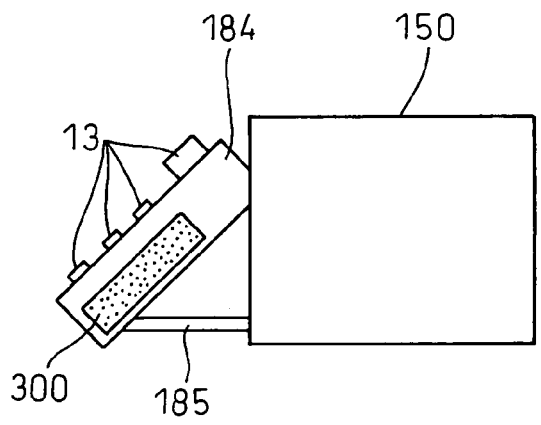
FIG. 22(b) is a diagram showing the external appearance of the frame member 150 of the in-vehicle apparatus 100 as viewed from the side thereof.
Figure 24A:
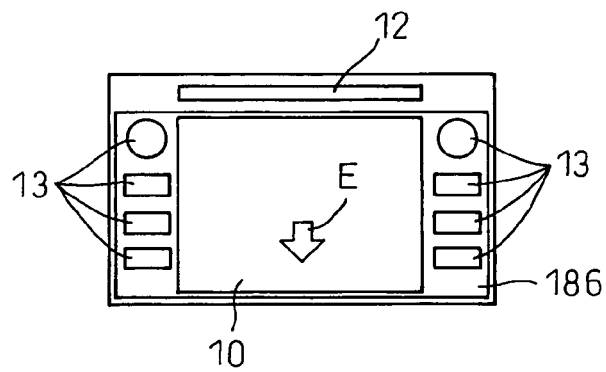
FIGS. 24(a) and 24(c) are diagrams each showing one example of the external appearance of the front panel of the in-vehicle apparatus 100.
Figure 24B:
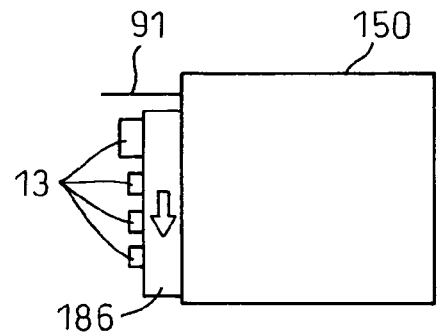
FIG. 24(b) is a diagram showing the external appearance of the frame member 150 of the in-vehicle apparatus 100 in the condition of FIG. 24(a) as viewed from the side thereof.
Figure 24C:
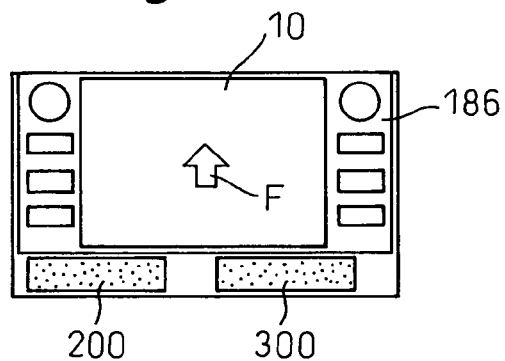
Figure 24D:
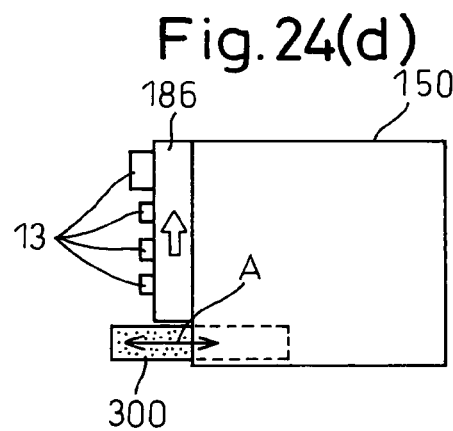
FIG. 24(d) is a diagram showing the external appearance of the frame member 150 of the in-vehicle apparatus 100 in the condition of FIG. 24(c) as viewed from the side thereof.

FIG. 22 is a diagram (12) showing one example of the external appearance of the in-vehicle apparatus 100. FIG. 22(*a*) shows one example of the external appearance of the front panel of the in-vehicle apparatus 100, and FIG. 22(*b*) shows the external appearance of the frame member 150 of the in-vehicle apparatus 100 as viewed from the side thereof. The construction shown in FIG. 22 can be applied to the in-vehicle apparatus and in-vehicle system of the present invention.

The difference between FIGS. 2 and 22 is that the front panel 184 has a tilt mechanism using an auxiliary member 185. When the front panel 184 is tilted as shown in FIG. 22(*b*), the first slot 130 and second slot 140 provided in the front panel 184 are exposed, allowing the first module 200 and second module to be inserted and ejected. Each module is inserted and ejected in directions indicated by arrow D in FIG. 22(a) (that is, sideways with respect to the front panel).

FIG. 23 is a diagram (13) showing one example of the external appearance of the in-vehicle apparatus 100. FIG. 23(a) shows one example of the external appearance of the front panel of the in-vehicle apparatus 100, and FIG. 23(b) shows the external appearance of the frame member 150 of the in-vehicle apparatus 100 as viewed from the side thereof. The construction shown in FIG. 23 can be applied to the in-vehicle apparatus and in-vehicle system of the present invention.

The difference between FIGS. 2 and 23 is that the first slot 130 and second slot 140 are provided on the opposite side of the frame member 150 from the front panel. Each module is inserted and ejected in directions indicated by arrow A in FIG. 23(b) (that is, in directions perpendicular to the front panel).

FIG. 24 is a diagram (14) showing one example of the external appearance of the in-vehicle apparatus 100. FIGS. 24(a) and 24(c) each show one example of the external appearance of the front panel of the in-vehicle apparatus 100, FIG. 24(b) shows the external appearance of the frame member 150 of the in-vehicle apparatus 100 in the condition of FIG. 24(a) as viewed from the side thereof, and FIG. 24(d) shows the external appearance of the frame member 150 of the in-vehicle apparatus 100 in the condition of FIG. 24(c) as viewed from the side thereof. The construction shown in FIG. 24 can be applied to the in-vehicle apparatus and in-vehicle system of the present invention.

In the example of FIG. 24, when the front panel 186 is pushed downward in the direction of arrow E, the CD/DVD insertion slot 12 is exposed, allowing the CD/DVD 91 to be inserted and ejected. When the front panel 186 is pushed upward in the direction of arrow F, the first slot 130 and second slot 140 are exposed, allowing the first module 200 and second module 300 to be inserted and ejected. As in the case of FIG. 2, each module is inserted and ejected in directions indicated by arrow A in FIG. 24(d) (that is, in directions perpendicular to the front panel).

Figure 25:
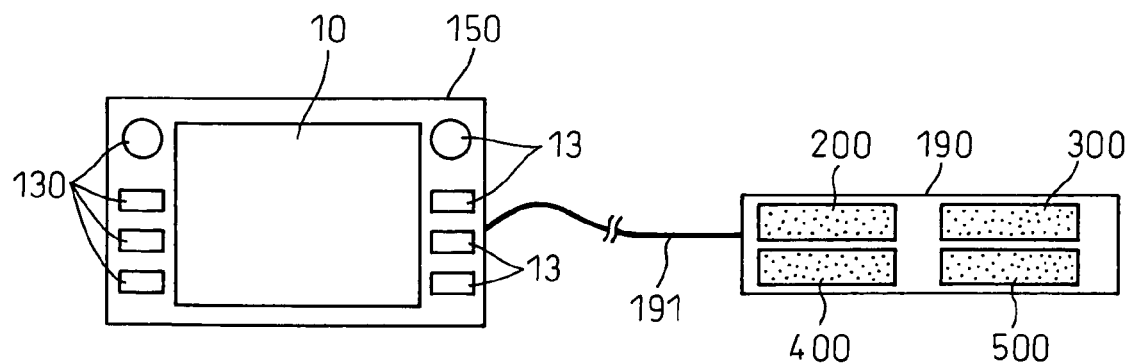
FIG. 25 is a diagram (15) showing one example of the external appearance of the in-vehicle apparatus 100.

FIG. 25 is a diagram (15) showing one example of the external appearance of the in-vehicle apparatus 100. The construction shown in FIG. 25 can be applied to the in-vehicle apparatus and in-vehicle system of the present invention.

In the example of FIG. 25, the in-vehicle system includes a separated module section 190 which is connected to the frame member 150 via a cable 191, and which has four slots for accommodating the first to fourth modules 200 to 500, respectively. The module section 190 can be placed, for example, in the trunk of the vehicle. By providing the module section 190 separately, the space for inserting and ejecting the modules can be easily secured.

Figure 26:
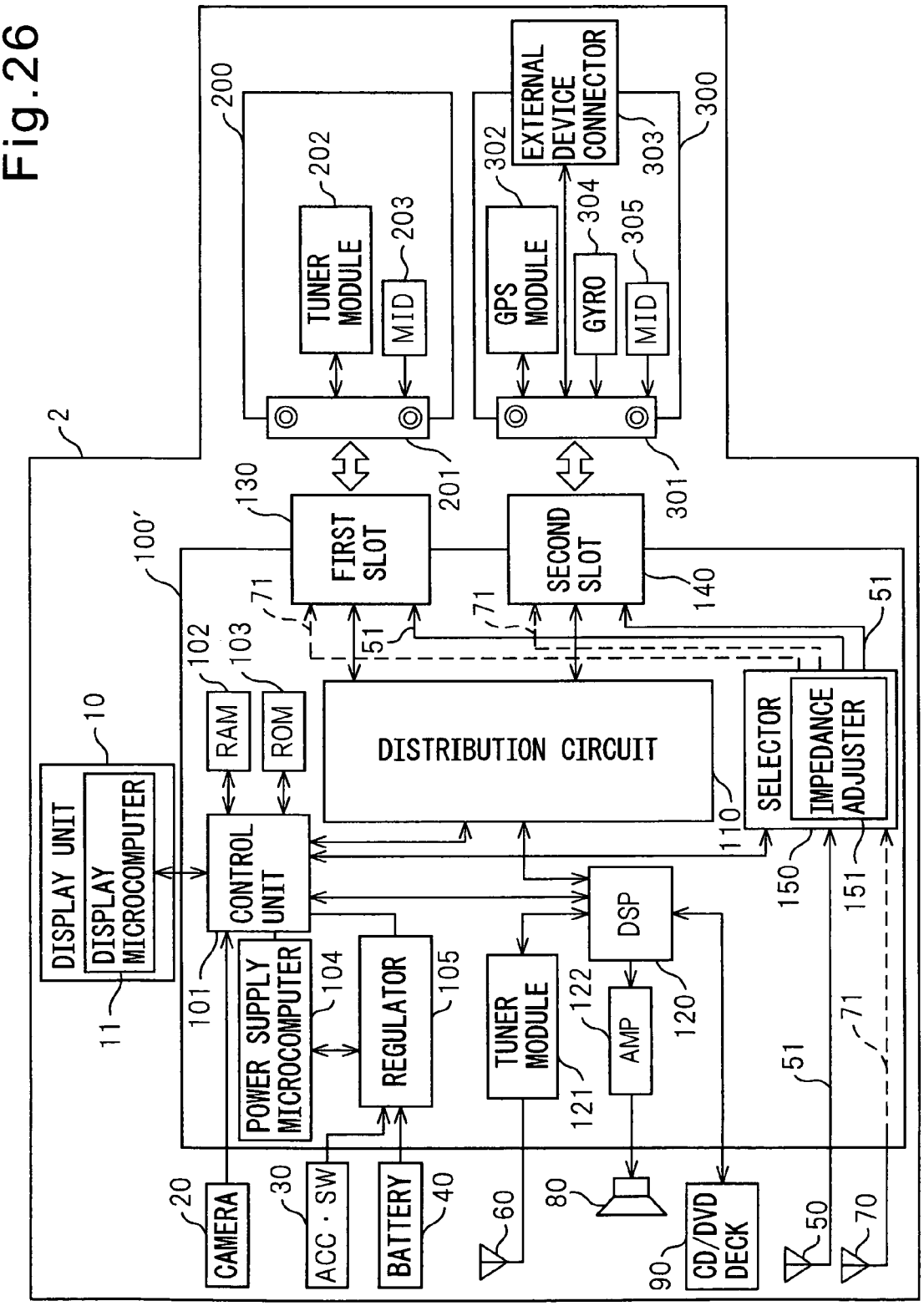
FIG. 26 is a diagram schematically showing the configuration of an alternative in-vehicle system 2.

FIG. 26 is a diagram schematically showing the configuration of an alternative in-vehicle system 2.

In the alternative in-vehicle system 2, the same components as those in the in-vehicle system 1 are designated by the same reference numerals, and will not be further described herein. The difference between the in-vehicle apparatus 100' in the alternative in-vehicle system 2 and the in-vehicle apparatus 100 in the in-vehicle system 1 is that the in-vehicle apparatus 100' further includes a selector circuit 150.

The in-vehicle apparatus 100' includes a control unit 101 constructed from a main microcomputer or the like, a RAM 102, a ROM 103, a power supply microcomputer 104; a regulator 105 for supplying power to the various component elements and modules of the in-vehicle apparatus 100', and for providing protection against overcurrent and/or overvoltage, a distribution circuit 110 for controlling signal transfers to and from the modules, etc., a digital signal processor (DSP) 120 for processing video signals and/or audio signals; a tuner module 121 for receiving AM/FM broadcasts, an amplifier 122 for amplifying an audio signal for output to the speaker 80, a first slot 130 for connecting the first module, a second slot 140 for connecting the second module, and the selector circuit 150 for switching signal paths between the DTV antenna 50 and GPS antenna 70 and the first slot 130 and second slot 140, and for performing impedance matching, etc.

The in-vehicle apparatus 100' may be constructed in integral fashion with one or more units selected from among the display unit 10, the camera 20, and the CD/DVD playback deck 90. Further, the AM/FM tuner module 121 built into the in-vehicle apparatus 100' in FIG. 26 may be provided as a separate unit outside the in-vehicle apparatus 100', just like the CD/DVD playback deck 90 is, or may be implemented as one of the function expansion modules.

The first module 200 is a one-segment DTV module which, in the configuration of the alternative in-vehicle system 2 shown in FIG. 26, is mounted in the in-vehicle apparatus 100' by plugging a first connector 201 into the first slot 130. The first module 200 includes, in addition to the connector 201, a DTV tuner module 202 and a first MID output circuit 203 in which the module ID (MID) is stored.

In the first MID output circuit 203, a combination of an ID (for example, 001), which indicates that the first module is a one-segment DTV module, and an ID (for example, X), which indicates that the first module is a broadcast-related module that receives a radio frequency signal from the DTV antenna 50, is stored as the module ID (for example, "001-X").

The selector circuit 150 normally selects the radio frequency signal line 51 from the DTV antenna 50 for connection to the first slot 130. As a result, the radio frequency signal received by the DTV antenna 50 is delivered via the first slot 130 to the tuner module 202 contained in the first module 200. The digital video signal corresponding to the channel selected by the tuner module 202 in the first module 200 is transferred via the first slot 103 to the control unit 101 through the distribution circuit 110, and the corresponding digital audio signal is transferred via the first slot 103 to the DSP 120 through the distribution circuit 110. Thus, according to the in-vehicle apparatus 100' equipped with the first module 200, the video and audio of the received one-segment DTV broadcast can be displayed on the display unit 10 and reproduced through the speaker 80, respectively. The control unit 101 also receives the MID from the first MID output circuit 203 via the first slot 130 and the distribution circuit 110. In this way, the function not originally built into the in-vehicle apparatus 100' is added by mounting the first module 200 (that is, the capabilities are expanded).

The second module 300 is a navigation module which, in the configuration of the alternative in-vehicle system 2 shown in FIG. 26, is mounted in the in-vehicle apparatus 100' by plugging a second connector 301 into the second slot 140. The second module 300 includes, in addition to the second connector 301, a GPS module 302 for measuring the current location of the vehicle, an external device connector 303 for connecting an external storage device such as an SD memory card on which navigation map information, etc. are stored, a gyro module 304 used to check the heading direction of the vehicle, etc., and a second MID output circuit 305 in which the MID is stored.

In the second MID output circuit 305, a combination of an ID (for example, 002), which indicates that the second module is a navigation module, and an ID (for example, Y), which indicates that the second module is a communication-related module that receives a signal from the GPS antenna 60, is stored as the module ID (for example, "002-Y").

The selector circuit 150 normally selects the signal line 71 from the GPS antenna 70 for connection to the second slot 140. As a result, the signal received by the GPS antenna 70 is delivered via the second slot 140 to the GPS module 302 contained in the second module 300. The vehicle's current location information output from the GPS module 302 in the second module 300, the map information received via the external device connector 303, the vehicle state information output from the gyro module 304, etc. are transferred via the second slot 140 to the control unit 101 through the control unit 101. Thus, according to the in-vehicle apparatus 100, equipped with the second module 300, a navigational display using the map information can be displayed on the display unit 10, while monitoring the current location of the vehicle. The control unit 101 also receives the MID from the second MID output circuit 305 via the second slot 140 and the distribution circuit 110. In this way, the function not originally built into the in-vehicle apparatus 100' is added by mounting the second module 300 (that is, the capabilities are expanded).

As described above, the selector circuit 150 normally selects the radio frequency signal line 51 from the DTV antenna 50 for connection to the first slot 130 and the signal line 71 from the GPS antenna 70 for connection to the second slot 140. However, the selector circuit 150 can select the radio frequency signal line 51 from the DTV antenna 50 for connection to the second slot 140 or to both the first slot 130 and the second slot 140 in accordance with a control signal from the control unit 101. Further, the selector circuit 150 can select the signal line 71 from the GPS antenna 70 for connection to the first slot or to both the first slot 130 and the second slot 140 in accordance with a control signal from the control unit 101.

The selector 150 includes an adjuster 151 for adjusting impedance. When connecting the radio frequency signal line 51 from the DTV antenna 50 to the second slot designed to accommodate a communication-related module, and/or when connecting the signal line 71 from the GPS antenna 70 to the first module designed to accommodate a broadcast-related module, the adjuster 151 is inserted between the respective signal lines and the corresponding slots in order to adjust the impedance between them.

While the first and second modules 200 and 300 that can be mounted in the in-vehicle apparatus 100' have been described and illustrated with reference to FIG. 26, it will be realized that the modules mountable in the in-vehicle apparatus 100' are not limited to the illustrated ones. For example, it is also possible to use a Bluetooth (registered trademark) module, a DCM module, a WiMAX module, etc. as will be described later. Furthermore, it is possible to use other modules such as a USB module having a USB I/F, a digital television module produced by enhancing the performance of the first module 200 so as to be able to display DTV broadcasts by switching between full-segment (12-segment) and one-segment depending on the reception conditions, and an IBOC (In Band on Channel) module for receiving hybrid HD (High Definition) radio broadcast carrier waves of the IBOC system which is a terrestrial digital radio system employed in the U.S.

The external appearance of the in-vehicle apparatus 100' and the expansion module mounting mechanism, including the slot configuration, are the same as those of the in-vehicle apparatus 100, and the description thereof will not be repeated here.

FIG. 4 is a diagram showing one configuration example of the first slot 130.

In the innermost portion of the first slot 130, 68 connection pins (pin numbers P1 to P68) which function as connection terminals for connecting to the module are arranged in two rows. Further, radio frequency pins 134 which also function as connection terminals for connecting to the module are provided at both ends of the base 133, thus having a special structure so that the radio frequency signal from the DTV antenna 50, for example, can be delivered to the module. Here, the voltage from the power supply interlinked to the ACC switch 30, the voltage from the battery 40 as a backup power supply, etc. are supplied to the power supply connection pins. The connection pins include the power supply connection pins 136 having the longest length, signal connection pins 137 having an intermediate length, and connection detection pins 138 having the shortest length. When the connection detection pins 138 are brought into contact with the mating contacts on the connector of the module, a detection current flows, whereupon the control unit 101 detects that the module has been inserted into the first slot 130.

Figure 27:
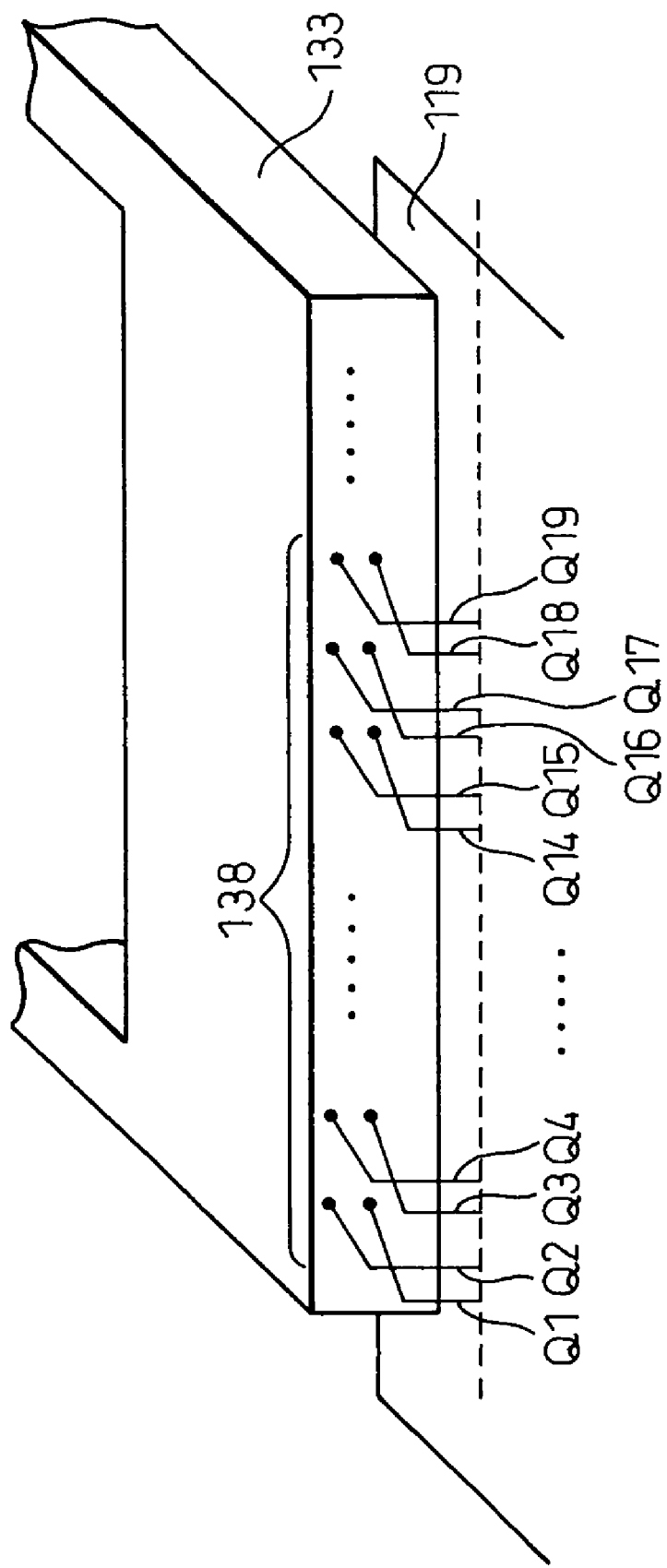
FIG. 27 is a diagram showing the arrangement of interconnect lines between the first slot 130 and first slot substrate 139.

FIG. 27 is a diagram showing the arrangement of interconnect lines between the first slot 130 and first slot substrate 119.

The connection pins are arranged in two rows on the base 133, but the interconnect lines 139 are arranged essentially in a single row on the first slot substrate 119, as shown in FIG. 27. The second slot 140 has the same configuration, and therefore will not be described here.

Interconnect line numbers Q1 to Q19 shown in FIG. 27 indicate some of the interconnect lines 139. For example, when the interconnect line Q1 is connected to the power supply connection pin, the interconnect lines Q2 to Q4 arranged in parallel to the interconnect line Q1 are connected to unconnected connection pins in order to prevent such phenomena as migration due to insulation failure. Here, when the interconnect lines Q2 to Q4 arranged in parallel to the interconnect line Q1 are used for other purposes, it is preferable to provide a protection circuit such as a regulator that provides protection against overcurrent and/or overvoltage by monitoring the current and/or voltage supplied to the interconnect line Q1.

Further, in FIG. 27, when the interconnect lines Q16 and Q17 are connected to the signal connection pins corresponding to the USB 2.0 signal terminals D+ and D−, the interconnect lines Q14, Q15, Q18, and Q19 arranged in parallel to the interconnect lines Q16 and Q17 are connected to GND signal connection pins in order to enhance the noise performance of the high-speed signal lines.

FIG. 28 is a diagram showing an example of connection pin assignments for the first slot 130.

The connection pins (the pins P1 to P68 and the two radio frequency pins) that function as the connection terminals of the first slot 130 are preassigned to specific purposes, as shown in FIG. 28. For example, the pins are preassigned in such a way that P1 to P4 and P65 to P68 are to be used for supplying power to the module, that P5 to P8 are to be used for an analog audio signal, that P9 and P60 are to be used for the earlier described connection detection, that P10, P11, and P15 are to be used for control signals to the module, that P20 to P24, P40, and P41 are to be used for communication purposes, that P25 to P27 are to be used for an analog video signal, that P28 to P38 are to be used for a digital video signal, that P42 to P49 are to be used for a storage device, that P53 to P59 are to be used for a digital audio signal, and that P61 to P64 are to be used for a USB.

By preassigning the connection pins as shown in FIG. 28, and by employing the pin assignments of FIG. 28 for the connectors of all the modules irrespective of their differences in expansion function, the in-vehicle apparatus 100' can be constructed so as to be able to support an increased number of expansion functions while simplifying the configuration of the distribution circuit 110 for delivering the signals. The connection pin assignments shown in FIG. 28 are only illustrative and not restrictive.

Figure 29:
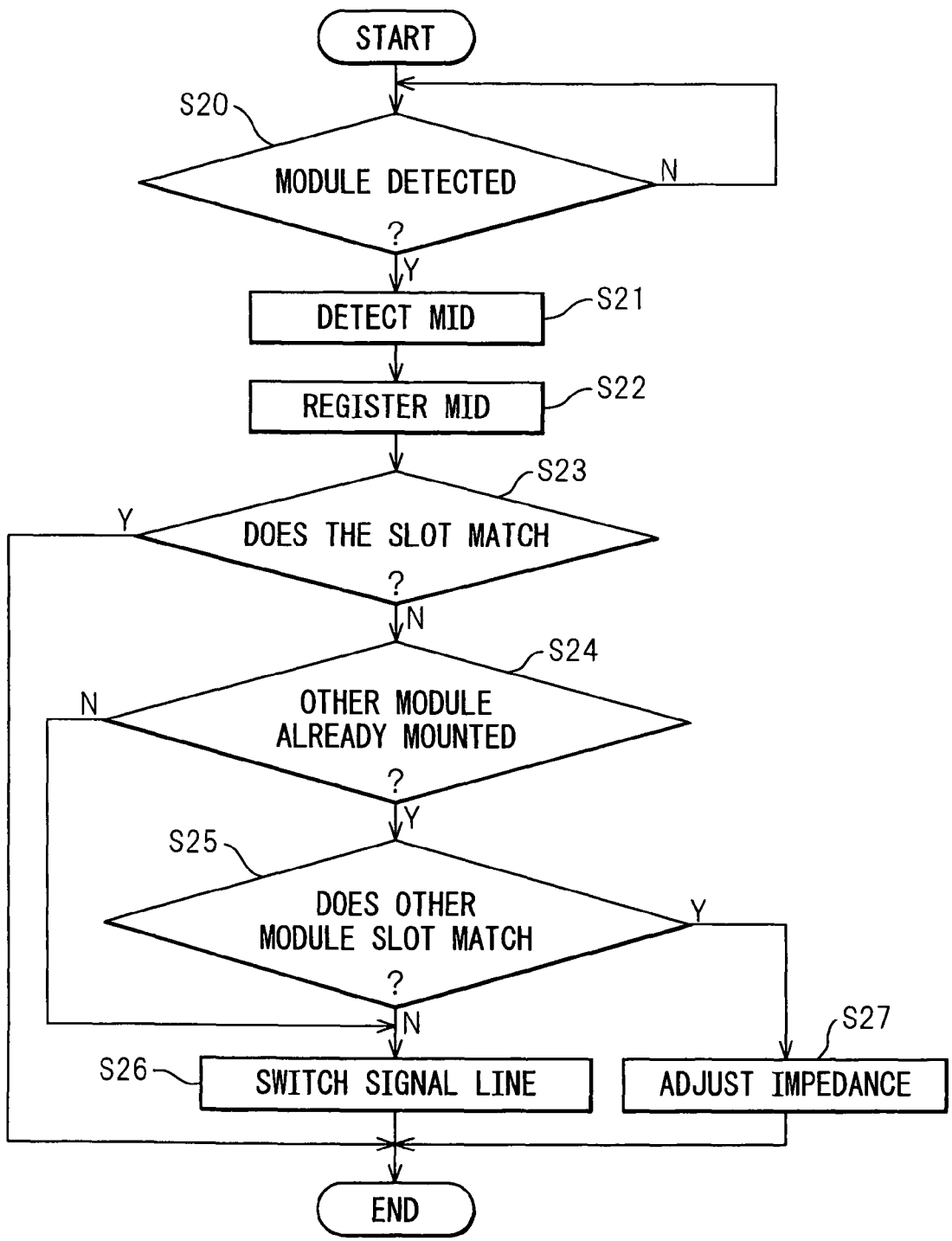
FIG. 29 is a diagram showing one example of a process flow of the in-vehicle system 2.

FIG. 29 is a diagram showing one example of a process flow of the in-vehicle system 2.

The process flow shown in FIG. 29 is executed primarily by the control unit 101 operating the various modules and/or elements of the alternative in-vehicle system 2 in a cooperative manner in accordance with a program prestored in the ROM 103. It is assumed that, prior to the initiation of the process flow shown in FIG. 29, power is turned on to the various modules or elements of the alternative in-vehicle system 2, including the in-vehicle apparatus 100' but excluding any module yet to be mounted in the in-vehicle system, and the system is thus set ready for operation.

First, the control unit 101 determines whether a new module is detected in any one of the first and second slots 130 and 140 (S20). The determination as to whether a module is detected or not is made by using the connection detection pins 138 shown in FIG. 4; that is, when the connection detection pins 138 are connected with the connector of the newly inserted module, a detection signal is transmitted via the distribution circuit 110 to the control unit 101 which can thus detect the insertion of the new module. The new module detection method is not limited to the method that uses the connection detection pins 138 shown in FIG. 4, but other methods, such as a module detection optical sensor, etc., may be used.

When the new module is detected, the control unit 101 receives the module's MID that the MID output circuit in the new module outputs, for example, by using the MID connection pins P12 to P14 in FIG. 28 (S21).

Next, the control unit 101 registers the MID received in S21 into a management table or the like by associating it with the slot in which the new module is mounted (S22). In this way, the control unit 101 can always identify the type and kind of the module mounted in each slot and any slot number in which no module is mounted; for example, MID=001-X (DTV module type 001, broadcast-related module) is mounted in the first slot 130 and MID=002-Y (navigation module type 002, communication-related module) in the second slot 140, or MID=001-X (DTV module type 001, broadcast-related module) is mounted in the first slot 130 but no module in the second slot 140.

Next, the control unit 101 determines whether the impedance characteristic of the newly detected module matches that of the slot in which the new module is mounted (S23). Here, the impedance characteristics match when the module mounted in the first slot 130 is a broadcast-related module (75Ω) or when the module mounted in the second slot 140 is a communication-related module (50Ω). The determination as to whether the impedance characteristics match or not is checked by using the MID stored in the management table described in S22. For example, in the in-vehicle system shown in FIG. 26, when the first module 200 is already mounted in the first slot 130, if it is detected that the second module 300 is newly mounted into the second slot 140, it is determined in S23 that the impedance characteristics match, since the second module 300 can be identified as a communication-related module from its MID. If the impedance characteristics match in S23, no further processing is necessary, so that the sequence of operations is immediately terminated.

If it is determined in S23 that the impedance characteristics do not match, then the control unit 101 checks whether any other module is already mounted in the other module when the new module is detected (S24). The presence or absence of such other module is checked by using the management table or the like described in S22.

If the presence of such other module is detected in S24, the control unit 101 determines whether the impedance characteristic of the already mounted other module matches that of the slot in which the module is already mounted (S25). The determination as to whether the impedance characteristics match or not is made by using the MID stored in the management table described in S22.

If the presence of such other module is not detected in S24, or if it is determined in S25 that the impedance characteristic of the already mounted other module does not match that of the slot in which the module is already mounted, the control unit 101 controls the selector 150 to switch the signal line so that the signal line that matches the newly detected module is connected to the slot in which the new module detected in S20 is accommodated (S26), after which the sequence of operations is terminated.

On the other hand, if it is determined in S25 that the impedance characteristic of the already mounted other module matches that of the slot in which the module is already mounted, the control unit 101 adjusts the impedance by using the impedance adjuster 151 in the selector 150 (S27), after which the sequence of operations is terminated. That is, in this case, since the newly mounted module has to use the signal line that matches the impedance of the other module, the impedance is adjusted using the impedance adjuster 151.

Figure 30:
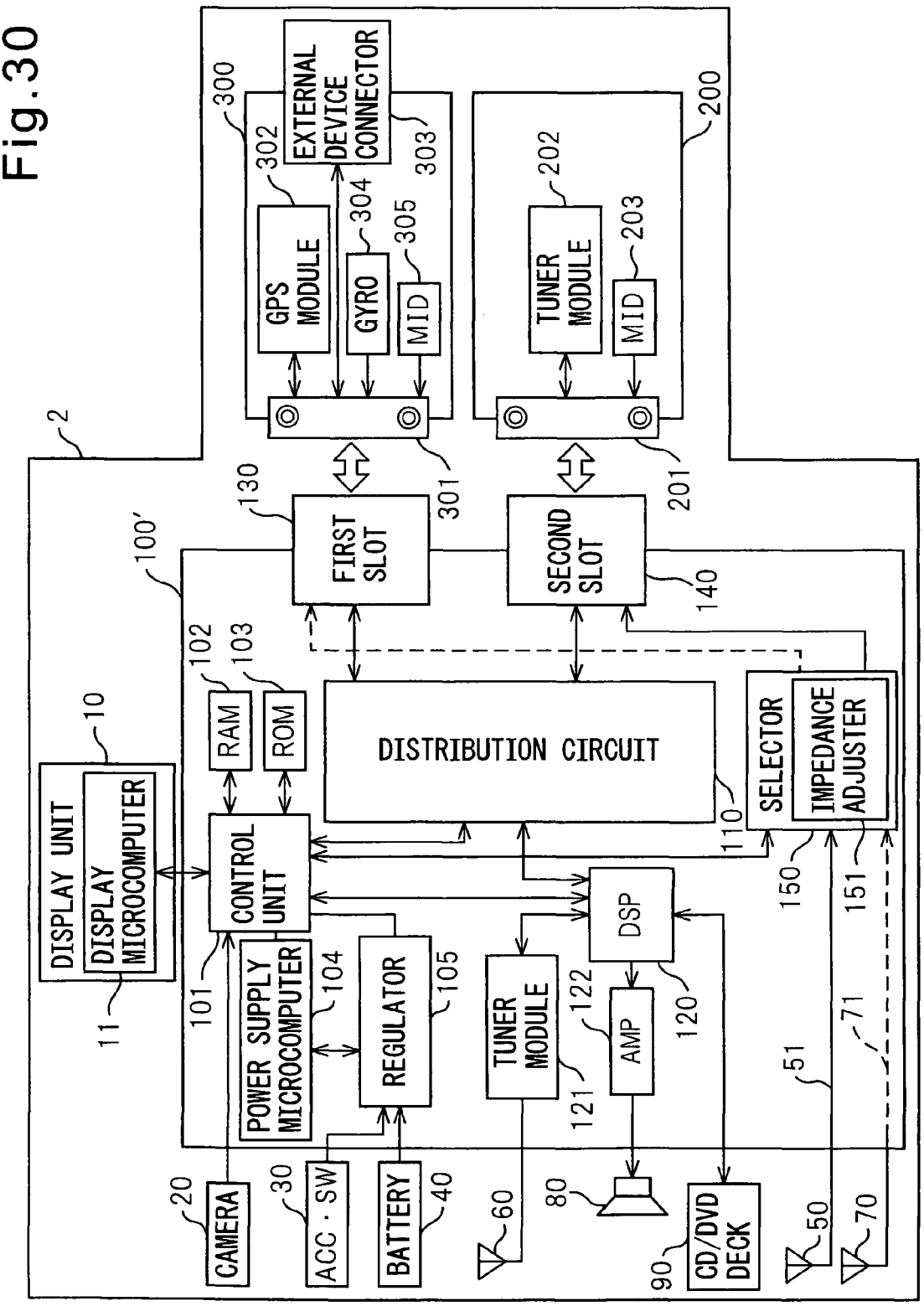
FIG. 30 is a diagram (1) for explaining the function of a selector.

FIG. 30 is a diagram (1) for explaining the function of the selector.

FIG. 30 is identical to FIG. 26, except that the second module 300 corresponds to the first slot 130 and the first module 200 corresponds to the second slot.

In FIG. 30, suppose that the second module 300 is mounted into the first slot 130 when no module is mounted in the second slot 140. Then, in accordance with S23 in FIG. 29, the control unit 101 can recognize that the communication-related second module 300 has been inserted into the broadcast-related first slot 130, that is, the impedance characteristic of the second module 300 does not match that of the first slot 130. By referring to the management table or the like described in S22 in FIG. 29, the control unit 101 can also recognize that no module is mounted in the second slot 140.

Then, in accordance with S26 in FIG. 29, the control unit 101 controls the selector 150 to switch the signal line so that the signal line 71 from the GPS antenna 70 is connected to the first slot 130. As a result of this control, the second module 300 mounted in the first slot 130 can implement its function without any problem.

Next, in FIG. 30, suppose that after the second module 300 has been mounted into the first slot 130 and the signal line has been switched by the selector 150, the first module 200 is newly mounted into the second slot 140. Then, in accordance with S23 in FIG. 29, the control unit 101 can recognize that the broadcast-related first module 200 has been inserted into the communication-related second slot 140, that is, the impedance characteristic of the first module 200 does not match that of the second slot 140. By referring to the management table or the like described in S22 in FIG. 29, the control unit 101 can also recognize that the second module 300 is already mounted in the first slot 130 and that the impedance characteristic of the second module 300 does not match that of the first slot 130.

Then, in accordance with S26 in FIG. 29, the control unit 101 controls the selector 150 to switch the signal line so that the radio frequency signal line 51 from the DTV antenna 50 is connected to the second slot 140. As a result of this control, the first module 200 mounted in the second slot 140 can implement its function without any problem.

As earlier described, the first slot 130 is designed to match the impedance (75Ω) of the broadcast-related module, and the second slot 140 is designed to match the impedance (50Ω) of the communication-related module, but in FIG. 30, the modules are connected inversely; therefore, the signal lines are interchanged by the selector 150 to match the respective impedance characteristics.

Here, rather than interchanging the signal lines by means of the selector 150 (or concurrently with the operation of S26 in FIG. 29), a warning or a warning indication to the effect that the module has been inserted into the unmatched slot 130 may be produced on the display unit 10 and/or through the speaker 80.

Figure 31:
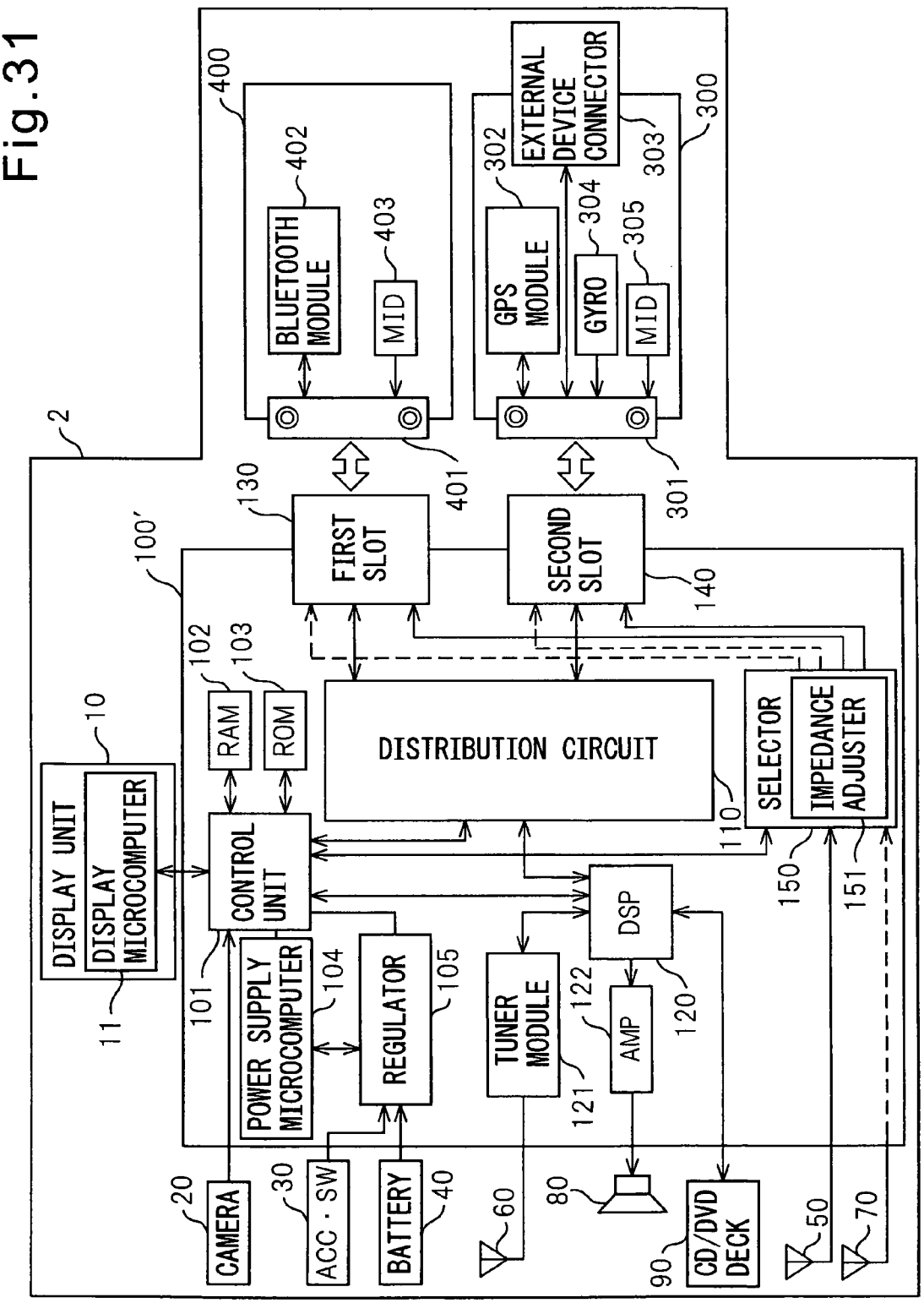
FIG. 31 is a diagram (2) for explaining the function of the selector.

FIG. 31 is a diagram (2) for explaining the function of the selector.

FIG. 31 is identical to FIG. 26, except that the third module 400 corresponds to the first slot 130.

The third module 400 is a Bluetooth (registered trademark) module, and comprises a third connector 401, a Bluetooth (registered trademark) wireless signal receiving module 402, and a third MID output circuit 403 in which the MID is stored. The module 402 is configured to be able to receive a wireless signal conforming to the Bluetooth (registered trademark) standard and to output the received signal. Accordingly, when the third module 400 is used, music information from a Bluetooth (registered trademark) compliant mobile phone, for example, can be reproduced on the in-vehicle apparatus 100 equipped with the third module 400.

In the third MID output circuit 403, a combination of an ID (for example, 003), which indicates that the third module 400 is a Bluetooth (registered trademark) module, and an ID (for example, Y), which indicates that the third module 400 is not a communication-related module, is stored as the module ID (for example, "003-Y").

In FIG. 31, suppose that when the second module 300 is already mounted in the second slot 140, the third module 400 is newly mounted into the first slot 130. Then, in accordance with S23 in FIG. 29, the control unit 101 can recognize that the communication-related third module 400 has been inserted into the broadcast-related first slot 130, that is, the impedance characteristic of the third module 400 does not match that of the first slot 130. By referring to the management table or the like described in S22 in FIG. 29, the control unit 101 can also recognize that the second module 300 is already mounted in the second slot 140 and that the impedance characteristic of the second module 300 matches that of the second slot 140.

Then, in accordance with S27 in FIG. 29, the control unit 101 adjusts the impedance between the third module 400 mounted in the first slot and the signal line by using the impedance adjuster 151 in the selector 150. The third module thus becomes able to operate without any problem. Further, by using the impedance adjuster 151 in this way, it becomes possible to mount communication-related modules in both slots.

Figure 32:
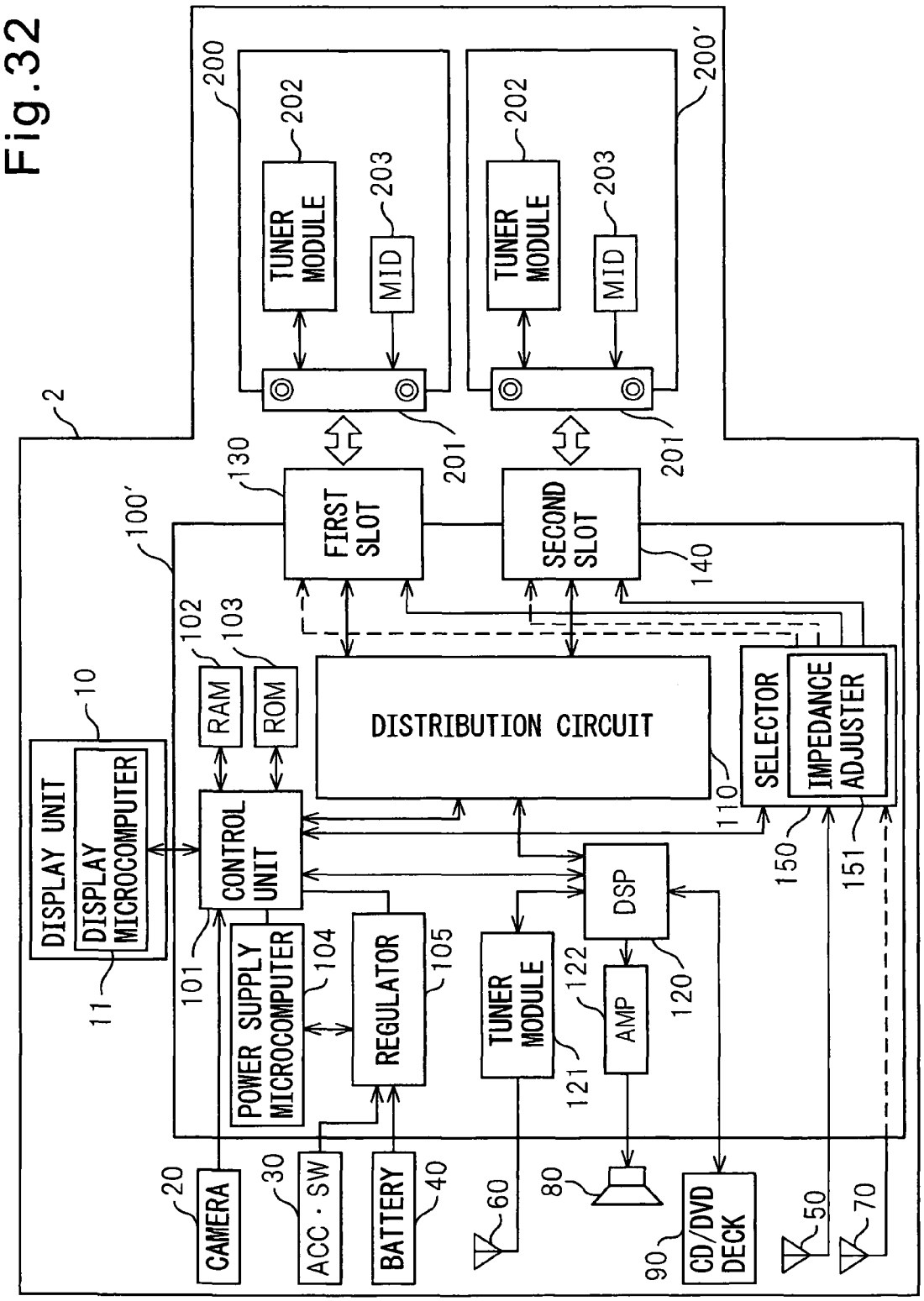
FIG. 32 is a diagram (3) for explaining the function of the selector.

FIG. 32 is a diagram (3) for explaining the function of the selector.

FIG. 32 is identical to FIG. 26, except that another first module 200' corresponds to the second slot 140.

In FIG. 32, suppose that when the first module 200 is already mounted in the first slot 130, another first module 200' is newly mounted into the second slot 140. Then, in accordance with S23 in FIG. 29, the control unit 101 can recognize that another broadcast-related first module 200' has been inserted into the communication-related second slot 140, that is, the impedance characteristic of that other first module 200' does not match that of the second slot 140. By referring to the management table or the like described in S22 in FIG. 29, the control unit 101 can also recognize that the first module 200 is already mounted in the first slot 130 and that the impedance characteristic of the first module 200 matches that of the first slot 130.

Then, in accordance with S27 in FIG. 29, the control unit 101 adjusts the impedance between that other first module 200' mounted in the second slot 140 and the signal line by using the impedance adjuster 151 in the selector 150. The other first module 200' thus becomes able to operate without any problem. Further, by using the impedance adjuster 151 in this way, it becomes possible to mount broadcast-related modules in both slots. Furthermore, in this case, since two identical DTV tuner modules can be used simultaneously, a double tuner function can be achieved that enables, for example, one tuner to scan channels to search for a channel that can be received in good condition, while displaying video using the other tuner.

FIG. 33 is a diagram showing in simplified form the configuration of other modules.

Figure 33A:
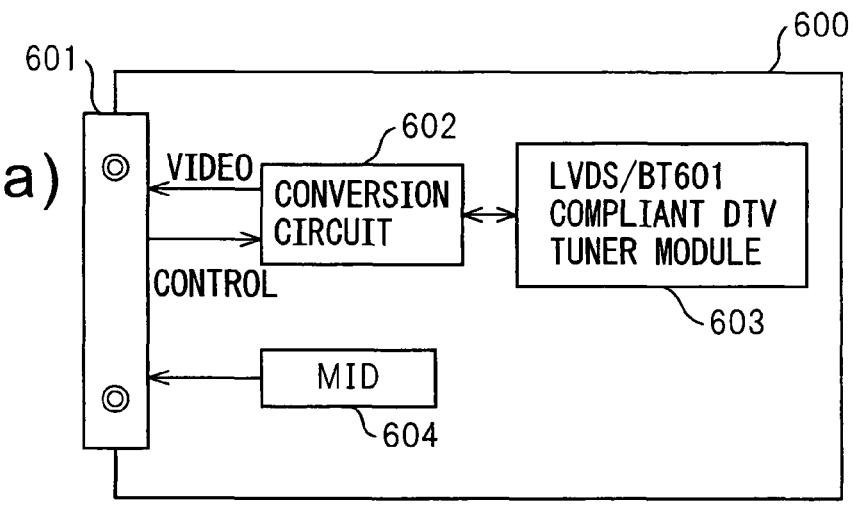
FIG. 33 is a diagram showing in simplified form the configuration of other modules.

FIG. 33(a) shows in simplified form the configuration of a fifth module 600 for DTV that conforms to the LVDS (Low Voltage Differential Signaling) standard. The fifth module 600 shown in FIG. 33(a) can be used as a broadcast-related module instead of the first module 200 or the second module 300 shown in FIG. 26.

The fifth module 600 comprises a fifth connector 601, a conversion circuit 602, a DTV tuner module 603, and a fifth MID output circuit 604. Since the connection pins on the slot provided in the in-vehicle apparatus 100' are preassigned to specific purposes, as shown in FIG. 28, the fifth module 600 which is designed to a new standard may not be readily used with the in-vehicle apparatus 100'. To address this, the fifth module 600 includes the conversion circuit 602 so that the output signal from the DTV tuner module 603 can be converted into the format of the existing connection pins in accordance with a control signal from the in-vehicle apparatus 100'.

In the fifth MID output circuit 604, a combination of an ID (for example, 005), which indicates that the fifth module 600 is a DTV tuner module that conforms to LVDS, and an ID (for example, X), which indicates that the fifth module 600 is a broadcast-related module, is stored as the module ID (for example, "005-X"), so that when the fifth module 600 is mounted, the control unit 101 can identify the module. The fifth module 600 shown in FIG. 33(a) may be configured as a DTV module that conforms to the BT701 standard that defines a new digital format when converting digital video signals into analog form.

Figure 33B:
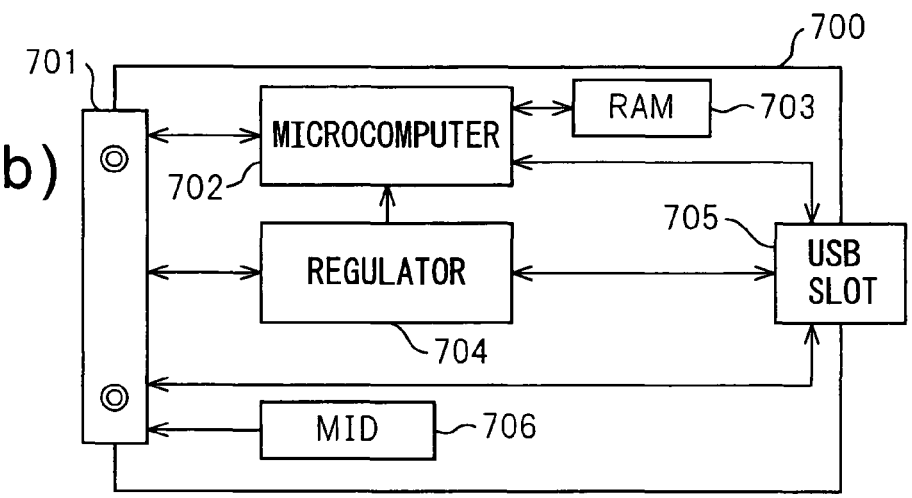

FIG. 33(b) shows a sixth module 700 which, like the first and second modules 200 and 300, can be mounted in the in-vehicle apparatus 100' to expand its capabilities.

The sixth module 700 is a USB I/F module, and comprises a sixth connector 701, a control microcomputer 702, a RAM 703, a USB slot 705, a regulator 704 for supplying output power via the USB slot 705 and for monitoring the current and voltage supply, and a sixth MID output circuit 706 in which the MID is stored. Accordingly, when the sixth module 700 is used, operations such as altering a portion of the application program of the in-vehicle apparatus 100' can be performed, for example, by connecting to it an HD having a USB connector.

In the sixth MID output circuit 706, a combination of an ID (for example, 006), which indicates that the sixth module 700 is a USB I/F module, and an ID (for example, Y), which indicates that the sixth module 700 is a communication-related module, is stored as the module ID (for example, "006-Y"), so that when the sixth module 700 is mounted, the control unit 101 can identify the module.

Figure 33C:
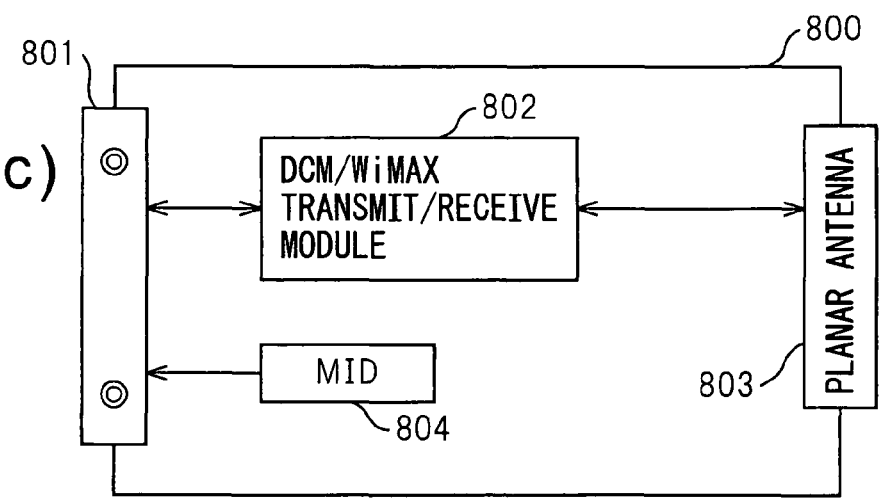

FIG. 33(c) shows in simplified form the configuration of a seventh module 800 that conforms to the DCM communication standard. The seventh module 800 shown in FIG. 33(c) can be used as a communication-related module instead of the first or second module shown in FIG. 26.

The seventh module 800 comprises a seventh connector 801, a DCM transmit/receive module 802, a planar antenna 803, and a seventh MID output circuit 804. When the seventh module 800 is used, radio communications conforming to the DCM standard can be performed via this module by using the planar antenna 803 mounted on the front of the module. That is, another apparatus designed to the DCM standard can be connected to the in-vehicle apparatus 100' by using this module.

In the seventh MID output circuit 804, a combination of an ID (for example, 007), which indicates that the seventh module 800 is a DCM module, and an ID (for example, Y), which indicates that the seventh module 800 is a communication-related module, is stored as the module ID (for example, "007-Y"), so that when the seventh module 800 is mounted, the control unit 101 can identify the module. The seventh module 800 shown in FIG. 33(c) may be configured as a transmit/receive module that conforms to the WiMAX standard.

Figure 34:
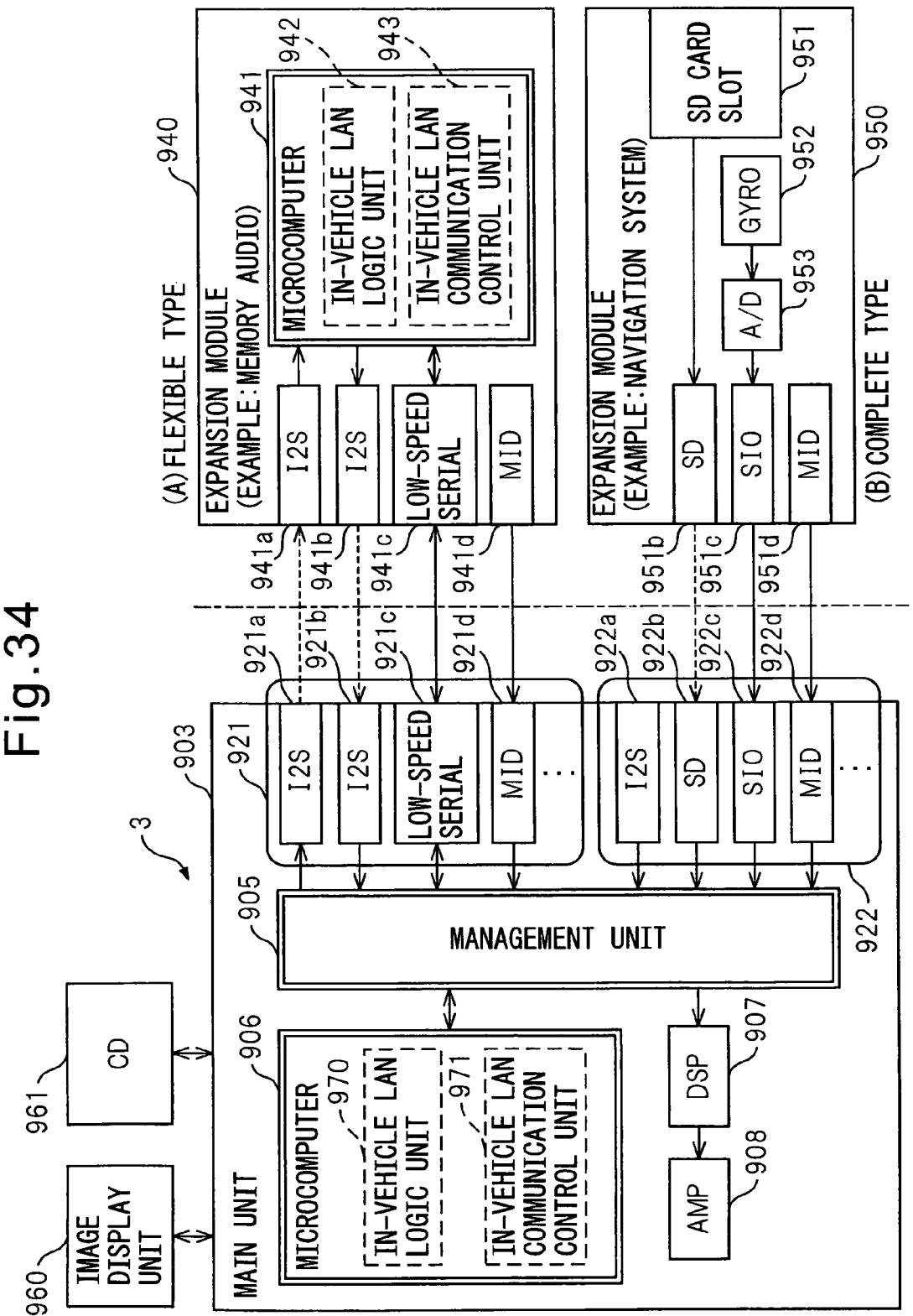
FIG. 34 is a diagram showing the hardware configuration of a second alternative in-vehicle apparatus.

FIG. 34 is a diagram showing the hardware configuration of a second alternative in-vehicle apparatus.

This alternative in-vehicle apparatus 3 includes a main unit 903 equipped with a first slot 921 and a second slot 922. In addition to the main unit, basic units such as an image display unit 960 and a CD playback unit 961 are also incorporated in the in-vehicle apparatus 3, but the following description focuses mainly on the main unit related to the module expansion. The slots 921 and 922 are capable of accommodating expansion modules 940 and 950, respectively, and are provided with a plurality of terminals 921a to 921d and 922a to 922d, respectively, for performing communication with the respective expansion modules 940 and 950. The term expansion module here refers to a module provided separately from the in-vehicle apparatus and used to expand the capabilities of the in-vehicle apparatus. The terminals on each slot are connected to a management unit 905 implemented on a peripheral ASIC provided within the main unit 903 so that communication can be performed with the respective expansion modules 940 and 950. The in-vehicle apparatus 3 further includes a microcomputer 906 which contains an in-vehicle LAN logic unit 970, an in-vehicle LAN communication control unit 971, etc. and which functions as a control unit for controlling the entire operation of the in-vehicle apparatus 3.

FIG. 34 shows the condition in which the expansion modules 940 and 950 are inserted in the respective slots and electrically connected to the terminals provided in the respective slots. The microcomputer 906 provided in the main unit 903 controls the management unit 905, and thus controls the expansion modules 940 and 950. In this way, the second alternative in-vehicle apparatus 3 according to the present invention is characterized by the provision of the plurality of slots which enable the plurality of expansion modules 940 and 950 to run concurrently.

The expansion modules that can be used by insertion into the in-vehicle apparatus 3 will be described below.

The upper right part of FIG. 34 shows an example in which a flexible-type expansion module is selected for use as the expansion module. The flexible-type expansion module here refers to an expansion module of the type that connects using a communication protocol defined in the expansion module system. The following description is given by taking as an example the case where a memory audio is selected as the flexible-type expansion module.

The expansion module 940 includes a microcomputer 941 which contains an in-vehicle LAN logic unit 942, an in-vehicle LAN communication control unit 943, etc. When the expansion module 940 is inserted into the first slot 921, the terminals 941a to 941d on the expansion module 940 are connected to the terminals 921a to 921d on the first slot 921. The terminal 921a on the first slot 921 is an "I2S" terminal and, with this terminal connected to the "I2S" terminal 941a on the expansion module 940, music data is transferred from the CD loaded into the in-vehicle apparatus 3 to the expansion module 940 which is a memory audio. When playing back the music data stored in the memory audio, the audio data signal in the memory is transferred from the "I2S" terminal 941b on the expansion module 940 to the "I2S" terminal 921b on the first slot 921, and signal processing is performed by a digital signal processor (DSP) 907 in the in-vehicle apparatus 3; then, the signal is amplified by an AMP 908 and is reproduced through the speaker, etc. connected to the AMP 908. Signals for controlling the expansion module 940 are transferred between the "low-speed serial" terminals 921c and 941c. The ID for identifying the expansion module is transmitted from the module ID (MID) terminal 941d on the expansion module 940 to the management unit 905 in the in-vehicle apparatus 3. As will be described later, the MID is used to check whether the inserted module is a module supported by the in-vehicle apparatus.

The lower right part of FIG. 34 shows an example in which a complete-type expansion module, a different type from the flexible type, is selected for use as the expansion module. The complete-type expansion module here refers to an expansion module of the type that uses an existing communication protocol and that incorporates an existing LSI and microcomputer on the module. The following description is given by taking as an example the case where a navigation system is selected as the complete-type expansion module. The expansion module 950 as the navigation system is equipped with an SD card slot 951, and data from an SD card inserted therein is transmitted to the "SD" terminal 922b on the second slot via the "SD" terminal 951b on the expansion module 950. On the other hand, angular velocity data detected by a gyro unit (GYRO) 952 mounted on the expansion module 950 is converted by an A/D converter 953 into a digital signal which is then transmitted via a serial I/O (SIO) terminal 951c to the SIO terminal 922c on the second slot 922. Further, the MID for identifying the expansion module is transmitted from the MID terminal 951d on the expansion module 950 to the management unit 905 in the in-vehicle apparatus 3. As will be described later, the MID is used to check whether the inserted module is a module supported by the in-vehicle apparatus.

A module control communication method to be implemented when the module is inserted into the designated slot of the in-vehicle apparatus will be described below.

Figure 35:
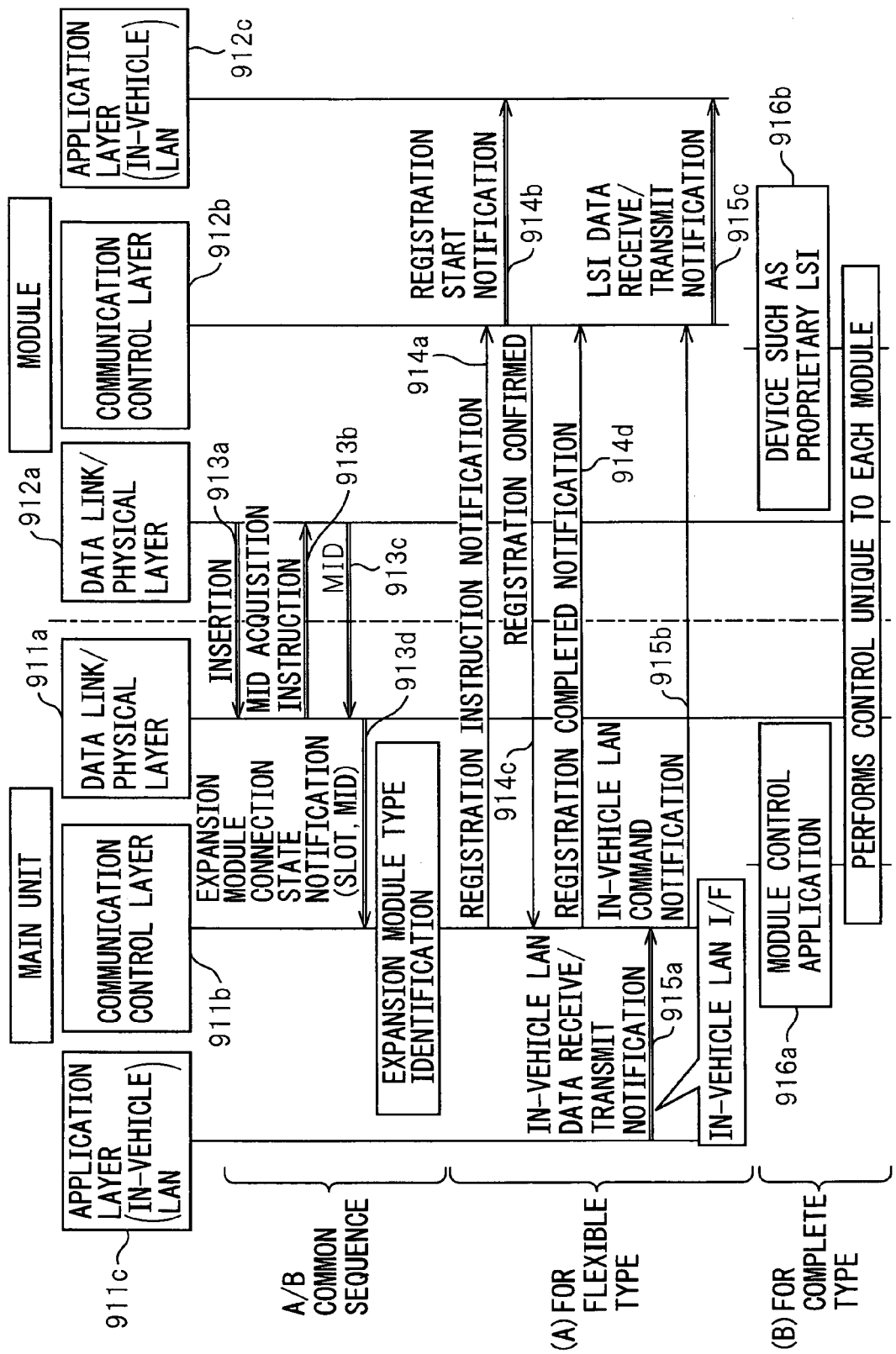
FIG. 35 is a diagram showing a sequence for transferring data between layers in a main unit and corresponding layers in a module according to the second alternative in-vehicle apparatus.

FIG. 35 is a diagram showing an overview of a sequence for transferring data between the main unit and the module.

[Expansion Module Type Identification Sequence]

Figure 36:
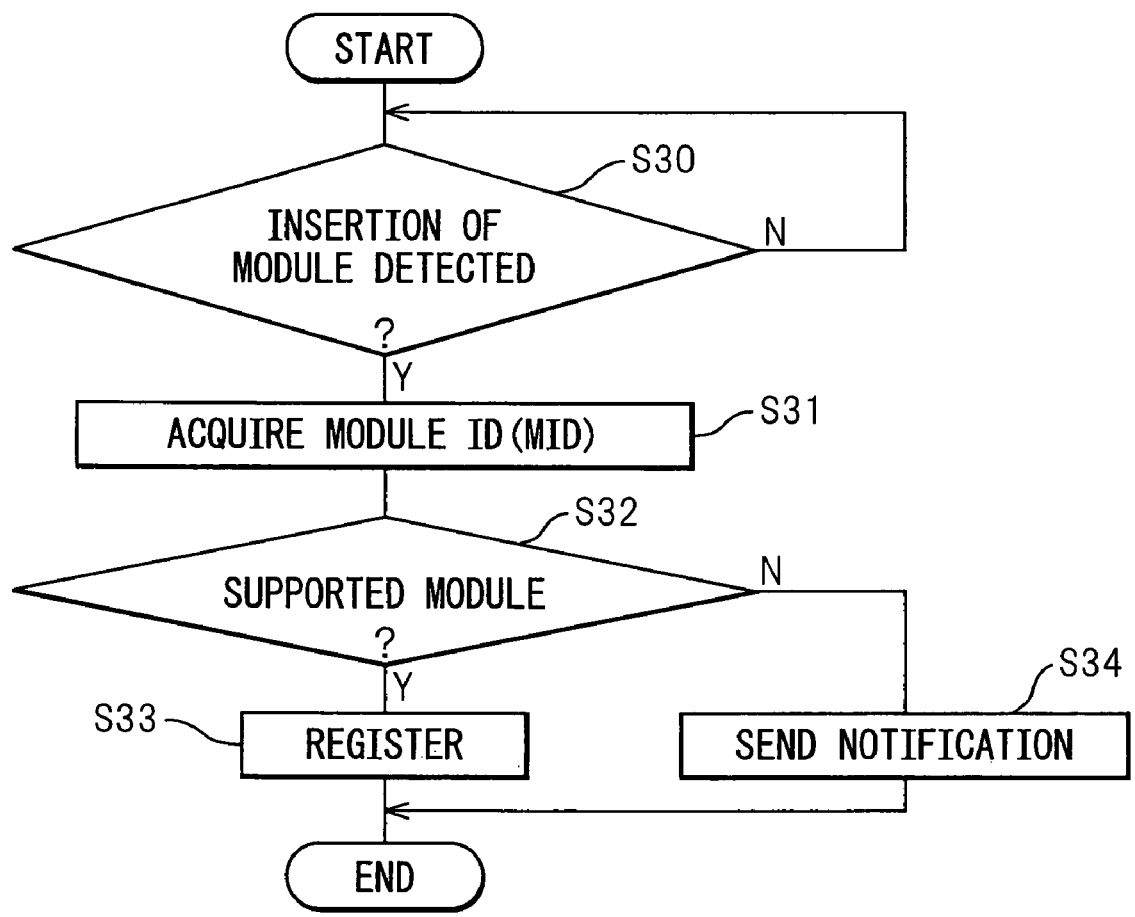
FIG. 36 is a diagram showing a module registration sequence according to the second alternative in-vehicle apparatus.

FIG. 36 is a diagram showing a module registration sequence.

The module registration sequence shown in FIG. 36 is executed by the microcomputer 906 cooperating with other component elements in accordance with a prestored program. The sequence from the time the expansion module is inserted into the slot of the in-vehicle apparatus to the time it is registered with the in-vehicle apparatus will be described with reference to FIGS. 35 and 36.

The in-vehicle apparatus is in the standby state when the module is not yet inserted into the slot (S30).

When the module is inserted into the slot, a module insertion detection signal 913*a* is transmitted from a data link/physical layer 912*a* in the module to a data link/physical layer 911*a* in the main unit of the in-vehicle apparatus, as shown in FIG. 35.

Next, the module ID (MID) is acquired (S31). More specifically, in FIG. 35, a MID acquisition instruction signal 913*b* is transmitted from the data link/physical layer 911*a* in the main unit to the data link/physical layer 912*a* in the module, and the module returns a MID signal 913*c* to the main unit. The module insertion detection signal 913*a* and the MID signal 913*c* are transmitted to a communication control layer 911*b* in the main unit. Here, the type of the expansion module is identified based on the MID signal 913*c*.

The second alternative in-vehicle apparatus 3 according to the present invention described above is provided with a plurality of slots for inserting modules, and when the modules are inserted into the respective slots, the type of each inserted module can be identified by acquiring the MID from each module.

[Module Registration Sequence]

After identifying the type of the expansion module as described above, the inserted module is checked to determine whether the module is a module supported by the in-vehicle apparatus (S32). If it is a supported module, processing for registration is performed by the management unit 905 in the main unit. The purpose of the registration is to notify the user that the module has been verified as a module supported by the in-vehicle apparatus and can therefore be used with the in-vehicle apparatus.

If it is not a supported module, a notification is made to the effect that the module is not supported (S34). More specifically, a message to that effect is displayed on the display unit or produced through the speaker.

Data transfers performed between the main unit and the module for the registration of the module will be described with reference to FIG. 35.

The registration procedure differs depending on whether the module is the flexible type or the complete type. First, the procedure will be described for the case of the flexible type.

When it is determined based on the MID acquired by the main unit that the module is a supported module, a registration instruction signal 914*a* notifying that the registration instruction has been issued is transmitted from the communication control layer 911*b* in the main unit to the communication control layer 912*b* in the module. The module that received the registration instruction signal 914*a* transmits to the application layer (in-vehicle LAN) in the module a registration start notification signal 914*b* notifying that the registration is to start. The module that has recognized that the registration is to start transmits a registration confirmed signal 914*c* to the main unit. When the registration with the management unit is completed in the main unit, a registration completed notification signal 914*d* is transmitted to the communication control layer 912*b* in the module.

On the other hand, when the inserted module is the complete type, then using a module control application 916*a* residing in the main unit the registration is performed by transferring data to and from a device 916*b* such as a proprietary LSI on the module and thereby performing control unique to the module.

When the module inserted into the slot of the main unit is registered with the main unit as described above, an icon unique to the module can be displayed on the display unit, etc. connected to the main unit. Since the registration is done only when the inserted module is a module supported by the in-vehicle apparatus, the in-vehicle apparatus can prevent the use of an illegal module such as a counterfeit product. Furthermore, by thus registering the modules, each individual module that is inserted and set ready for use can be recognized by the user even when there are a plurality of such modules.

[Module Activation and Control Sequence]

Figure 37:
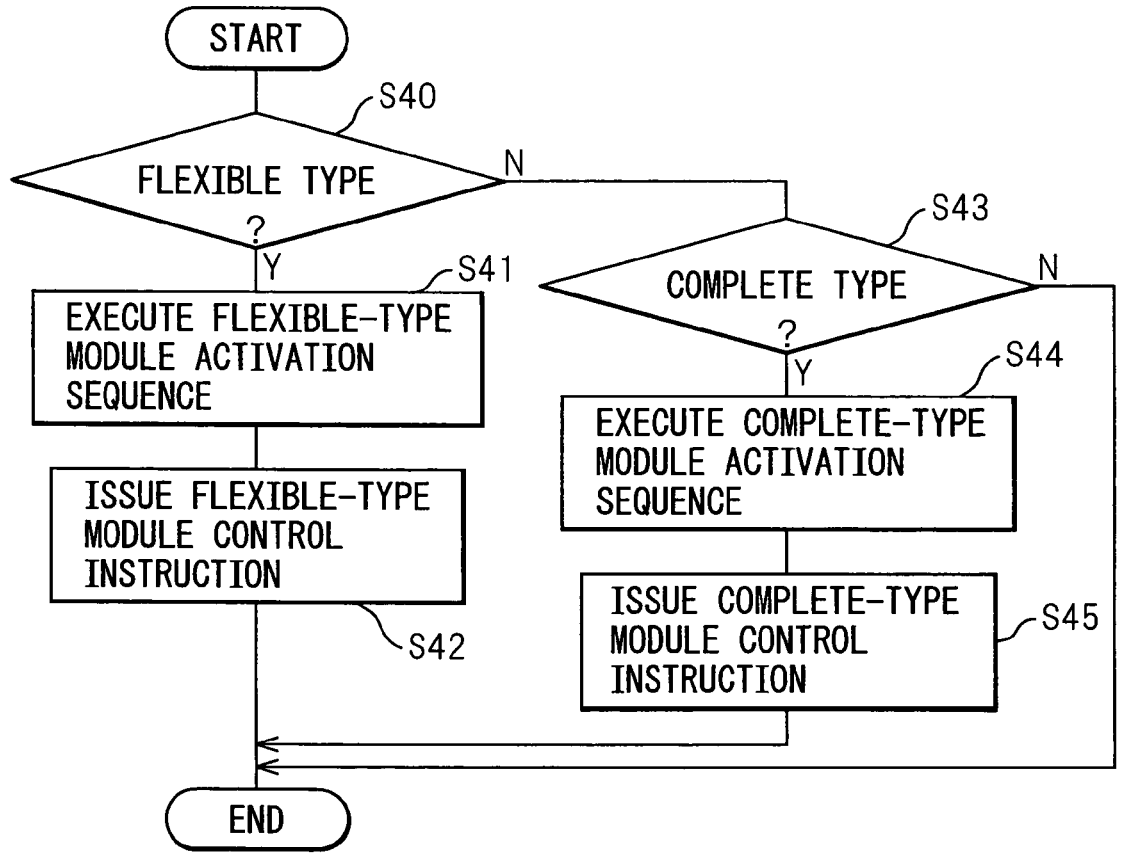
FIG. 37 is a diagram showing a module activation and control sequence according to the second alternative in-vehicle apparatus.

FIG. 37 is a diagram showing a module activation and control sequence.

The module activation and control sequence shown in FIG. 37 is executed by the microcomputer 906 cooperating with other component elements in accordance with a prestored program. The sequence for activating and controlling the inserted module after registering it will be described with reference to FIGS. 35 and 37.

First, based on the module ID (MID) acquired by the management unit in the main unit, it is determined whether the inserted module is the flexible type or not (S40). If it is determined that the module is the flexible type, the activation sequence for the flexible-type module is executed (S41). After activating the module, if an operation for implementing the function of the module is performed from the main unit, a flexible-type module control instruction is issued (S42). More specifically, in FIG. 35, an in-vehicle LAN data transmission/reception notification signal 915*a* for notifying the transmission/reception of in-vehicle LAN data is sent to the communication control layer 911*b* from the application layer (in-vehicle LAN) 911*c* that controls the in-vehicle LAN interface (I/F) in the main unit. After that, an in-vehicle LAN command notification signal 915*b* is transmitted from the communication control layer 911*b* in the main unit to the communication control layer 912*b* in the module. The communication control layer 912*b* that received the in-vehicle LAN command notification signal 915*b* sends an LSI data transmission/reception notification signal 915*c* for notifying the transmission/reception of LSI data to the application layer (in-vehicle LAN) in the module. The module's application layer 912*c* that received this signal executes a prescribed operation in accordance with the command received from the main unit.

On the other hand, if it is determined in S40 that the inserted module is not the flexible type, then it is determined whether the module is the complete type or not (S43). If it is determined in S43 that the module is the complete type, the activation sequence for the complete-type module is executed (S44). After activating the module, if an operation for implementing the function of the module is performed from the main unit, a complete-type module control instruction is issued (S45). If it is determined in S43 that the module is not the complete type, this means that the module is neither the flexible type nor the complete type, so that the sequence is terminated.

When the inserted module is the complete type, then using the module control application 916*a* residing in the main unit the activation and control sequence is executed, as in the registration sequence, by transferring data to and from the device 916*b* such as a proprietary LSI on the module and thereby performing control unique to the module. By changing the activation sequence according to the type of the inserted module in this way, activation of the module can be accomplished efficiently.

[Connection State Management Sequence]

Figure 38:
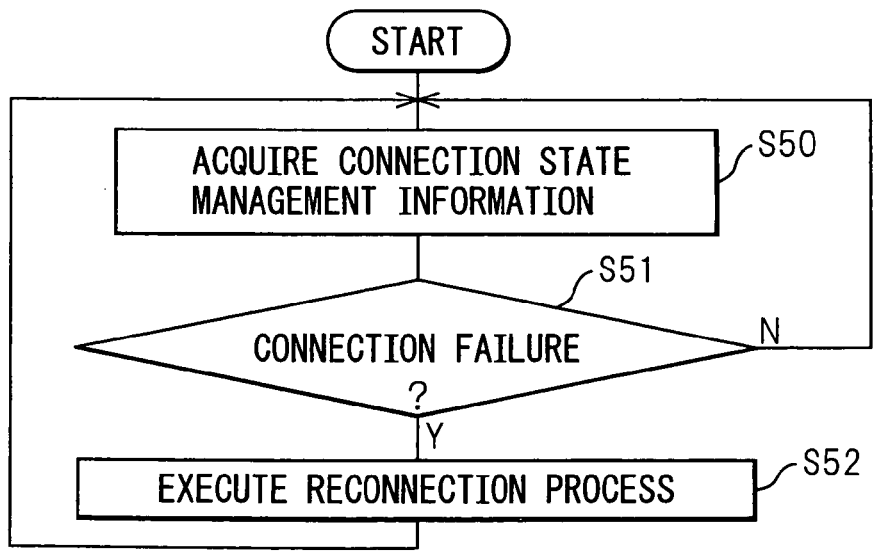
FIG. 38 is a diagram showing a module connection state management sequence according to the second alternative in-vehicle apparatus.

FIG. 38 is a diagram showing a module connection state management sequence.

The module connection state management sequence shown in FIG. 38 is executed by the microcomputer 906 cooperating with other component elements in accordance with a prestored program. During acceleration or deceleration of the vehicle, a force may be applied to the in-vehicle apparatus in a direction that detaches the module from the slot. This may cause the connection between the module terminals and the slot terminals to fail momentarily. In that case, the module that has momentarily run into a connection failure has to be reconnected. The connection state management sequence for accomplishing such reconnection will be described below.

Connection state management information is acquired (S50). More specifically, in FIG. 35, the connection state management information can be acquired by receiving at the communication control layer 911*b* in the main unit the insertion signal 913*a* transmitted from the data link/physical layer 912*a* in the module to the data link/physical layer 911*a* in the main unit.

Next, based on the connection state management information, it is determined whether a connection failure has occurred or not (S51). If it is determined that a connection failure has occurred, a reconnection process is executed (S52). After executing the reconnection process, the sequence returns to S50 to acquire the connection state management information in order to check the connection state. If it is determined that the connection state is good, the sequence likewise returns to S50 to acquire the connection state management information in order to manage the connection state. By managing the connection state in this way, if the module momentarily runs into a connection failure, the module can be quickly restored to the operable state.

[Module Ejection Sequence]

Figure 39:
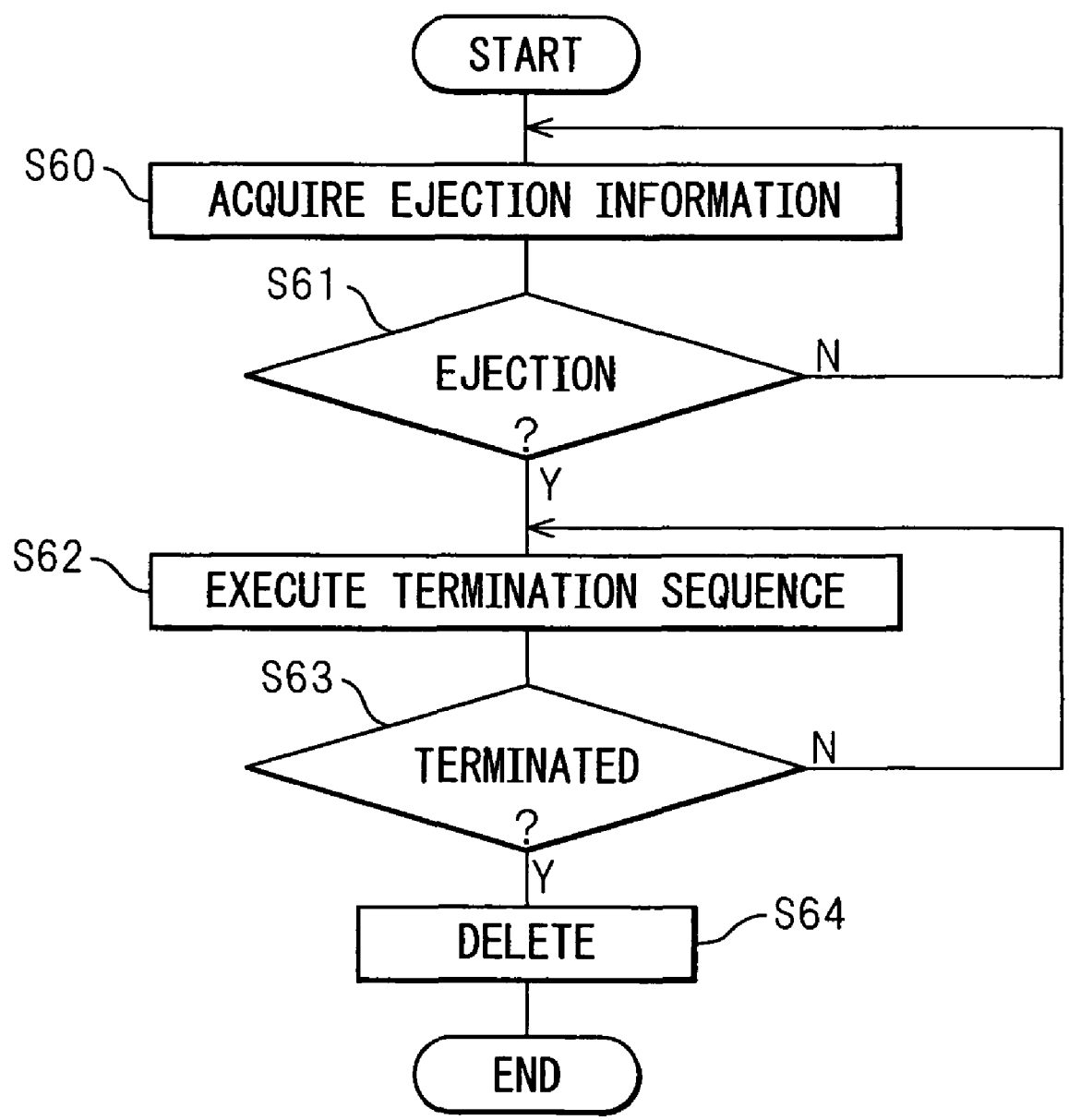
FIG. 39 is a diagram showing a module ejection sequence according to the second alternative in-vehicle apparatus.
Figure 40A:
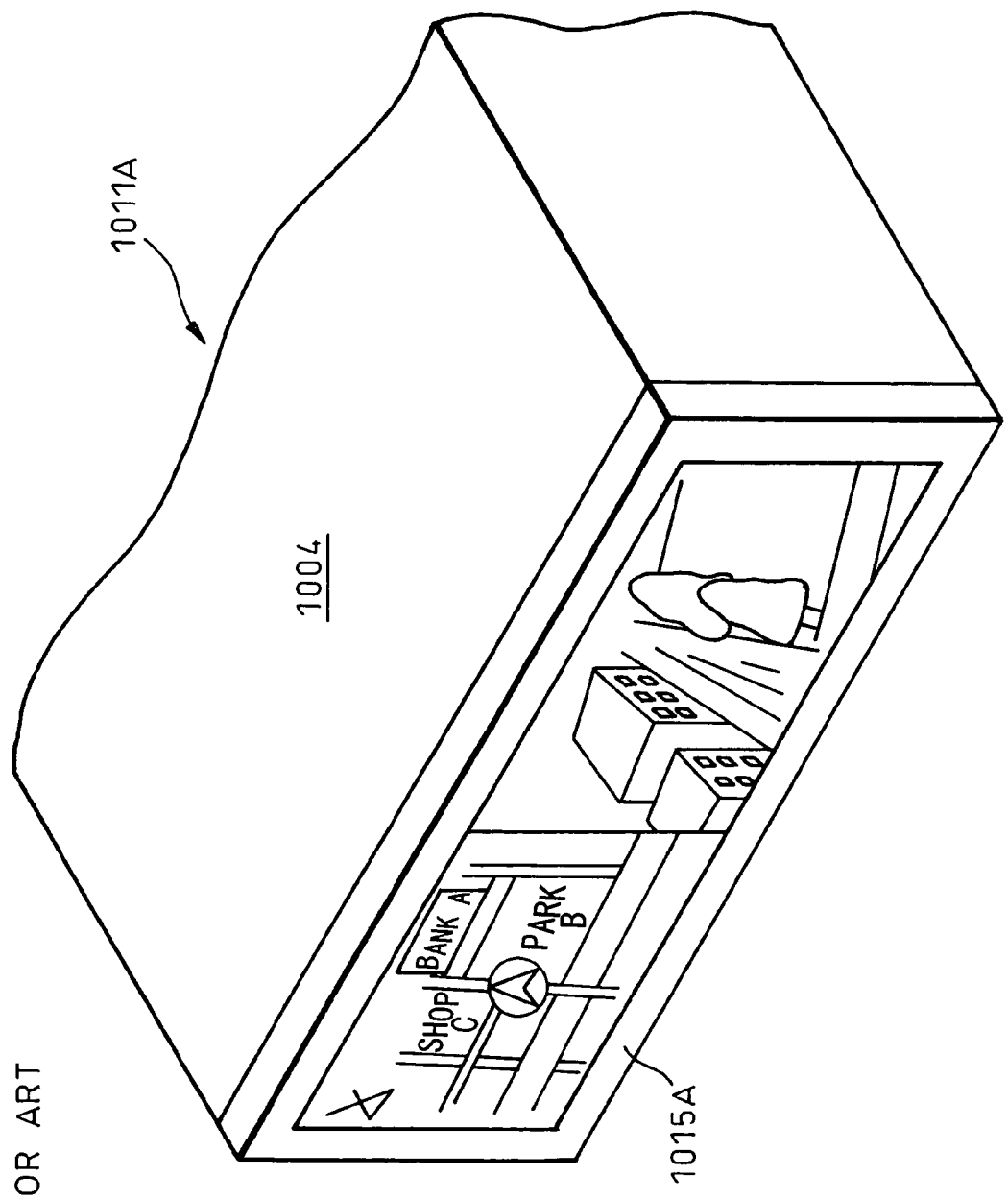
FIG. 40(a) is a perspective view showing a condition in which a display unit 1015A as a door panel is closed.
Figure 40B:
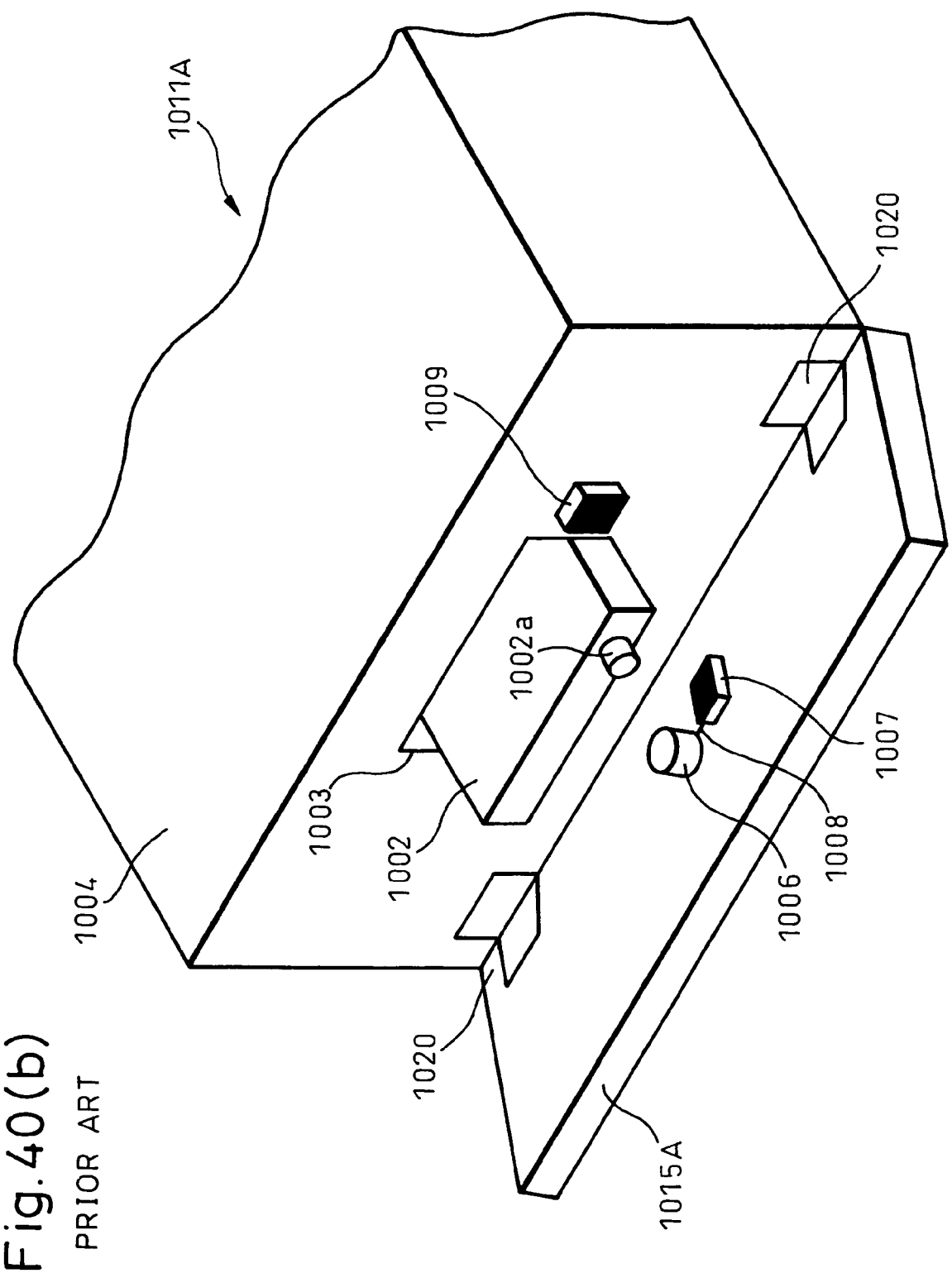
FIG. 40(b) is a perspective view showing a condition in which the display unit 1015A as the door panel is opened.

FIG. 39 is a diagram showing a module ejection sequence.

The module ejection sequence shown in FIG. 39 is executed by the microcomputer 906 cooperating with other component elements in accordance with a prestored program. When ejecting the module inserted into the slot of the main unit and registered as described above, the registration must be deleted in the management unit thereby enabling the user to recognize that the module has been ejected.

First, module ejection information is acquired (S60). For example, when there is an eject button for ejecting the module, the ejection information can be acquired by causing a signal to output when the eject button is depressed. Next, it is determined whether the ejection information has been acquired or not (S61), and if the ejection information has been acquired, a module termination sequence is executed (S62). If the ejection information has not been acquired in S61, the sequence returns to S60 to wait for the reception of the ejection information.

When the termination sequence is executed (S62), the operating state of the module is checked to determine whether the operation has been terminated or not (S63). If the operation has not been completely terminated yet, the sequence returns to S62 to continue the termination sequence. If it is determined in S63 that the operation has been terminated, the registration information of the ejected module is deleted from the management unit (S64). The result of the deletion can be verified, for example, by checking whether the module's unique icon displayed at the time of the registration has been removed from the display unit connected to the main unit. By deleting the registration of the ejected module as described above, the user can accurately recognize which module is ready for use. Furthermore, since the module is ejected after terminating the operation of the module, data corruption and module damage can be prevented.

As shown in FIG. 2 and FIGS. 12 to 25, the mechanism for mounting the plurality of modules can be constructed in various configurations. Further, the number of modules that can be mounted in the in-vehicle apparatus is not limited to two, but three or more modules may be mounted. Furthermore, the physical size of each module is not limited to any specific size, but the size and shape can be changed variously according to the purpose and design.

What is claimed is:

1. An in-vehicle apparatus comprising:
a plurality of slots for connecting a plurality of modules, each having a connector for connection, to expand capabilities of said in-vehicle apparatus;
a control unit for identifying the kind of each of said plurality of modules connected to said plurality of slots;
a management unit for detecting insertion of one of said plurality of modules into one of said plurality of slots and for acquiring a module ID from the inserted module; and
an ejection detection unit for detecting an instruction for ejecting the inserted module,
wherein the control unit determines based on the module ID whether the inserted module is a supported module or not, and registers the inserted module with the management unit when it is determined that the inserted module is a supported module, the control unit executes an activation sequence according to the kind of the inserted module, and when the ejection detection unit has detected the module ejection instruction, the control unit executes a termination sequence for the inserted module to be ejected.

2. The in-vehicle apparatus according to claim 1, wherein after executing said termination sequence, said control unit issues an instruction to said management unit to delete the registration of said module whose operation has been terminated.

3. The in-vehicle apparatus according to claim 2, further comprising a plurality of terminals, provided on each of said plurality of slots, for connecting with the connector of each module, said plurality of terminals including a power supply terminal having the longest length, an insertion detection terminal having the shortest length, and a signal terminal having a length intermediate between said power supply terminal and said insertion detection terminal, wherein said control unit detects the insertion of a module into each of said plurality of slots by using said insertion detection terminal.

4. The in-vehicle apparatus according to claim 3, wherein said plurality of terminals includes an ID terminal for sending an ID for identifying the kind of said module, and said control unit identifies the kind of said module by using the ID sent from said ID terminal.

5. An in-vehicle apparatus comprising:
a plurality of slots for connecting a plurality of modules, each having a connector for connection, to expand capabilities of the in-vehicle apparatus; and
a control unit for identifying the kind of each of the plurality of modules connected to the plurality of slots, wherein said plurality of slots include a first slot for connecting a first module having a first connector for connection to add a first function, and a second slot for connecting a second module having a second connector for connection to add a second function, and said control unit identifies the kind of each of said first and second modules connected to said first and second slots, respectively, wherein the first slot is a slot for connecting a module, having a connector for connection and having a first impedance characteristic, to expand capabilities of the in-vehicle apparatus, the second slot is a slot for connecting a module, having a connector for connection and having a second impedance characteristic different from the first impedance characteristic, to expand capabilities of the in-vehicle apparatus, and the control unit identifies the impedance characteristics of the modules connected to the first and second slots, respectively.

6. The in-vehicle apparatus according to claim 5, further comprising a notifying means for providing a notification when the impedance characteristic of said module does not match the impedance characteristic of said first or second slot with which said module is connected.

7. The in-vehicle apparatus according to claim 6, wherein said first impedance characteristic corresponds to the impedance characteristic of a broadcast-related module, and said second impedance characteristic corresponds to the impedance characteristic of a communication-related module.

8. The in-vehicle apparatus according to claim 7, further comprising a plurality of terminals, provided on each of said plurality of slots, for connecting with the connector of each module, said plurality of terminals including a power supply terminal having the longest length, an insertion detection terminal having the shortest length, and a signal terminal having a length intermediate between said power supply terminal and said insertion detection terminal, wherein said control unit detects the insertion of a module into each of said plurality of slots by using said insertion detection terminal.

9. The in-vehicle apparatus according to claim 5, further comprising a switching unit for switching a signal path from said first or second slot when the impedance characteristic of said module does not match the impedance characteristic of said first or second slot with which said module is connected.

10. The in-vehicle apparatus according to claim 9, wherein said first impedance characteristic corresponds to the impedance characteristic of a broadcast-related module, and said second impedance characteristic corresponds to the impedance characteristic of a communication-related module.

11. The in-vehicle apparatus according to claim 10, further comprising a plurality of terminals, provided on each of said plurality of slots, for connecting with the connector of each module, said plurality of terminals including a power supply terminal having the longest length, an insertion detection terminal having the shortest length, and a signal terminal having a length intermediate between said power supply terminal and said insertion detection terminal, wherein said control unit detects the insertion of a module into each of said plurality of slots by using said insertion detection terminal.

12. The in-vehicle apparatus according to claim 5, further comprising an adjusting unit for adjusting impedance when the impedance characteristic of said module does not match the impedance characteristic of said first or second slot with which said module is connected.

13. The in-vehicle apparatus according to claim 12, wherein said first impedance characteristic corresponds to the impedance characteristic of a broadcast-related module, and said second impedance characteristic corresponds to the impedance characteristic of a communication-related module.

14. The in-vehicle apparatus according to claim 13, further comprising a plurality of terminals, provided on each of said plurality of slots, for connecting with the connector of each module, said plurality of terminals including a power supply terminal having the longest length, an insertion detection terminal having the shortest length, and a signal terminal having a length intermediate between said power supply terminal and said insertion detection terminal, wherein said control unit detects the insertion of a module into each of said plurality of slots by using said insertion detection terminal.

* * * * *